US012458982B2

(12) United States Patent
Mcdonald et al.

(10) Patent No.: US 12,458,982 B2
(45) Date of Patent: Nov. 4, 2025

(54) DEVICES, SYSTEMS, AND METHODS OF USE THEREOF FOR MAGNETIC SEPARATION

(71) Applicant: GEORGIA TECH RESEARCH CORPORATION, Atlanta, GA (US)

(72) Inventors: Matt Mcdonald, Atlanta, GA (US); Grant Marshall, Atlanta, GA (US); Colton Lagerman, Atlanta, GA (US); Andreas Sebastian Bommarius, Atlanta, GA (US); Martha Anna Grover, Atlanta, GA (US); Ronald William Rousseau, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 0 days.

(21) Appl. No.: 18/706,560

(22) PCT Filed: Nov. 4, 2022

(86) PCT No.: PCT/US2022/048926
§ 371 (c)(1),
(2) Date: May 1, 2024

(87) PCT Pub. No.: WO2023/081334
PCT Pub. Date: May 11, 2023

(65) Prior Publication Data
US 2025/0001432 A1   Jan. 2, 2025

Related U.S. Application Data

(60) Provisional application No. 63/275,721, filed on Nov. 4, 2021.

(51) Int. Cl.
*B03C 1/035* (2006.01)

(52) U.S. Cl.
CPC .......... *B03C 1/035* (2013.01); *B03C 2201/20* (2013.01)

(58) Field of Classification Search
CPC ... B03C 1/035; B03C 2201/20; B03C 1/0335; B03C 1/14; B03C 2201/18; B03C 2201/26; B03C 1/0332; B03C 1/30; B03C 1/288

See application file for complete search history.

(56) References Cited

U.S. PATENT DOCUMENTS

2016/0016180 A1    1/2016  Lopez et al.
2018/0291364 A1*  10/2018  Liberti .................. B03C 1/288
2019/0151858 A1*   5/2019  Creteer ................. B02C 23/02

OTHER PUBLICATIONS

Adamo, A., et al., On-demand continuous-flow production of pharmaceuticals in a compact, reconfigurable system. Science, 2016. 352(6281): p. 61-67.

(Continued)

*Primary Examiner* — Jacob S. Scott
*Assistant Examiner* — Miraj T. Patel
(74) *Attorney, Agent, or Firm* — Meunier Carlin & Curfman LLC

(57) ABSTRACT

Disclosed herein are devices, systems, and methods of use thereof for magnetic separation. For example, disclosed herein is a device for separation of a mixture comprising a magnetic solid and a non-magnetic solid. The device comprises a separation chamber extending from a proximal end to a distal end; the proximal end defining an inlet; the distal end defining a first outlet and a second outlet. The separation chamber having a region that is configured to subject the fluid flowing through said region to a magnetic field to thereby separate the mixture into a first portion and a second portion; the first portion being enriched with the non-magnetic solid relative to the second separated portion; and (Continued)

the second portion being enriched with the magnetic solid relative to the first separated portion.

19 Claims, 31 Drawing Sheets

(56) References Cited

OTHER PUBLICATIONS

Algorri, M., et al., Re-Envisioning Pharmaceutical Manufacturing: Increasing Agility for Global Patient Access. Journal of Pharmaceutical Sciences, 2022. 111(3): p. 593-607.
Amari, S., et al., Investigating the effect of operation points on crystal quality in reactive crystallization using continuous flow with high shear stress. Chemical Engineering Research and Design, 2021. 176: p. 116-122.
Borlido, L., et al., Magnetic separations in biotechnology. Biotechnology Advances, 2013. 31(8): p. 1374-1385.
Buque-Taboada EM et al. (2004) In situ product removal using a crystallization loop in asymmetric reduction of 4-oxoisophorone by *Saccharomyces cerevisiae*, Biotechnology and Bioengineering 86, 795-800.
Burcham, C.L., A.J. Florence, and M.D. Johnson, Continuous Manufacturing in Pharmaceutical Process Development and Manufacturing. Annual Review of Chemical and Biomolecular Engineering, 2018. 9(1): p. 253-281.
Cho BK et al. (2006) Asymmetric synthesis of unnatural-amino acids using thermophilic aromatic-amino acid transaminase, Biotechnology and Bioprocess Engineering 11, 299-305.
Cole, K.P., et al., Kilogram-scale prexasertib monolactate monohydrate synthesis under continuous-flow CGMP conditions. Science, 2017. 356(6343): p. 1144-1150.
Doeker, M., et al., In situ reactive extraction with oleic acid for process intensification in amine transaminase catalyzed reactions. Green Chemistry, 2022. 24(1): p. 295-304.
Encarnación-Gómez, L.G., A.S. Bommarius, and R.W. Rousseau, Reactive crystallization of β-lactam antibiotics: strategies to enhance productivity and purity of ampicillin. Reaction Chemistry & Engineering, 2016. 1(3): p. 321-329.
Fellechner, O., M. Blatkiewicz, and I. Smirnova, Reactive Separations for In Situ Product Removal of Enzymatic Reactions: A Review. Chemie Ingenieur Technik, 2019. 91(11): p. 1522-1543.
Fisher, A.C., et al., An audit of pharmaceutical continuous manufacturing regulatory submissions and outcomes in the US. International Journal of Pharmaceutics, 2022. 622: p. 121778.
Frenea-Robin, M. and J. Marchalot, Basic Principles and Recent Advances in Magnetic Cell Separation. Magnetochemistry, 2022. 8(1): p. 11.
Guo PL et al. (2015) Combination of dynamic magnetophoretic separation and stationary magnetic trap for highly sensitive and selective detection of *Salmonella typhimurium* in complex matrix, Biosensors and Bioelectronics 74, 628-636.
Gutmann, B., D. Cantillo, and C.O. Kappe, Continuous-Flow Technology—A Tool for the Safe Manufacturing of Active Pharmaceutical Ingredients. Angewandte Chemie International Edition, 2015. 54(23): p. 6688-6728.
Haik, Y., V. Pai, and C.-J. Chen, Development of magnetic device for cell separation. Journal of Magnetism and Magnetic Materials, 1999. 194(1): p. 254-261.
Hernando, M.V., et al., High Yielding Continuous-Flow Synthesis of Norketamine. Organic Process Research & Development, 2022. 26(4): p. 1145-1151.
Ho, C.-H., J. Yi, and X. Wang, Biocatalytic Continuous Manufacturing of Diabetes Drug: Plantwide Process Modeling, Optimization, and Environmental and Economic Analysis. ACS Sustainable Chemistry & Engineering, 2019. 7(1): p. 1038-1051.
Hu, C., et al., Continuous reactive crystallization of an API in PFR-CSTR cascade with in-line PATs. Reaction Chemistry & Engineering, 2020. 5(10): p. 1950-1962.
Hurh B et al. (1994) Microbial production of 6-hydroxynicotinic acid, an important building block for the synthesis of modern insecticides, Journal of fermentation and bioengineering 77, 382-385.
Iranmanesh, M., & Hulliger, J. (2017). Magnetic separation: its application in mining, waste purification, medicine, biochemistry and chemistry. Chem. Soc. Rev, 46, 5925. https://doi.org/10.1039/c7cs00230k.
Janbon, S.L.M., et al., Effects of Scale, Equipment, and Operation on Agglomeration during a Reactive Crystallization. Organic Process Research & Development, 2019. 23(3): p. 302-308.
Jiang, M. and X.-W. Ni, Reactive Crystallization of Paracetamol in a Continuous Oscillatory Baffled Reactor. Organic Process Research & Development, 2019. 23(5): p. 882-890.
Jiang, M.F. and X.W. Ni, Effects of solvents and impurity on crystallization kinetics and crystal properties in a reactive crystallization of paracetamol. Journal of Crystal Growth, 2019. 523: p. 7.
Klein, E.Y et al. Global increase and geographic convergence in antibiotic consumption between 2000 and 2015, PNAS 2018, 115(15), E3463-E3470.
Lee, S.L., et al., Modernizing Pharmaceutical Manufacturing: from Batch to Continuous Production. Journal of Pharmaceutical Innovation, 2015. 10(3): p. 191-199.
Liu R et al. Covalent immobilization and characterization of penicillin G acylase on magnetic Fe2O3/Fe3O4 heterostructure nanoparticles prepared via a novel solution combustion and gel calcination process, International Journal of Biological Macromolecules 2020, 162, 1587-1596.
Liu, W.J., C.Y. Ma, and X.Z. Wang, Novel Impinging Jet and Continuous Crystallizer Design for Rapid Reactive Crystallization of Pharmaceuticals. Procedia Engineering, 2015. 102: p. 499-507.
Liu, W.J., et al., Continuous reactive crystallization of pharmaceuticals using impinging jet mixers. AIChE Journal, 2017. 63(3): p. 967-974.
Luo X et al. (2010) Immobilization of penicillin G acylase in epoxy-activated magnetic cellulose microspheres for improvement of biocatalytic stability and activities, Biomacromolecules 11, 2896-2903.
McDonald, M.A., A.S. Bommarius, and R.W. Rousseau, Enzymatic reactive crystallization for improving ampicillin synthesis. Chemical Engineering Science, 2017, 165, 81-88.
McDonald, M.A., et al., Continuous reactive crystallization of β-lactam antibiotics catalyzed by penicillin G acylase. Part I: Model development. Computers & Chemical Engineering, 2019. 123: p. 331-343.
McDonald, M.A., et al., Continuous reactive crystallization of β-lactam antibiotics catalyzed by penicillin G acylase. Part II: Case study on ampicillin and product purity. Computers & Chemical Engineering, 2019. 126: p. 332-341.
McDonald, M.A., et al., Reactive crystallization: a review. Reaction Chemistry & Engineering, 2021. 6(3): p. 364-400.
Mikkelsen, C. and H. Bruus, Microfluidic capturing-dynamics of paramagnetic bead suspensions. Lab on a Chip, 2005. 5(11): p. 1293-1297.
Netto CG et al. (2013) Superparamagnetic nanoparticles as versatile carriers and supporting materials for enzymes, Journal of Molecular Catalysis B: Enzymatic 85, 71-92.
Neuburger, J., et al., Implementation and scale-up of a semi-continuous transaminase-catalyzed reactive crystallization for the preparation of (S)-(3-methoxyphenyl)ethylamine. Chemical Engineering and Processing—Process Intensification, 2021. 168: p. 108578.
Nikačević, N.M., et al., Opportunities and challenges for process control in process intensification. Chemical Engineering and Processing: Process Intensification, 2012. 52: p. 1-15.
Oberteuffer, J., Magnetic separation: A review of principles, devices, and applications. IEEE Transactions on Magnetics, 1974. 10(2): p. 223-238.
Pamme N et al. (2004) On-Chip Free-Flow Magnetophoresis: Continuous Flow Separation of Magnetic Particles and Agglomerates, Analytical Chemistry 76, 7250-7256.
Pamme N et al. (2006) Continuous sorting of magnetic cells via on-chip free-flow magnetophoresis, Lab on a Chip 6, 974-980.

(56) References Cited

OTHER PUBLICATIONS

Purwins, M., et al., Kinetics of the reactive crystallization of CuInSe2 and CuGaSe2 chalcopyrite films for solar cell applications. Journal of Crystal Growth, 2006. 287(2): p. 408-413.

Quadri et al. Antibacterial Drug Shortages From 2001 to 2013: Implications for Clinical Practice, Clin Infect Dis. 2015, 60(12), 1737-42.

Rogers, L., et al., Continuous Production of Five Active Pharmaceutical Ingredients in Flexible Plug-and-Play Modules: A Demonstration Campaign. Organic Process Research & Development, 2020. 24(10): p. 2183-2196.

Salami, H., et al., Model development for enzymatic reactive crystallization of β-lactam antibiotics: a reaction-diffusion-crystallization approach. Reaction Chemistry & Engineering, 2020. 5(11): p. 2064-2080.

Salami, H., et al., Periodic wet milling as a solution to size-based separation of crystal products from biocatalyst for continuous reactive crystallization. Chemical Engineering Research and Design, 2022. 177: p. 473-483.

Shields IV, CW et al., Magnetic separation of acoustically focused cancer cells from blood for magnetographic templating and analysis, Lab Chip 2016, 16, 3833-3844.

Singh R et al. Advanced Control of Continuous Pharmaceutical Tablet Manufacturing Processes, in Process Simulation and Data Modeling in Solid Oral Drug Development and Manufacture, M.G. Ierapetritou and R. Ramachandran, Editors. 2016, Springer New York: New York, NY. p. 191-224.

Su, Q., et al., A perspective on Quality-by-Control (QbC) in pharmaceutical continuous manufacturing. Computers & Chemical Engineering, 2019. 125: p. 216-231.

Su, W., et al., Engineering nucleation/crystallization to intensify the enzymatic reactions and fermentation: A review. Chemical Engineering Journal, 2022. 431: p. 134186.

Syed MS et al. (2017) A 3D-printed mini-hydrocyclone for high throughput particle separation: application to primary harvesting of microalgae, Lab on a Chip 17, 2459-2469.

Teychené, S., I. Rodríguez-Ruiz, and R.K. Ramamoorthy, Reactive crystallization: From mixing to control of kinetics by additives. Current Opinion in Colloid & Interface Science, 2020. 46: p. 1-19.

Thompson, M.P., et al., Biocatalysis Using Immobilized Enzymes in Continuous Flow for the Synthesis of Fine Chemicals. Organic Process Research & Development, 2019. 23(1): p. 9-18.

Truppo, M.D., Biocatalysis in the Pharmaceutical Industry: The Need for Speed. ACS Medicinal Chemistry Letters, 2017. 8(5): p. 476-480.

Van Boeckel, T. P., et al. Global antibiotic consumption 2000 to 2010: an analysis of national pharmaceutical sales data, The Lancet Infectious Diseases 201414(8): 742-750.

Wegman MA et al. (2002) A two-step, one-pot enzymatic synthesis of cephalexin from D-phenylglycine nitrile, Biotechnology and bioengineering 79, 356-361.

Wibowo C et al. (2001) Design of Integrated Crystallization Systems, AIChE Journal 47, 2474-2492.

Würges K et al. (2011) An Efficient Route to Both Enantiomers of allo-Threonine by Simultaneous Amino Acid Racemase-Catalyzed Isomerization of Threonine and Crystallization, Advanced Synthesis & Catalysis 353, 2431-2438.

Zborowski M et al. (1999) Continuous cell separation using novel magnetic quadrupole flow sorter, Journal of Magnetism and Magnetic Materials 194, 224-230.

Zborowski, M. and J.J. Chalmers, Rare Cell Separation and Analysis by Magnetic Sorting. Analytical Chemistry, 2011. 83(21): p. 8050-8056.

International Search Report and Written Opinion received in PCT/US2022/048926 mailed Feb. 16, 2023.

Gomez-Pastora, et at. "Numerical Analysis of Bead Magnetophoresis from Fowing Blood in a Continuous-Flow Microchannel: Implications to the Bead-Fluid Interactions." Scientific Reports 9.1 (May 13, 2019): 1-13. Abstract, p. 1 pare 2; p. 2 pare 1; p. 2 para 5; p. 6 pare 4; p. 7 para 2; p. 7 pare 8; Figure 1; Figure 2.

Kye, et at. "Dual-neodymium magnet-based microfluidic separation device." Scientific Reports 9.1 (Jul. 1, 2019): 1-10. Entire Document.

Eshaghi, et at. "Particle Separation in a Microchannel by Aapplying Magnetic Fields and Nickel Sputtering." Journal of Magnetism and Magnetic Materials 514 (Nov. 15, 2020): 167121. Entire Document.

* cited by examiner

DEVICES, SYSTEMS, AND METHODS OF USE THEREOF FOR MAGNETIC SEPARATION

CROSS-REFERENCE TO RELATED APPLICATIONS

This application is a U.S. National Stage application filed under 35 U.S.C. § 371 of PCT/US2022/048926 filed Nov. 4, 2022, which claims the benefit of priority to U.S. Provisional Application No. 63/275,721 filed Nov. 4, 2021, each of which is hereby incorporated herein by reference in its entirety.

STATEMENT OF GOVERNMENT SUPPORT

This invention was made with government support under grant number U01FD006484 awarded by the U.S. Food and Drug Administration and grant number DGE-1650044 awarded by the National Science Foundation. The government has certain rights in the invention.

BACKGROUND

Continuous manufacturing has many advantages over batch-wise processes, especially in the pharmaceutical arena. The FDA is encouraging research into continuous manufacturing as a means of improving drug quality and manufacturers expect improvements in process economics to accompany the transition from batch to continuous. The success of recent efforts to move commercial production, at least in part, to a continuous setup is promising, but significant work is needed to reach end-to-end continuous manufacturing, especially for challenging chemistries.

Biocatalysts, such as enzymes, have made some difficult chemistries possible thanks to their unmatched specificity and selectivity. Use of a biocatalyst in a continuous process requires that the enzyme be recycled or otherwise retained within the reactor. So far, this has been accomplished in three ways: ultrafiltration, immobilization on beads with filtration, and immobilization on a fixed substrate. However, none of these methods are amenable to solids-forming reactions.

A magnetic based separation offered several benefits over other solid-solid separations. Magnetic separations are common, but are currently limited in scale and/or to particles of a certain size. The devices, systems, and methods disclosed herein address these and other needs

SUMMARY

In accordance with the purposes of the disclosed compositions, devices, and methods as embodied and broadly described herein, the disclosed subject matter relates to devices, systems, and methods of use thereof for magnetic separation.

For example, disclosed herein is a device for separation of a mixture comprising a magnetic solid and a non-magnetic solid in a fluid flowing through the device when subjected to a magnetic field from a magnet disposed proximate to at least a portion of the device. The device can comprise a separation chamber extending from a proximal end to a distal end. The proximal end defining an inlet. The distal end defining a first outlet and a second outlet. The first outlet and the second outlet are spaced apart from each other by a distance and are in fluid communication with the inlet and the separation chamber. The separation chamber providing a path for fluid flow from the inlet to the first outlet and the second outlet. The inlet being configured to receive the fluid comprising the mixture of the magnetic solid and the non-magnetic solid. The separation chamber having a region that is configured to subject the fluid flowing through said region to the magnetic field to thereby separate the mixture into a first portion and a second portion. The first outlet being configured to receive the first portion of the mixture from the separation chamber. The second outlet being configured to receive the second portion of the mixture from the separation chamber. The first portion being enriched with the non-magnetic solid relative to the second separated portion. The second portion being enriched with the magnetic solid relative to the first separated portion.

In some examples, the inlet has an average characteristic dimension (e.g., diameter) of from 0.1 centimeters to 10 centimeters.

In some examples, the inlet is tapered.

In some examples, the inlet is configured to be in fluid communication with a first tube.

In some examples, the separation chamber has a length (L) as measured the proximal end to the distal end, the length being from 1 centimeter to 100 centimeters.

In some examples, the distance between the first outlet and the second outlet is from 0.5 centimeters to 10 centimeters.

In some examples, the distance is substantially perpendicular to the length.

In some examples, the separation chamber has a volume of from 1 milliliter to 1 Liter.

In some examples, the separation chamber has a cross-sectional shape that is triangular.

In some examples, the separation chamber has a first face and a second face opposite and spaced apart from the first face.

In some examples, the device has an exterior surface and the device further comprises one or more mounting elements coupled to or extending from the exterior surface.

In some examples, the mounting elements are configured to be coupled to a stand.

In some examples, the stand is configured to keep the device stationary during operation.

In some examples, the stand is configured to orient the device at an angle. In some examples, the angle is from 0° (e.g., horizontal) to 90° (e.g., vertical). In some examples, the angle is from 0° to 60°, from 0° to 45°, from 0° to 30°, or from 0° to 15°.

In some examples, the first outlet has an average characteristic dimension (e.g., diameter) of from 0.1 centimeters to 5 centimeters.

In some examples, the first outlet is tapered.

In some examples, the first outlet is configured to be in fluid communication with a second tube.

In some examples, the second outlet has an average characteristic dimension (e.g., diameter) of from 0.1 centimeters to 5 centimeters.

In some examples, the second outlet is tapered.

In some examples, the second outlet is configured to be in fluid communication with a third tube.

In some examples, the device comprises a polymer.

In some examples, the inlet, the first outlet, the second outlet, and the separation chamber are integrally formed (e.g., wherein the device comprises a single continuous piece).

In some examples, the device further comprises a magnet.

In some examples, the magnet is disposed above the separation chamber to pull the magnetic solids upwards towards the second outlet while the non-magnetic solids settle (e.g., via gravity) downwards towards the first outlet.

In some examples, the device comprises a first magnet disposed on a portion of the first face and a second magnet disposed on a portion of the second face.

In some examples, the magnet has a magnetic flux density of from greater than 0 Tesla (T) to 2 T.

In some examples, the magnet comprises a permanent magnet, an electromagnet, or a combination thereof.

In some examples, the magnetic solid comprises a plurality of magnetic particles (e.g., a plurality of particles comprising a magnetic material). In some examples, the plurality of magnetic particles have an average particle size of from 10 micrometers (microns, μm) to 10,000 μm. In some examples, the plurality of magnetic particles have an average particle size of from 10 to 1000 micrometers, 10 to 500 micrometers, from 50 to 500 micrometers, or from 50 to 200 micrometers. In some examples, the plurality of magnetic particles are substantially spherical in shape.

In some examples, the mixture comprises the magnetic solid in a concentration of from 1 gram of magnetic solid per liter of fluid (g/L) to 100 g/L.

In some examples, the magnetic solid further comprises a catalyst.

In some examples, the catalyst comprises an enzymatic catalyst, a metal catalyst, an organometallic catalyst, or a combination thereof.

In some examples, the non-magnetic solid comprises a plurality of non-magnetic particles (e.g., crystals). In some examples, the plurality of non-magnetic particle have an average particle size of from 10 micrometers (microns, μm) to 10,000 μm. In some examples, the plurality of non-magnetic particles have an average particle size of from 10 to 1000 micrometers, from 10 to 500 micrometers, from 50 to 500 micrometers, or from 50 to 200 micrometers. In some examples, the plurality of non-magnetic particles have a shape that is needle-like.

In some examples, the mixture comprises the non-magnetic solid in a concentration of from 1 gram of non-magnetic solid per liter of fluid (g/L) to 100 g/L.

In some examples, the non-magnetic solid comprises a therapeutic agent.

In some examples, the non-magnetic solid comprises an antimicrobial.

In some examples, the non-magnetic solid comprises an antibiotic.

In some examples, the non-magnetic solid comprises a β-lactam antibiotic.

In some examples, the non-magnetic solid comprises a cephalosporin.

In some examples, the non-magnetic solid comprises Penicillin G, cephalexin, Cephalosporin C, amoxicillin, or a combination thereof.

In some examples, the fluid further comprises a solvent.

In some examples, the second portion includes 80% or more, 90% or more, 95% or more, 99% or more, or 99.9% or more of the magnetic solid.

Also disclosed herein are systems comprising one or more of the devices disclosed herein.

In some examples, the system comprises a plurality of the devices connected in parallel and/or in series.

In some examples, the system comprises a first device and a second device connected in series, wherein the first device and the second device each comprises any of the devices disclosed herein.

In some examples, the inlet of the second device is configured to receive the first portion from the first outlet of the first device.

In some examples, the inlet of the second device is in fluid communication with the first outlet of the first device via a second tube.

In some examples, the separation chamber of the second device has a region that is configured to subject the fluid flowing through said region to a magnetic field to thereby separation the first portion into a third portion and a fourth portion, the first outlet of the second device being configured to receive the third portion, the second outlet of the second device being configured to receive the fourth portion, the third portion being enriched with the non-magnetic solid relative to the fourth portion, and the fourth portion being enriched with the magnetic solid relative to the third portion.

In some examples, the system further comprises a magnetic trap.

In some examples, the magnetic trap is in fluid communication with the second device, the magnetic trap being configured to receive the third portion from the first outlet of the second device.

In some examples, the first outlet of the second device is in fluid communication with the magnetic trap via a fifth tube.

In some examples, the system further comprises a mixture reservoir.

In some examples, the mixture reservoir is in fluid communication with the inlet of the first device via a first tube.

In some examples, the first device is configured to recycle the second portion from the second outlet into the mixture reservoir, the second device is configured to recycle the fourth portion from the second outlet into the mixture reservoir, or a combination thereof.

In some examples, the second outlet of the first device is in fluid communication with the mixture reservoir via a third tube, the second outlet of the second device is in fluid communication with the mixture reservoir via a fourth tube, or a combination thereof.

In some examples, the system further comprises the first tube, the second tube, the third tube, the fourth tube, the fifth tube, or a combination thereof.

In some examples, the system further comprises a pump (e.g., one or more pumps) in fluid communication with the one or more devices. In some examples, the pump is configured to flow the mixture through the one or more devices at a flow rate of from 1 to 100 mL/minute. In some examples, the pump is configured to flow the mixture through the one or more devices at a flow rate of from 1 to 60 mL/minute, from 1 to 50 mL/minute, from 4 to 40 mL/minute, from 4 to 25 mL/minute, from 4 to 20 mL/minute, from 6 to 16 mL/minute, or from 18 to 28 mL/minute.

Also disclosed herein are methods of making any of the devices disclosed herein. For example, the methods can comprise making the device using additive manufacturing. In some examples, the additive manufacturing comprises stereolithography. In some examples, the method comprises making the device based on a 3D model.

Also disclosed herein are methods of use of any of the devices disclosed herein. For example, the methods can comprise flowing the mixture from the inlet to the first outlet and second outlet while subjecting the region of the separation chamber to the magnetic field thereby separating the mixture into the first portion at the first outlet and the second portion at the second outlet. In some examples, the device processes from 1 gram to 100 grams of total solids per hour.

In some examples, the device is operated continuously for an amount of time of from 30 minutes to 48 hours.

Also disclosed herein are methods of use of any of the systems disclosed herein.

For example, also disclosed herein are methods of use of the system comprising a first device and a second device connected in series, wherein the first device and the second device each comprises any of the devices disclosed herein, wherein the inlet of the second device is configured to receive the first portion from the first outlet of the first device. The methods can, for example, comprise: flowing the mixture from the inlet of the first device to the first outlet and second outlet while subjecting the region of the separation chamber of the first device to the magnetic field, thereby separating the mixture into the first portion at the first outlet of the first device and the second portion at the second outlet of the first device; and flowing the first portion from the inlet of the second device to the first outlet and the second outlet while subjecting the region of the separation chamber of the second device to the magnetic field, thereby separating the first portion into the third portion at the first outlet of the second device and the fourth portion at the second outlet of the second device. In some examples, each of the devices independently processes from 1 gram to 100 grams of total solids per hour. In some examples, each of the devices independently is operated continuously for an amount of time of from 30 minutes to 48 hours.

Additional advantages of the disclosed devices, systems, and methods will be set forth in part in the description which follows, and in part will be obvious from the description. The advantages of the disclosed devices, systems, and methods will be realized and attained by means of the elements and combinations particularly pointed out in the appended claims. It is to be understood that both the foregoing general description and the following detailed description are exemplary and explanatory only and are not restrictive of the disclosed compositions, devices, and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
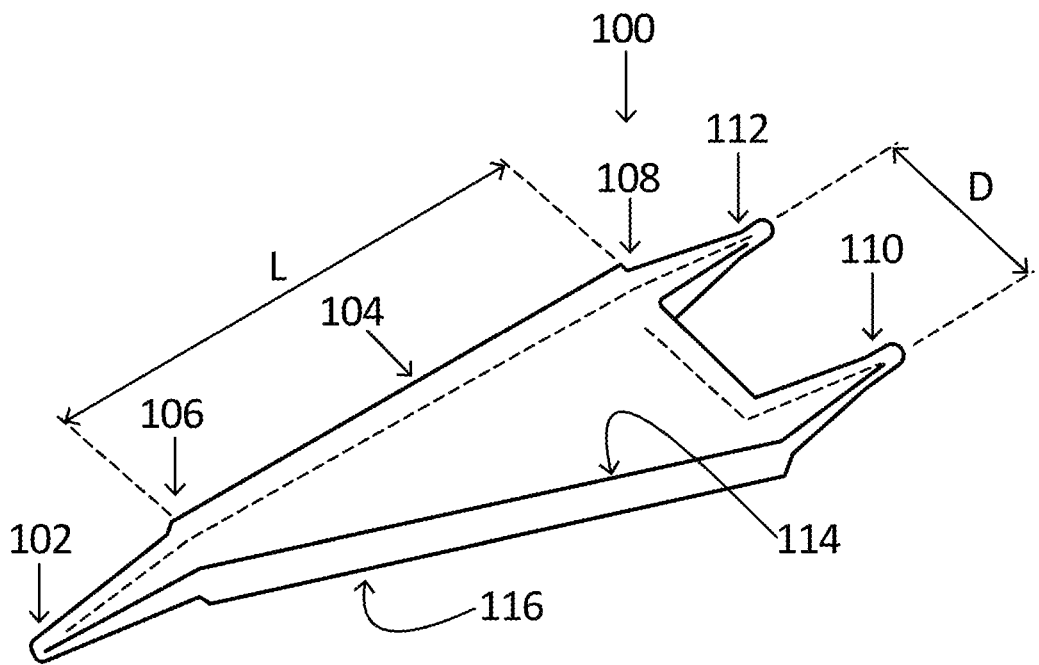
FIG. 1. A schematic view of an example device as disclosed herein according to one implementation.
Figure 2:
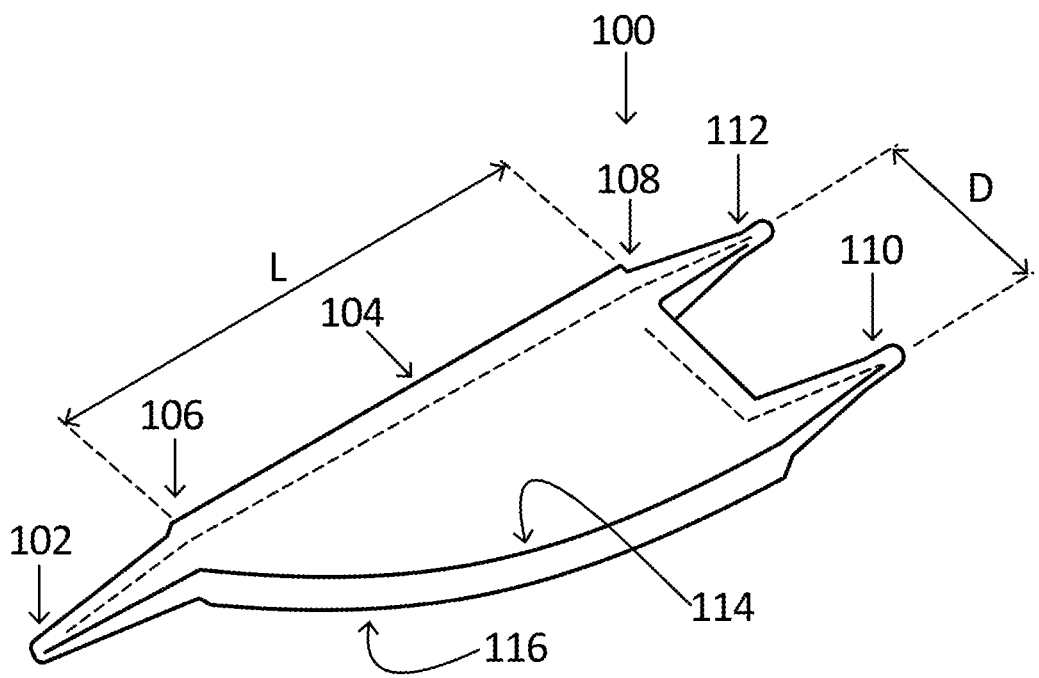
FIG. 2. A schematic view of an example device as disclosed herein according to one implementation.

The devices, systems, and methods described herein may be understood more readily by reference to the following detailed description of specific aspects of the disclosed subject matter and the Examples included therein.

Before the present devices, systems, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

"Exemplary" means "an example of" and is not intended to convey an indication of a preferred or ideal embodiment. "Such as" is not used in a restrictive sense, but for explanatory purposes.

Values can be expressed herein as an "average" value. "Average" generally refers to the statistical mean value.

By "substantially" is meant within 5%, e.g., within 4%, 3%, 2%, or 1%.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, by a "subject" is meant an individual. Thus, the "subject" can include domesticated animals (e.g., cats, dogs, etc.), livestock (e.g., cattle, horses, pigs, sheep, goats, etc.), laboratory animals (e.g., mouse, rabbit, rat, guinea pig, etc.), and birds. "Subject" can also include a mammal, such as a primate or a human. Thus, the subject can be a human or veterinary patient. The term "patient" refers to a subject under the treatment of a clinician, e.g., physician.

"Biocompatible" and "biologically compatible", as used herein, generally refer to compounds and/or compositions that are, along with any metabolites or degradation products thereof, generally non-toxic to normal cells and tissues, and which do not cause any significant adverse effects to normal cells and tissues when cells and tissues are incubated (e.g., cultured) in their presence.

The term "biodegradable" as used herein refers to a material or substance wherein physical dissolution and/or chemical degradation is effected under physiological conditions.

As used herein, "antimicrobial" refers to the ability to treat or control (e.g., reduce, prevent, treat, or eliminate) the growth of a microbe at any concentration. Similarly, the terms "antibacterial," "antifungal," and "antiviral" refer to the ability to treat or control the growth of bacteria, fungi, and viruses at any concentration, respectively.

The term "antibiotic" is used to refer to antibacterial agents. Antibiotic agents may be bactericidal and/or bacteriostatic. Generally, the antibiotic agent is of the group consisting of aminoglycosides, ansamycins, carbacephem, carbapenems, cephalosporins (including first, second, third, fourth, and fifth-generation cephalosporins), lincosamides, macrolides, monobactams, or nitrofurans. Any suitable antimicrobial agent can be employed, as would be apparent to one of ordinary skill in the art. Indeed, the selection of an antimicrobial agent can depend on the microbe being targeted, for example, antibiotics, antifungals, and antivirals. Antibiotic can also be a biologically active substance capable of destroying microorganisms or inhibiting the growth of the same.

As used herein, "reduce" or other forms of the word, such as "reducing" or "reduction," refers to lowering of an event or characteristic (e.g., microbe population/infection). It is understood that the reduction is typically in relation to some standard or expected value. For example, "reducing microbial infection" means reducing the spread of a microbial infection relative to a standard or a control.

As used herein, "prevent" or other forms of the word, such as "preventing" or "prevention," refers to stopping a particular event or characteristic, stabilizing or delaying the development or progression of a particular event or characteristic, or minimizing the chances that a particular event or characteristic will occur. "Prevent" does not require comparison to a control as it is typically more absolute than, for example, "reduce." As used herein, something could be reduced but not prevented, but something that is reduced could also be prevented. Likewise, something could be prevented but not reduced, but something that is prevented could also be reduced.

As used herein, "treat" or other forms of the word, such as "treated" or "treatment," refers to administration of a composition or performing a method in order to reduce, prevent, inhibit, or eliminate a particular characteristic or event (e.g., microbe growth or survival). The term "control" is used synonymously with the term "treat."

The term "anticancer" refers to the ability to treat or control cellular proliferation and/or tumor growth at any concentration.

The term "therapeutically effective" refers to the amount of the composition used is of sufficient quantity to ameliorate one or more causes or symptoms of a disease or disorder. Such amelioration only requires a reduction or alteration, not necessarily elimination.

The term "pharmaceutically acceptable" refers to those compounds, materials, compositions, and/or dosage forms which are, within the scope of sound medical judgment, suitable for use in contact with the tissues of human beings and animals without excessive toxicity, irritation, allergic response, or other problems or complications commensurate with a reasonable benefit/risk ratio.

The term "particle" is used herein to refer to particles having a variety of internal structures and organizations, including homogeneous matrices or heterogeneous core-shell matrices, porous particles, multi-layer particles, among others.

The term "catalyst," as used herein, relates to any substance configured to increase the rate of the desired reaction without being consumed. The catalysts of the present disclosure include both homogeneous, heterogeneous catalysts, heterogenized homogeneous catalysts, biocatalysts, and the like.

Devices, Systems, and Methods

Disclosed herein are devices, systems, and methods of use thereof for magnetic separation.

For example, disclosed herein are devices for separation of a mixture, the mixture comprising a magnetic solid and a non-magnetic solid and the mixture being in a fluid. The separation occurring when the fluid flowing through the device is subjected to a magnetic field, for example from a magnet disposed proximate to at least a portion of the device.

Referring now to FIG. 1-FIG. 5, disclosed herein is device 100. comprising a separation chamber 104 extending from a proximal end 106 to a distal end 108. The proximal end 106 defines an inlet 102. The distal end 108 defines a first outlet 110 and a second outlet 112. The first outlet 110 and the second outlet 112 are spaced apart from each other by a distance and are in fluid communication with the inlet 102 and the separation chamber 104. The separation chamber 104 provides a path for fluid flow from the inlet 102 to the first outlet 110 and the second outlet 112.

The inlet 102 is configured to receive the fluid comprising the mixture of the magnetic solid and the non-magnetic solid.

In some examples, the inlet 102 has a longitudinal axis, a proximal end, and a distal end opposite and axially spaced apart from the proximal end. The inlet 102 can have a cross-sectional shape in a plane perpendicular to the longitudinal axis, wherein the cross-sectional shape can be any shape, such as a regular shape, an irregular shape, an isotropic shape, or an anisotropic shape. In some examples, the cross-sectional shape of the inlet 102 can be substantially circular, ovate, ovoid, elliptic, triangular, rectangular, polygonal, etc.

The inlet 102 can have an average characteristic dimension. The term "characteristic dimension," as used herein refers to the largest straight line distance between two points in the plane of the cross-sectional shape of the inlet 102. "Average characteristic dimension" and "mean characteristic dimension" are used interchangeably herein, and generally refer to the statistical mean characteristic dimension. For example, for a cylindrical inlet 102, the cross-sectional shape can be substantially circular and the average characteristic dimension can refer to the average diameter.

In some examples, the inlet 102 can have an average characteristic dimension (e.g., diameter) of 0.1 centimeters (cm) or more (e.g., 0.2 cm or more, 0.3 cm or more, 0.4 cm or more, 0.5 cm or more, 0.6 cm or more, 0.7 cm or more, 0.8 cm or more, 0.9 cm or more, 1 cm or more, 1.25 cm or more, 1.5 cm or more, 1.75 cm or more, 2 cm or more, 2.25 cm or more, 2.5 cm or more, 2.75 cm or more, 3 cm or more, 3.25 cm or more, 3.5 cm or more, 3.75 cm or more, 4 cm or more, 4.25 cm or more, 4.5 cm or more, 4.75 cm or more, 5 cm or more, 5.5 cm or more, 6 cm or more, 6.5 cm or more, 7 cm or more, 7.5 cm or more, 8 cm or more, 8.5 cm or more, 9 cm or more, or 9.5 cm or more). In some examples, the inlet 102 can have an average characteristic dimension (e.g., diameter) of 10 centimeters (cm) or less (e.g., 9.5 cm or less, 9 cm or less, 8.5 cm or less, 8 cm or less, 7.5 cm or less, 7 cm or less, 6.5 cm or less, 6 cm or less, 5.5 cm or less, 5 cm or less, 4.75 cm or less, 4.5 cm or less, 4.25 cm or less, 4 cm or less, 3.75 cm or less, 3.5 cm or less, 3.25 cm or less, 3 cm or less, 2.75 cm or less, 2.5 cm or less, 2.25 cm or less, 2 cm or less, 1.75 cm or less, 1.5 cm or less, 1.25 cm or less, 1 cm or less, 0.9 cm or less, 0.8 cm or less, 0.7 cm or less, 0.6 cm or less, 0.5 cm or less, 0.4 cm or less, 0.3 cm or less, or 0.2 cm or less). The average characteristic dimension of the inlet 102 can range from any of the minimum values described above to any of the maximum values described above. For example, the inlet 102 can have an average characteristic dimension of from 0.1 centimeters to 10 centimeters (e.g., from 0.1 cm to 5 cm, from 5 cm to 10 cm, from 0.1 cm to 2 cm, from 2 cm to 4 cm, from 4 cm to 6 cm, from 6 cm to 8 cm, from 8 cm to 10 cm, from 0.1 cm to 9 cm, from 0.1 cm to 8 cm, from 0.1 cm to 7 cm, from 0.1 cm to 6 cm, from 0.1 cm to 4 cm, from 0.1 cm to 3 cm, from 0.1 cm to 2 cm, from 0.1 cm to 1 cm, from 0.25 cm to 10 cm, from 0.5 cm to 10 cm, from 0.75 cm to 10 cm, from 1 cm to 10 cm, from 2 cm to 10 cm, from 3 cm to 10 cm, from 4 cm to 10 cm, from 6 cm to 10 cm, from 7 cm to 10 cm, from 9 cm to 10 cm, from 0.25 cm to 9.75 cm, from 0.5 cm to 9.5 cm, or from 1 cm to 9 cm).

In some examples, the average characteristic dimension of the inlet 102 can vary along the longitudinal axis (e.g., tapered, stepped, etc.). In some examples, the inlet 102 is tapered.

In some examples, the inlet 102 is configured to be in fluid communication with a first tube 500.

The separation chamber 104 can have any shape, such as a regular shape, an irregular shape, an isotropic shape, or an anisotropic shape. For example, the separation chamber 104 can be a polyhedron (e.g., a platonic solid, a prism, a pyramid), a cylinder, a hemicylinder, an elliptical cylinder, a hemi-elliptical cylinder, a cone, a semicone, etc.

The separation chamber 104 has a length (L), the length being the dimension from the proximal end 106 to the distal end 108. In some examples, the separation chamber 104 has a length of 1 centimeter (cm) or more (e.g., 1.5 cm or more, 2 cm or more, 2.5 cm or more, 3 cm or more, 3.5 cm or more, 4 cm or more, 4.5 cm or more, 5 cm or more, 5.5 cm or more, 6 cm or more, 6.5 cm or more, 7 cm or more, 7.5 cm or more, 8 cm or more, 8.5 cm or more, 9 cm or more, 9.5 cm or more, 10 cm or more, 15 cm or more, 20 cm or more, 25 cm or more, 30 cm or more, 35 cm or more, 40 cm or more, 45 cm or more, 50 cm or more, 60 cm or more, 70 cm or more, 80 cm or more, or 90 cm or more). In some examples, the separation chamber 104 has a length of 100 centimeters (cm) or less (e.g., 90 cm or less, 80 cm or less, 70 cm or less, 60 cm or less, 50 cm or less, 45 cm or less, 40 cm or less, 35 cm or less, 30 cm or less, 25 cm or less, 20 cm or less, 15 cm or less, 10 cm or less, 9.5 cm or less, 9 cm or less, 8.5 cm or less, 8 cm or less, 7.5 cm or less, 7 cm or less, 6.5 cm or less, 6 cm or less, 5.5 cm or less, 5 cm or less, 4.5 cm or less, 4 cm or less, 3.5 cm or less, 3 cm or less, 2.5 cm or less, 2 cm or less, or 1.5 cm or less). The length of the separation chamber 104 can range from any of the minimum values described above to any of the maximum values described above. For example, the separation chamber 104 can have a length of from 1 centimeter to 100 centimeters (e.g., from 1 cm to 50 cm, from 50 cm to 10 cm, from 1 cm to 25 cm, from 25 cm to 50 cm, from 50 cm to 75 cm, from 75 cm to 100 cm, from 1 cm to 90 cm, from 1 cm to 80 cm, from 1 cm to 70 cm, from 1 cm to 60 cm, from 1 cm to 40 cm, from 1 cm to 30 cm, from 1 cm to 20 cm, from 1 cm to 10 cm, from 1 cm to 5 cm, from 5 cm to 100 cm, from 10 cm to 100 cm, from 20 cm to 100 cm, from 30 cm to 100 cm, from 40 cm to 100 cm, from 60 cm to 100 cm, from 70 cm to 100 cm, from 80 cm to 100 cm, from 90 cm to 100 cm, from 5 cm to 95 cm, or from 10 cm to 90 cm).

The separation chamber 104 can have a cross-sectional shape in a plane parallel to the length, wherein the cross-sectional shape can be any shape, such as a regular shape, an irregular shape, an isotropic shape, or an anisotropic shape. In some examples, the cross-sectional shape of the separation chamber 104 can be substantially circular, ovate, ovoid, elliptic, triangular, rectangular, polygonal, etc. In some examples, the cross-sectional shape of the separation chamber 104 can be substantially triangular.

In some examples, the separation chamber 104 has a first face 114 and a second face 116 opposite and spaced apart from the first face 114. In some examples, the first face 114 and the second face 116 can each be in a plane substantially parallel to the cross-sectional shape.

In some examples, the separation chamber 104 has a volume of 1 milliliter (mL) or more (e.g., 1.5 mL or more, 2 mL or more, 2.5 mL or more, 3 mL or more, 3.5 mL or more, 4 mL or more, 4.5 mL or more, 5 mL or more, 6 mL or more, 7 mL or more, 8 mL or more, 9 mL or more, 10 mL or more, 15 mL or more, 20 mL or more, 25 mL or more, 30 mL or more, 35 mL or more, 40 mL or more, 45 mL or more, 50 mL or more, 55 mL or more, 60 mL or more, 65 mL or more, 70 mL or more, 75 mL or more, 80 mL or more, 85 mL or more, 90 mL or more, 95 mL or more, 100 mL or more, 110 mL or more, 120 mL or more, 130 mL or more, 140 mL or more, 150 mL or more, 175 mL or more, 200 mL or more, 225 mL or more, 250 mL or more, 275 mL or more, 300 mL or more, 350 mL or more, 400 mL or more, 450 mL or more, 500 mL or more, 600 mL or more, 700 mL or more, 800 mL or more, or 900 mL or more). In some examples, the separation chamber 104 has a volume of 1 Liter or less (e.g., 900 mL or less, 800 mL or less, 700 mL or less, 600 mL or less, 500 mL or less, 450 mL or less, 400 mL or less, 350 mL or less, 300 mL or less, 275 mL or less, 250 mL or less, 225 mL or less, 200 mL or less, 175 mL or less, 150 mL or less, 140 mL or less, 130 mL or less, 120 mL or less, 110 mL or less, 100 mL or less, 95 mL or less, 90 mL or less, 85 mL or less, 80 mL or less, 75 mL or less, 70 mL or less, 65 mL or less, 60 mL or less, 55 mL or less, 50 mL or less, 45 mL or less, 40 mL or less, 35 mL or less, 30 mL or less, 25 mL or less, 20 mL or less, 15 mL or less, 10 mL or less, 9 mL or less, 8 mL or less, 7 mL or less, 6 mL or less, 5 mL or less, 4.5 mL or less, 4 mL or less, 3.5 mL or less, 3 mL or less, 2.5 mL or less, 2 mL or less, or 1.5 mL or less). The volume of the separation chamber 104 can range from any of the minimum values described above to any of the maximum values described above. For example, the separation chamber 104 can have a volume of from 1 milliliter to 1 Liter (e.g., from 1 mL to 500 mL, from 500 mL to 1000 mL, from 1 mL to 200 mL, from 200 mL to 400 mL, from 400 mL to 600 mL, from 600 mL to 800 mL, from 800 mL to 1000 mL, from 1 mL to 900 mL, from 1 mL to 800 mL, from 1 mL to 700 mL, from 1 mL to 600 mL, from 1 mL to 400 mL, from 1 mL to 300 mL, from 1 mL to 100 mL, from 1 mL to 50 mL, from 1 mL to 25 mL, from 1 mL to 10 mL, from 5 mL to 1000 mL, from 10 mL to 1000 mL, from 25 mL to 1000 mL, from 50 mL to 1000 mL, from 100 mL to 1000 mL, from 200 mL to 1000 mL, from 300 mL to 1000 mL, from 400 mL to 1000 mL, from 600 mL to 1000 mL, from 700 mL to 1000 mL, from 900 mL to 1000 mL, from 5 mL to 950 mL, or from 10 mL to 900 mL).

The first outlet 110 and the second outlet 112 are each disposed towards the distal end 108 of the separation chamber 104, the first outlet 110 being separated from the second outlet 112 by a distance (D). In some examples, the distance separating the first outlet 110 and the second outlet 112 is in a direction that is substantially perpendicular to the length (L) of the separation chamber. In some examples, the distance between the first outlet 110 and the second outlet 112 is 0.5 centimeters (cm) or more (e.g., 0.75 cm or more, 1 cm or more, 1.25 cm or more, 1.5 cm or more, 1.75 cm or more, 2 cm or more, 2.25 cm or more, 2.5 cm or more, 2.75 cm or more, 3 cm or more, 3.25 cm or more, 3.5 cm or more, 3.75 cm or more, 4 cm or more, 4.25 cm or more, 4.5 cm or more, 4.75 cm or more, 5 cm or more, 5.5 cm or more, 6 cm or more, 6.5 cm or more, 7 cm or more, 7.5 cm or more, 8 cm or more, 8.5 cm or more, 9 cm or more, or 9.5 cm or more). In some examples, the distance between the first outlet 110 and the second outlet 112 is 10 centimeters (cm) or less (e.g., 9.5 cm or less, 9 cm or less, 8.5 cm or less, 8 cm or less, 7.5 cm or less, 7 cm or less, 6.5 cm or less, 6 cm or less, 5.5 cm or less, 5 cm or less, 4.75 cm or less, 4.5 cm or less, 4.25 cm or less, 4 cm or less, 3.75 cm or less, 3.5 cm or less, 3.25 cm or less, 3 cm or less, 2.75 cm or less, 2.5 cm or less, 2.25 cm or less, 2 cm or less, 1.75 cm or less, 1.5 cm or less, 1.25 cm or less, 1 cm or less, or 0.75 cm or less). The distance between the first outlet 110 and the second outlet 112 can range from any of the minimum values described above to any of the maximum values described above. For example, the distance between the first outlet 110 and the second outlet 112 can be from 0.5 centimeters to 10 centimeters (e.g. from 0.5 cm to 5 cm, from 5 cm to 10 cm, from 0.5 cm to 2.5 cm, from 2.5 cm to 5 cm, from 5 cm to 7.5 cm, from 7.5 cm to 10 cm, from 0.5 cm to 9 cm, from 0.5 cm to 8 cm, from 0.5 cm to 7 cm, from 0.5 cm to 6 cm, from 0.5 cm to 4.5 cm, from 0.5 cm to 4 cm, from 0.5 cm to 3.5 cm, from 0.5 cm to 3 cm, from 0.5 cm to 2 cm, from 0.5 cm to 1.5 cm, from 1 cm to 10 cm, from 1.5 cm to 10 cm, from 2 cm to 10 cm, from 3 to 10 cm, from 3.5 cm to 10 cm, from 4 cm to 10 cm, from 4.5 cm to 10 cm, from 6 cm to 10 cm, from 7 cm to 10 cm, from 8 cm to 10 cm, from 9 cm to 10 cm, from 1.25 cm to 9.5 cm, from 1.5 cm to 9 cm, or from 2 cm to 8 cm).

In some examples, the first outlet 110 has a longitudinal axis, a proximal end, and a distal end opposite and axially spaced apart from the proximal end. The first outlet 110 can have a cross-sectional shape in a plane perpendicular to the longitudinal axis, wherein the cross-sectional shape can be any shape, such as a regular shape, an irregular shape, an isotropic shape, or an anisotropic shape. In some examples, the cross-sectional shape of the first outlet 110 can be substantially circular, ovate, ovoid, elliptic, triangular, rectangular, polygonal, etc.

The first outlet 110 can have an average characteristic dimension. The term "characteristic dimension," as used herein refers to the largest straight line distance between two points in the plane of the cross-sectional shape of the first outlet 110. "Average characteristic dimension" and "mean characteristic dimension" are used interchangeably herein, and generally refer to the statistical mean characteristic dimension. For example, for a cylindrical first outlet 110, the cross-sectional shape can be substantially circular and the average characteristic dimension can refer to the average diameter.

In some examples, the first outlet 110 can have an average characteristic dimension (e.g., diameter) of 0.1 centimeters (cm) or more (e.g., 0.2 cm or more, 0.3 cm or more, 0.4 cm or more, 0.5 cm or more, 0.6 cm or more, 0.7 cm or more, 0.8 cm or more, 0.9 cm or more, 1 cm or more, 1.25 cm or more, 1.5 cm or more, 1.75 cm or more, 2 cm or more, 2.25 cm or more, 2.5 cm or more, 2.75 cm or more, 3 cm or more, 3.25 cm or more, 3.5 cm or more, 3.75 cm or more, 4 cm or more, 4.25 cm or more, 4.5 cm or more, or 4.75 cm or more). In some examples, the first outlet 110 can have an average characteristic dimension (e.g., diameter) of 5 centimeters (cm) or less (e.g., 4.75 cm or less, 4.5 cm or less, 4.25 cm or less, 4 cm or less, 3.75 cm or less, 3.5 cm or less, 3.25 cm or less, 3 cm or less, 2.75 cm or less, 2.5 cm or less, 2.25 cm or less, 2 cm or less, 1.75 cm or less, 1.5 cm or less, 1.25 cm or less, 1 cm or less, 0.9 cm or less, 0.8 cm or less, 0.7 cm or less, 0.6 cm or less, 0.5 cm or less, 0.4 cm or less, 0.3 cm or less, or 0.2 cm or less). The average characteristic dimension of the first outlet 110 can range from any of the minimum values described above to any of the maximum values described above. For example, the first outlet 110 can have an average characteristic dimension (e.g., diameter) of from 0.1 centimeters to 5 centimeters (e.g., from 0.1 cm to 2.5 cm, from 2.5 cm to 5 cm, from 0.1 cm to 1 cm, from 1 cm to 2 cm, from 2 cm to 3 cm, from 3 cm to 4 cm, from 4 cm to 5 cm, from 0.1 cm to 4.5 cm, from 0.1 cm to 4 cm, from 0.1 cm to 3.5 cm, from 0.1 cm to 3 cm, from 0.1 cm to 2 cm, from 0.1 cm to 1.5 cm, from 0.5 cm to 5 cm, from 1 cm to 5 cm, from 1.5 cm to 5 cm, from 2 cm to 5 cm, from 3 to 5 cm, from 3.5 cm to 5 cm, from 0.5 cm to 4.5 cm, or from 1 cm to 4 cm).

In some examples, the average characteristic dimension of the first outlet 110 can vary along the longitudinal axis (e.g., tapered, stepped, etc.). In some examples, the first outlet 110 is tapered.

In some examples, the first outlet 110 is configured to be in fluid communication with a second tube 502.

In some examples, the second outlet 112 has a longitudinal axis, a proximal end, and a distal end opposite and axially spaced apart from the proximal end. The second outlet 112 can have a cross-sectional shape in a plane perpendicular to the longitudinal axis, wherein the cross-sectional shape can be any shape, such as a regular shape, an irregular shape, an isotropic shape, or an anisotropic shape. In some examples, the cross-sectional shape of the second outlet 112 can be substantially circular, ovate, ovoid, elliptic, triangular, rectangular, polygonal, etc.

The second outlet 112 can have an average characteristic dimension. The term "characteristic dimension," as used herein refers to the largest straight line distance between two points in the plane of the cross-sectional shape of the second outlet 112. "Average characteristic dimension" and "mean characteristic dimension" are used interchangeably herein, and generally refer to the statistical mean characteristic dimension. For example, for a cylindrical second outlet 112, the cross-sectional shape can be substantially circular and the average characteristic dimension can refer to the average diameter.

In some examples, the second outlet 112 can have an average characteristic dimension (e.g., diameter) of 0.1 centimeters (cm) or more (e.g., 0.2 cm or more, 0.3 cm or more, 0.4 cm or more, 0.5 cm or more, 0.6 cm or more, 0.7 cm or more, 0.8 cm or more, 0.9 cm or more, 1 cm or more, 1.25 cm or more, 1.5 cm or more, 1.75 cm or more, 2 cm or more, 2.25 cm or more, 2.5 cm or more, 2.75 cm or more, 3 cm or more, 3.25 cm or more, 3.5 cm or more, 3.75 cm or more, 4 cm or more, 4.25 cm or more, 4.5 cm or more, or 4.75 cm or more). In some examples, the second outlet 112 can have an average characteristic dimension (e.g., diameter) of 5 centimeters (cm) or less (e.g., 4.75 cm or less, 4.5 cm or less, 4.25 cm or less, 4 cm or less, 3.75 cm or less, 3.5 cm or less, 3.25 cm or less, 3 cm or less, 2.75 cm or less, 2.5 cm or less, 2.25 cm or less, 2 cm or less, 1.75 cm or less, 1.5 cm or less, 1.25 cm or less, 1 cm or less, 0.9 cm or less, 0.8 cm or less, 0.7 cm or less, 0.6 cm or less, 0.5 cm or less, 0.4 cm or less, 0.3 cm or less, or 0.2 cm or less). The average characteristic dimension of the second outlet 112 can range from any of the minimum values described above to any of the maximum values described above. For example, the second outlet 112 can have an average characteristic dimension (e.g., diameter) of from 0.1 centimeters to 5 centimeters (e.g., from 0.1 cm to 2.5 cm, from 2.5 cm to 5 cm, from 0.1 cm to 1 cm, from 1 cm to 2 cm, from 2 cm to 3 cm, from 3 cm to 4 cm, from 4 cm to 5 cm, from 0.1 cm to 4.5 cm, from 0.1 cm to 4 cm, from 0.1 cm to 3.5 cm, from 0.1 cm to 3 cm, from 0.1 cm to 2 cm, from 0.1 cm to 1.5 cm, from 0.5 cm to 5 cm, from 1 cm to 5 cm, from 1.5 cm to 5 cm, from 2 cm to 5 cm, from 3 to 5 cm, from 3.5 cm to 5 cm, from 0.5 cm to 4.5 cm, or from 1 cm to 4 cm)

In some examples, the average characteristic dimension of the second outlet 112 can vary along the longitudinal axis (e.g., tapered, stepped, etc.). In some examples, the second outlet 112 is tapered.

In some examples, the second outlet 112 is configured to be in fluid communication with a third tube.

The separation chamber 104 has a region that is configured to subject the fluid flowing through said region to the magnetic field to thereby separate the mixture into a first portion and a second portion. The first outlet 110 is configured to receive the first portion of the mixture from the separation chamber 104. The second outlet 112 is configured to receive the second portion of the mixture from the separation chamber 104. The first portion is enriched with the non-magnetic solid relative to the second separated portion. The second portion is enriched with the magnetic solid relative to the first separated portion. In some examples, the second portion includes 80% or more of the magnetic solid (e.g., 85% or more, 90% or more, 95% or more, 99% or more, or 99.9% or more).

Figure 3:
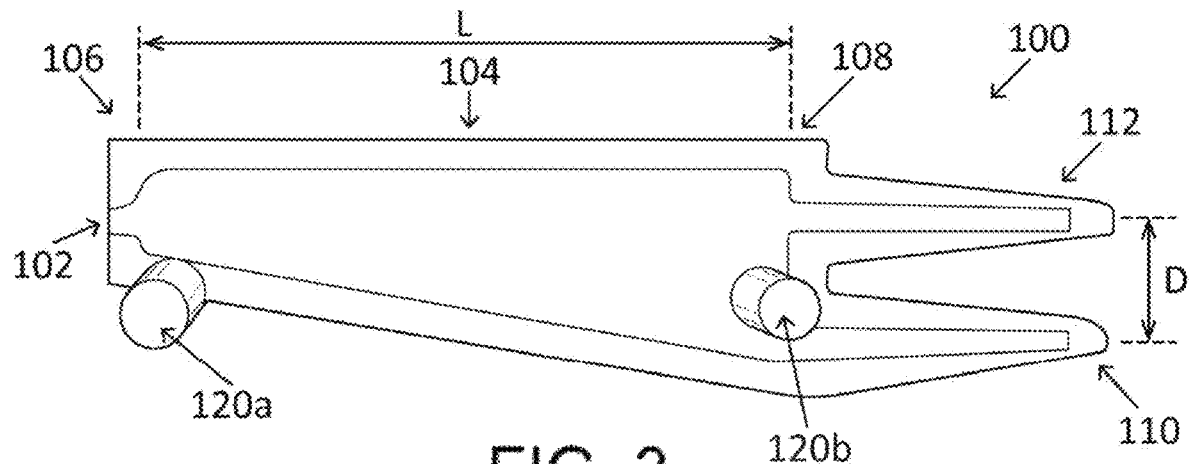
FIG. 3. A schematic view of an example device as disclosed herein according to one implementation.
Figure 4:
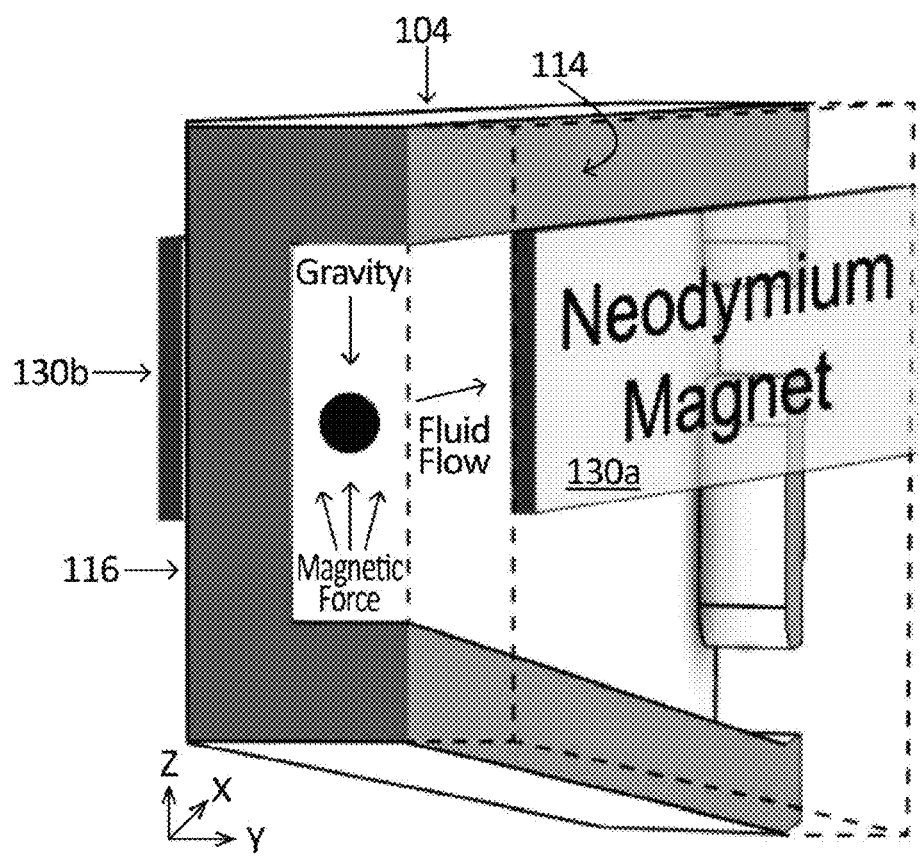
FIG. 4. A schematic view of an example device as disclosed herein according to one implementation.
Figure 5:
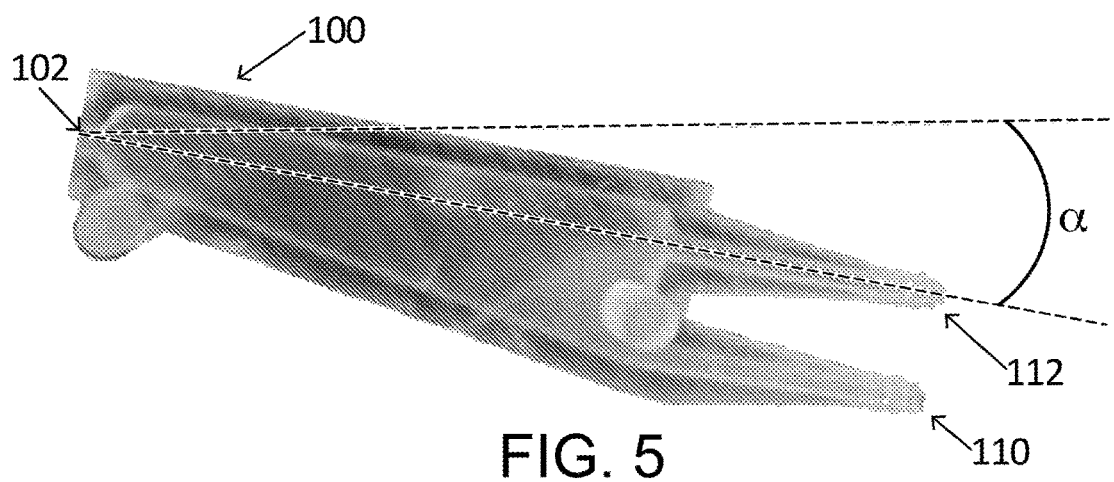
FIG. 5. A schematic view of an example device as disclosed herein according to one implementation.

The device 100 has an exterior surface. In some examples, the device 100 further comprises one or more mounting elements 120 (e.g., 120a, 120b) coupled to or extending from the exterior surface (e.g., as shown in FIG. 3 and FIG. 5). The mounting elements 120 can be configured to be coupled to a stand. The stand can, for example, be configured to keep the device 100 stationary during operation. In some examples, the stand is configured to orient the device 100 at an angle ($\alpha$) as shown in FIG. 5. The angle can, for example, be measured from the inlet to the second outlet.

For example, the angle can be 0° (e.g., horizontal) or more (e.g., 5° or more, 10° or more, 15° or more, 20° or more, 25° or more, 30° or more, 35° or more, 40° or more, 45° or more, 50° or more, 55° or more, 60° or more, 65° or more, 70° or more, 75° or more, 80° or more, or 85° or more). In some examples, the angle can be 90° (e.g., vertical) or less (e.g., 85° or less, 80° or less, 75° or less, 70° or less, 65° or less, 60° or less, 55° or less, 50° or less, 45° or less, 40° or less, 35° or less, 30° or less, 25° or less, 20° or less, 15° or less, 10° or less, or 5° or less). The angle can range from any of the minimum values described above to any of the maximum values described above. For example, the angle can be from 0° (e.g., horizontal) to 90° (e.g., vertical) (e.g., from 0° to 45°, from 45° to 90°, from 0° to 30°, from 30° to 60°, from 60° to 90°, from 0° to 80°, from 0° to 70°, from 0° to 60°, from 0° to 50°, from 0° to 40°, from 0° to 25°, from 0° to 20°, from 0° to 15°, from 0° to 10°, from 0° to 5°, from 5° to 90°, from 10° to 90°, from 15° to 90°, from 20° to 90°, from 25° to 90°, from 30° to 90°, from 40° to 90°, from 50° to 90°, from 70° to 90°, from 80° to 90°, from 5° to 85°, from 10° to 80°, or from 25° to 75°).

The device can be made of any suitable material, for example any material consistent with the fluid and/or mixture and methods of uses described herein. In some examples, the device comprises a polymer. In some examples, the device comprises a biocompatible material, such as a biocompatible polymer. In some examples, the device comprises a bio-pharmaceutical-compatible material, such as a bio-pharmaceutical-compatible polymer.

In some examples, the inlet 102, the first outlet 110, the second outlet 112, and the separation chamber 104 are integrally formed (e.g., the device 100 comprises a single continuous piece). In some examples, the inlet 102, the first outlet 110, the second outlet 112, the separation chamber 104, and the mounting elements 120, are integrally formed (e.g., the device 100 comprises a single continuous piece).

The devices 100 are configured to subject the fluid flowing through the device to a magnetic field. For example, the separation chamber 104 has a region that is configured to subject the fluid flowing through said region to the magnetic field.

The magnetic field can be provided by a magnet 130 (e.g., one or more magnets) disposed proximate to at least a portion of the device 100, e.g., proximate to at least the region of the separation chamber 104.

In some examples, the magnet 130 is disposed above the separation chamber 104 to pull the magnetic solids upwards towards the second outlet 112 while the non-magnetic solids settle (e.g., via gravity) downwards towards the first outlet 110.

In some examples, a first magnet 130a is disposed on a portion of the first face 114 and a second magnet 130b is disposed on a portion of the second face 116.

In some examples, the device 100 can further comprise the magnet 130 (e.g., the one or more magnets). In some examples, the magnet 130 can comprise a plurality of magnets (e.g., two or more magnets).

The magnet 130 can, for example, have a magnetic flux density of greater than 0 Tesla (T) (e.g., 0.1 T or more, 0.2 T or more, 0.3 T or more, 0.4 T or more, 0.5 T or more, 0.6 T or more, 0.7 T or more, 0.8 T or more, 0.9 T or more, 1 T or more, 1.1 T or more, 1.2 T or more, 1.3 T or more, 1.4 T or more, 1.5 T or more, 1.6 T or more, 1.7 T or more, 1.8 T or more, or 1.9 T or more). In some examples, the magnet 130 can have a magnetic flux density of 2 T or less (e.g., 1.9 T or less, 1.8 T or less, 1.7 T or less, 1.6 T or less, 1.5 T or less, 1.4 T or less, 1.3 T or less, 1.2 T or less, 1.1 T or less, 1 T or less, 0.9 T or less, 0.8 T or less, 0.7 T or less, 0.6 T or less, 0.5 T or less, 0.4 T or less, 0.3 T or less, 0.2 T or less, or 0.1 T or less). The magnetic flux density of the magnet 130 can range from any of the minimum values described above to any of the maximum values described above. For example, the magnet 130 can have a magnetic flux density of from greater than 0 Tesla (T) to 2 T (e.g., from greater than 0 T to 1 T, from 1 T to 2 T, from greater than 0 T to 1.75 T, from greater than 0 T to 1.5 T, from greater than 0 T to 1.25 T, from greater than 0 T to 0.75 T, from greater than 0 T to 0.5 T, from greater than 0 T to 0.25 T, from 0.25 T to 2 T, from 0.5 T to 2 T, from 0.75 T to 2 T, from 1 T to 2 T, from 1.25 T to 2 T, from 1.5 T to 2 T, from 1.75 T to 2 T, from 0.1 T to 1.9 T, from 0.2 T to 1.8 T, from 0.3 T to 1.7 T, from 0.4 T to 1.6 T, or from 0.5 T to 1.5 T).

The magnet can comprise any suitable magnet, such as a permanent magnet, an electromagnet, or a combination thereof.

The magnetic solid can comprise any suitable solid magnetic material. In some examples, the magnetic solid comprises a plurality of magnetic particles (e.g., a plurality of particles comprising a magnetic material).

The plurality of magnetic particles can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. As used herein, the size of a particle can refer to the largest linear distance between two points on the surface of the particle. For an anisotropic particle, the average particle size can refer to, for example, the average maximum dimension of the particle (e.g., the length of a rod shaped particle, the diagonal of a cube shape particle, the bisector of a triangular shaped particle, etc.). In some examples, the average particle size can refer to the hydrodynamic diameter. Mean particle size can be measured using methods known in the art, such as evaluation by scanning electron microscopy, transmission electron microscopy, and/or dynamic light scattering.

The plurality of magnetic particles can, for example, have an average particle size of 10 micrometers (microns, μm) or more (e.g., 15 μm or more, 20 μm or more, 25 μm or more, 30 μm or more, 35 μm or more, 40 μm or more, 45 μm or more, 50 μm or more, 60 μm or more, 70 μm or more, 80 μm or more, 90 μm or more, 100 μm or more, 125 μm or more, 150 μm or more, 175 μm or more, 200 μm or more, 225 μm or more, 250 μm or more, 300 μm or more, 350 μm or more, 400 μm or more, 450 μm or more, 500 μm or more, 600 μm or more, 700 μm or more, 800 μm or more, 900 μm or more, 1000 μm or more, 1250 μm or more, 1500 μm or more, 1750 μm or more, 2000 μm or more, 2250 μm or more, 2500 μm or more, 3000 μm or more, 3500 μm or more, 4000 μm or more, 4500 μm or more, 5000 μm or more, 6000 μm or more, 7000 μm or more, 8000 μm or more, or 9000 μm or more). In some examples, the plurality of magnetic particles can have an average particle size of 10,000 μm or less (e.g., 9000 μm or less, 8000 μm or less, 7000 μm or less, 6000 μm or less, 5000 μm or less, 4500 μm or less, 4000 μm or less, 3500 μm or less, 3000 μm or less, 2500 μm or less, 2250 μm or less, 2000 μm or less, 1750 μm or less, 1500 μm or less, 1250 μm or less, 1000 μm or less, 900 μm or less, 800 μm or less, 700 μm or less, 600 μm or less, 500 μm or less, 450 μm or less, 400 μm or less, 350 μm or less, 300 μm or less, 250 μm or less, 225 μm or less, 200 μm or less, 175 μm or less, 150 μm or less, 125 μm or less, 100 μm or less, 90 μm or less, 80 μm or less, 70 μm or less, 60 μm or less, 50 μm or less, 45 μm or less, 40 μm or less, 35 μm or less, 30 μm or less, 25 μm or less, 20 μm or less, or 15 μm or less). The average particle size of the plurality of magnetic particles can range from any of the minimum values described above to any of the maximum values described above. For example, the plurality of magnetic particles can have an average particle size of from 10 micrometers (microns, μm) to 10,000 μm (e.g., from 10 μm to 5000 μm, from 5000 μm to 10000 μm, from 10 μm to 2000 μm, from 2000 μm to 4000 μm, from 4000 μm to 6000 μm, from 6000 μm to 8000 μm, from 8000 μm to 10000 μm, from 10 μm to 9000 μm, from 10 μm to 8000 μm, from 10 μm to 7000 μm, from 10 μm to 6000 μm, from 10 μm to 4000 μm, from 10 μm to 3000 μm, from 10 μm to 1000 μm, from 10 μm to 900 μm, from 10 μm to 800

µm, from 10 µm to 700 µm, from 10 µm to 600 µm, from 10 µm to 500 µm, from 10 µm to 400 µm, from 10 µm to 300 µm, from 10 µm to 200 µm, from 10 µm to 100 µm, from 10 µm to 50 µm, from 25 µm to 10000 µm, from 50 µm to 10000 µm, from 100 µm to 10000 µm, from 200 µm to 10000 µm, from 300 µm to 10000 µm, from 400 µm to 10000 µm, from 500 µm to 10000 µm, from 600 µm to 10000 µm, from 700 µm to 10000 µm, from 800 µm to 10000 µm, from 900 µm to 10000 µm, from 1000 µm to 10000 µm, from 2000 µm to 10000 µm, from 3000 µm to 10000 µm, from 4000 µm to 10000 µm, from 6000 µm to 10000 µm, from 7000 µm to 10000 µm, from 9000 µm to 10000 µm, from 15 µm to 9000 µm, from 20 µm to 8000, from 25 µm to 7000 µm, from 30 µm to 6000 µm, from 50 µm to 5000 µm, from 50 µm to 500 µm, or from 50 µm to 200 µm).

In some examples, the plurality of magnetic particles can be substantially monodisperse. "Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the median particle size (e.g., within 20% of the median particle size, within 15% of the median particle size, within 10% of the median particle size, or within 5% of the median particle size).

The plurality of magnetic particles can comprise particles of any shape, such as a polyhedron (e.g., a platonic solid, a prism, a pyramid), a stellated polyhedron (e.g., a star), a cylinder, a hemicylinder, an elliptical cylinder, a hemi-elliptical cylinder, a sphere, a hemisphere, a cone, a semi-cone, etc. In some examples, the plurality of magnetic particles can have a regular shape, an irregular shape, an isotropic shape, an anisotropic shape, or a combination thereof. In some examples, the plurality of magnetic particles can have an isotropic shape or an anisotropic shape. In some examples, the plurality of magnetic particles can have a shape that is substantially spherical.

In some examples, the mixture comprises the magnetic solid in a concentration of 1 gram of magnetic solid per liter of fluid (g/L) or more (e.g., 2 g/L or more, 3 g/L or more, 4 g/L or more, 5 g/L or more, 10 g/L or more, 15 g/L or more, 20 g/L or more, 25 g/L or more, 30 g/L or more, 35 g/L or more, 40 g/L or more, 45 g/L or more, 50 g/L or more, 55 g/L or more, 60 g/L or more, 65 g/L or more, 70 g/L or more, 75 g/L or more, 80 g/L or more, 85 g/L or more, 90 g/L or more, or 95 g/L or more). In some examples, the mixture comprises the magnetic solid in a concentration of 100 g/L or less (e.g., 95 g/L or less, 90 g/L or less, 85 g/L or less, 80 g/L or less, 75 g/L or less, 70 g/L or less, 65 g/L or less, 60 g/L or less, 55 g/L or less, 50 g/L or less, 45 g/L or less, 40 g/L or less, 35 g/L or less, 30 g/L or less, 25 g/L or less, 20 g/L or less, 15 g/L or less, 10 g/L or less, 5 g/L or less, 4 g/L or less, 3 g/L or less, or 2 g/L or less). The concentration of the magnetic solid in the mixture can range from any of the minimum values described above to any of the maximum values described above. For example, the mixture can comprise the magnetic solid in a concentration of from 1 gram of magnetic solid per liter of fluid (g/L) to 100 g/L (e.g., from 1 g/L to 50 g/L, from 50 g/L to 100 g/L, from 1 g/L to 20 g/L, from 20 g/L to 40 g/L, from 40 g/L to 60 g/L, from 60 g/L to 80 g/L, from 80 g/L to 100 g/L, from 1 g/L to 90 g/L, from 1 g/L to 80 g/L, from 1 g/L to 70 g/L, from 1 g/L to 60 g/L, from 1 g/L to 40 g/L, from 1 g/L to 30 g/L, from 1 g/L to 10 g/L, from 1 g/L to 5 g/L, from 5 g/L to 100 g/L, from 10 g/L to 100 g/L, from 20 g/L to 100 g/L, from 30 g/L to 100 g/L, from 40 g/L to 100 g/L, from 60 g/L to 100 g/L, from 70 g/L to 100 g/L, from 90 g/L to 100 g/L, from 5 g/L to 95 g/L, or from 10 g/L to 90 g/L).

In some examples, the magnetic solid further comprises a catalyst. For example, the plurality of magnetic particles each comprise a surface with a catalyst (e.g., a plurality of catalyst molecules/compounds) attached thereto. For example, the plurality of magnetic particles can comprise surface functionalized magnetic particles, the plurality of magnetic particles having a catalyst attached to a surface thereof.

The catalyst can comprise any suitable catalyst. For example, the catalyst can comprise an enzymatic catalyst, a metal catalyst, an organometallic catalyst, or a combination thereof.

The non-magnetic solid can comprise any suitable non-magnetic material. In some examples, the non-magnetic solid comprises a plurality of non-magnetic particles (e.g., crystals).

The plurality of non-magnetic particles can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. As used herein, the size of a particle can refer to the largest linear distance between two points on the surface of the particle. For an anisotropic particle, the average particle size can refer to, for example, the average maximum dimension of the particle (e.g., the length of a rod shaped particle, the diagonal of a cube shape particle, the bisector of a triangular shaped particle, etc.). In some examples, the average particle size can refer to the hydrodynamic diameter. Mean particle size can be measured using methods known in the art, such as evaluation by scanning electron microscopy, transmission electron microscopy, and/or dynamic light scattering.

The plurality of non-magnetic particles can, for example, have an average particle size of 10 micrometers (microns, µm) or more (e.g., 15 µm or more, 20 µm or more, 25 µm or more, 30 µm or more, 35 µm or more, 40 µm or more, 45 µm or more, 50 µm or more, 60 µm or more, 70 µm or more, 80 µm or more, 90 µm or more, 100 µm or more, 125 µm or more, 150 µm or more, 175 µm or more, 200 µm or more, 225 µm or more, 250 µm or more, 300 µm or more, 350 µm or more, 400 µm or more, 450 µm or more, 500 µm or more, 600 µm or more, 700 µm or more, 800 µm or more, 900 µm or more, 1000 µm or more, 1250 µm or more, 1500 µm or more, 1750 µm or more, 2000 µm or more, 2250 µm or more, 2500 µm or more, 3000 µm or more, 3500 µm or more, 4000 µm or more, 4500 µm or more, 5000 µm or more, 6000 µm or more, 7000 µm or more, 8000 µm or more, or 9000 µm or more). In some examples, the plurality of non-magnetic particles can have an average particle size of 10,000 µm or less (e.g., 9000 µm or less, 8000 µm or less, 7000 µm or less, 6000 µm or less, 5000 µm or less, 4500 µm or less, 4000 µm or less, 3500 µm or less, 3000 µm or less, 2500 µm or less, 2250 µm or less, 2000 µm or less, 1750 µm or less, 1500 µm or less, 1250 µm or less, 1000 µm or less, 900 µm or less, 800 µm or less, 700 µm or less, 600 µm or less, 500 µm or less, 450 µm or less, 400 µm or less, 350 µm or less, 300 µm or less, 250 µm or less, 225 µm or less, 200 µm or less, 175 µm or less, 150 µm or less, 125 µm or less, 100 µm or less, 90 µm or less, 80 µm or less, 70 µm or less, 60 µm or less, 50 µm or less, 45 µm or less, 40 µm or less, 35 µm or less, 30 µm or less, 25 µm or less, 20 µm or less, or 15 µm or less).

The average particle size of the plurality of non-magnetic particles can range from any of the minimum values described above to any of the maximum values described above. For example, the plurality of non-magnetic particles can have an average particle size of from 10 micrometers (microns, μm) to 10,000 μm (e.g., from 10 μm to 5000 μm, from 5000 μm to 10000 μm, from 10 μm to 2000 μm, from 2000 μm to 4000 μm, from 4000 μm to 6000 μm, from 6000 μm to 8000 μm, from 8000 μm to 10000 μm, from 10 μm to 9000 μm, from 10 μm to 8000 μm, from 10 μm to 7000 μm, from 10 μm to 6000 μm, from 10 μm to 4000 μm, from 10 μm to 3000 μm, from 10 μm to 1000 μm, from 10 μm to 900 μm, from 10 μm to 800 μm, from 10 μm to 700 μm, from 10 μm to 600 μm, from 10 μm to 500 μm, from 10 μm to 400 μm, from 10 μm to 300 μm, from 10 μm to 200 μm, from 10 μm to 100 μm, from 10 μm to 50 μm, from 25 μm to 10000 μm, from 50 μm to 10000 μm, from 100 μm to 10000 μm, from 200 μm to 10000 μm, from 300 μm to 10000 μm, from 400 μm to 10000 μm, from 500 μm to 10000 μm, from 600 μm to 10000 μm, from 700 μm to 10000 μm, from 800 μm to 10000 μm, from 900 μm to 10000 μm, from 1000 μm to 10000 μm, from 2000 μm to 10000 μm, from 3000 μm to 10000 μm, from 4000 μm to 10000 μm, from 6000 μm to 10000 μm, from 7000 μm to 10000 μm, from 9000 μm to 10000 μm, from 15 μm to 9000 μm, from 20 μm to 8000, from 25 μm to 7000 μm, from 30 μm to 6000 μm, from 50 μm to 5000 μm, from 50 μm to 500 μm, or from 50 μm to 200 μm).

In some examples, the plurality of non-magnetic particles can be substantially monodisperse. "Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the median particle size (e.g., within 20% of the median particle size, within 15% of the median particle size, within 10% of the median particle size, or within 5% of the median particle size).

The plurality of non-magnetic particles can comprise particles of any shape, such as a polyhedron (e.g., a platonic solid, a prism, a pyramid), a stellated polyhedron (e.g., a star), a cylinder, a hemicylinder, an elliptical cylinder, a hemi-elliptical cylinder, a sphere, a hemisphere, a cone, a semicone, etc. In some examples, the plurality of non-magnetic particles can have a regular shape, an irregular shape, an isotropic shape, an anisotropic shape, or a combination thereof. In some examples, the plurality of non-magnetic particles can have an isotropic shape or an anisotropic shape. In some examples, the plurality of non-magnetic particles have a shape that is needle-like.

In some examples, the mixture comprises the non-magnetic solid in a concentration of 1 gram of magnetic solid per liter of fluid (g/L) or more (e.g., 2 g/L or more, 3 g/L or more, 4 g/L or more, 5 g/L or more, 10 g/L or more, 15 g/L or more, 20 g/L or more, 25 g/L or more, 30 g/L or more, 35 g/L or more, 40 g/L or more, 45 g/L or more, 50 g/L or more, 55 g/L or more, 60 g/L or more, 65 g/L or more, 70 g/L or more, 75 g/L or more, 80 g/L or more, 85 g/L or more, 90 g/L or more, or 95 g/L or more). In some examples, the mixture comprises the non-magnetic solid in a concentration of 100 g/L or less (e.g., 95 g/L or less, 90 g/L or less, 85 g/L or less, 80 g/L or less, 75 g/L or less, 70 g/L or less, 65 g/L or less, 60 g/L or less, 55 g/L or less, 50 g/L or less, 45 g/L or less, 40 g/L or less, 35 g/L or less, 30 g/L or less, 25 g/L or less, 20 g/L or less, 15 g/L or less, 10 g/L or less, 5 g/L or less, 4 g/L or less, 3 g/L or less, or 2 g/L or less). The concentration of the non-magnetic solid in the mixture can range from any of the minimum values described above to any of the maximum values described above. For example, the mixture can comprise the non-magnetic solid in a concentration of from 1 gram of magnetic solid per liter of fluid (g/L) to 100 g/L (e.g., from 1 g/L to 50 g/L, from 50 g/L to 100 g/L, from 1 g/L to 20 g/L, from 20 g/L to 40 g/L, from 40 g/L to 60 g/L, from 60 g/L to 80 g/L, from 80 g/L to 100 g/L, from 1 g/L to 90 g/L, from 1 g/L to 80 g/L, from 1 g/L to 70 g/L, from 1 g/L to 60 g/L, from 1 g/L to 40 g/L, from 1 g/L to 30 g/L, from 1 g/L to 10 g/L, from 1 g/L to 5 g/L, from 5 g/L to 100 g/L, from 10 g/L to 100 g/L, from 20 g/L to 100 g/L, from 30 g/L to 100 g/L, from 40 g/L to 100 g/L, from 60 g/L to 100 g/L, from 70 g/L to 100 g/L, from 90 g/L to 100 g/L, from 5 g/L to 95 g/L, or from 10 g/L to 90 g/L).

In some examples, the non-magnetic solid comprises a solid drug product, such as a crystallin drug product. In some examples, the non-magnetic solid comprises a therapeutic agent. The therapeutic agent can, for example, comprise an anticancer agent, anti-inflammatory agent, antimicrobial agent, or a combination thereof. As used herein, antimicrobials include, for example, antibacterials, antifungals, and antivirals.

In some examples, the non-magnetic solid comprises an antimicrobial. In some examples, the non-magnetic solid comprises an antibiotic.

In some examples, the non-magnetic solid comprises a β-lactam antibiotic. Examples of β-lactam antibiotics include, but are not limited to Amoxicillin, Ampicillin, Avibactam, Azidocillin, Azlocillin, Aztreonam, Bacampicillin, Benzathine, benzylpenicillin (Penicillin G), Biapenem, Carbacephem, Carbenicillin, Carindacillin, Carumonam, Cefacetrile, Cefaclor, Cefadroxil, Cefalexin, Cefaloglycin, Cefalonium, Cefaloridine, Cefalotin, Cefamandole, Cefapirin, Cefatrizine, Cefazaflur, Cefazedone, Cefazolin, Cefbuperazone, Cefcapene, Cefdaloxime, Cefdinir, Cefditoren, Cefepime, Cefetamet, Cefiderocol, Cefixime, Cefmenoxime, Cefmetazole, Cefminox, Cefodizime, Cefonicid, Cefoperazone, Ceforanide, Cefotaxime, Cefotetan, Cefotiam, Cefovecin, Cefoxitin, Cefozopran, Cefpimizole, Cefpiramide, Cefpirome, Cefpodoxime, Cefprozil, Cefquinome, Cefradine, Cefroxadine, Cefsulodin, Ceftaroline, Ceftaroline fosamil, Ceftazidime, Cefteram, Ceftezole, Ceftibuten, Ceftiofur, Ceftiolene, Ceftizoxime, Ceftobiprole, Ceftolozane, Ceftriaxone, Cefuroxime, Cefuroxime axetil, Cefuzonam, Cephalexin, Cephalosporin C, Cephalothin, Cephamycin, Clavulanic acid, Clavulanic acid, Clometocillin, Cloxacillin, Dicloxacillin, Doripenem, Epicillin, Ertapenem, Faropenem, Flomoxef, Flucloxacillin, Hetacillin, Imipenem, Latamoxef, Loracarbef, Mecillinam (Pivmecillinam), Meropenem, Metampicillin, Methicillin, Mezlocillin, Nafcillin, Nocardicin A, Oxacephem, Oxacillin, Panipenem, Penamecillin, Pheneticillin, Phenoxymethylpenicillin (penicillin V), Piperacillin, Pivampicillin, Procaine benzylpenicillin, Procaine penicillin, Propicillin, Razupenem, Ritipenem, Sulbactam, Sulbenicillin, Tabtoxinine β-lactam, Talampicillin, Tazobactam, Tebipenem, Temocillin, Thienamycin, Ticarcillin, Tigemonam, derivatives thereof, and combination thereof.

In some examples, the non-magnetic solid comprises a cephalosporin.

In some examples, the non-magnetic solid comprises Penicillin G, cephalexin, Cephalosporin C, amoxicillin, or a combination thereof.

In some examples, the fluid further comprises a solvent. Any suitable solvent can be used. The solvent can, for example, comprise tetrahydrofuran (THF), N-methyl-2-pyrrolidone (NMP), dimethylformamide (DMF), N-methylformamide, formamide, dichloromethane ($CH_2Cl_2$), ethylene glycol, polyethylene glycol, glycerol, alkane diol, ethanol, methanol, propanol, isopropanol, water, acetonitrile, chloroform, toluene, methyl acetate, ethyl acetate, acetone, hexane, heptane, tetraglyme, propylene carbonate, diglyme, dimethyl sulfoxide (DMSO), dimethoxyethane, xylene, dimethylacetamide, methylene chloride, hexafluoro-2-propanol, or combinations thereof.

In some examples, the device 100 is configured for continuous separation (e.g., for multiple hours).

In some examples, the device 100 is configured for parallelized operation (e.g., connected in parallel with one or more similar or different devices).

In some examples, the device is configured for serial operation (e.g., e.g., connected in series with one or more similar or different devices).

Also disclosed herein are systems comprising one or more of the devices disclosed herein. For example, the system can comprise a plurality of the devices disclosed herein connected in parallel and/or in series.

In some examples, the system comprises a first device 100 and a second device 200 connected in series.

In some implementations, the system includes two or more devices similar to device 100 described above in relation to FIGS. 1-5. For example, in the embodiment shown in FIG. 6-FIG. 7, the system includes a second device 200 that is similar to device 100.

Figure 6:
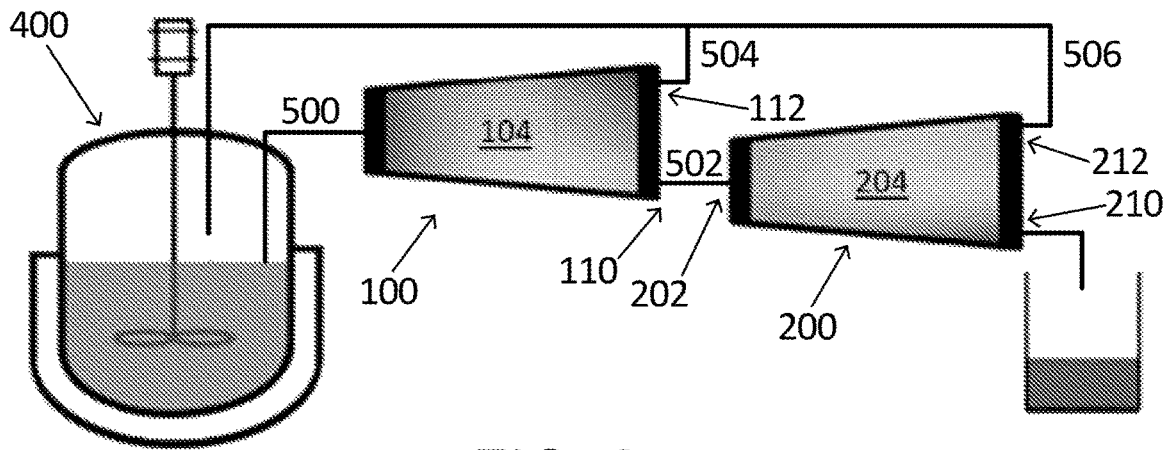
FIG. 6. A schematic view of an example system as disclosed herein according to one implementation.
Figure 7:
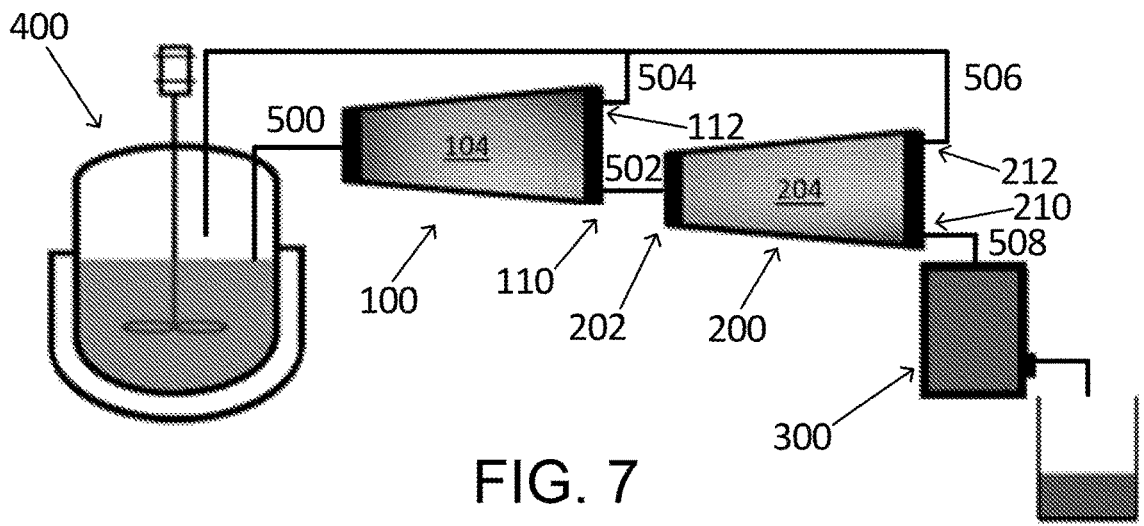
FIG. 7. A schematic view of an example system as disclosed herein according to one implementation.

In the implementation shown in FIG. 6 and FIG. 7, the system includes a first device 100 and a second device 200 connected in series. The second device 200 is similar to the first device 100, as described above in relation to FIGS. 1-5. The inlet 202 of the second device 200 receives the first portion from the first outlet 110 of the first device 100. In some examples, the inlet 202 of the second device 200 is in fluid communication with the first outlet 110 of the first device 100 via a second tube 502.

For example, the separation chamber 204 of the second device has a region that is configured to subject the fluid flowing through said region to a magnetic field to thereby separate the first portion into a third portion and a fourth portion. The first outlet 210 of the second device is configured to receive the third portion and the second outlet 212 of the second device is configured to receive the fourth portion. The third portion is enriched with the non-magnetic solid relative to the fourth portion. The fourth portion is enriched with the magnetic solid relative to the third portion. In some examples, the fourth portion includes 80% or more of the magnetic solid from the first portion (e.g., 85% or more, 90% or more, 95% or more, 99% or more, or 99.9% or more).

In some examples, the system can further comprise a magnetic trap 300. For example, the magnetic trap can be in fluid communication with the system downstream of the first device 100 and/or the second device 200. For example, in the implementation shown in FIG. 7, the magnetic trap 300 can be in fluid communication with the second device 200, wherein the magnetic trap is configured to receive the third portion from the from the first outlet 210 of the second device. In some examples, the first outlet 210 of the second device is in fluid communication with the magnetic trap via a fifth tube 508.

In some examples, the system can further comprise a mixture reservoir 400. In some examples, the mixture reservoir 400 can comprise a reaction chamber, for example where the non-magnetic solid is synthesized from one or more precursors. In some examples, the mixture reservoir 400 is in fluid communication with the inlet 102 of the first device 100 via a first tube 500.

In some examples, the first device 100 is configured to recycle the second portion from the second outlet 112 into the mixture reservoir 400, the second device 200 is configured to recycle the fourth portion from the second outlet 212 into the mixture reservoir, or a combination thereof.

In some examples, the second outlet 112 of the first device 100 is in fluid communication with the mixture reservoir 400 via a third tube 504, the second outlet 212 of the second device 200 is in fluid communication with the mixture reservoir 400 via a fourth tube 506, or a combination thereof.

In some examples, the system can further comprise the first tube 500, the second tube 502, the third tube 504, the fourth tube 506, the fifth tube 508, or a combination thereof. When present, the first tube 500, the second tube 502, the third tube 504, the fourth tube 506, and the fifth tube 508 can independently comprise any suitable material, such as those known in the art. For example, when present, the first tube 500, the second tube 502, the third tube 504, the fourth tube 506, and the fifth tube 508 can independently comprise a polymer.

In some examples, the system can further comprise a pump (e.g., one or more pumps) in fluid communication with the one or more devices. The pump can independently comprise any suitable pump, such as those known in the art. In some examples, the pump can be a peristaltic pump (e.g., a roller pump), a diaphragm pump, or a gear pump. In some examples, the pump is a peristaltic pump.

The pump can, for example, have an adjustable flow rate. For example, the pump can be configured to flow the mixture through the one or more devices at a flow rate of 1 mL/minute (e.g., 2 mL/minute or more, 3 mL/minute or more, 4 mL/minute or more, 5 mL/minute or more, 6 mL/minute or more, 7 mL/minute or more, 8 mL/minute or more, 9 mL/minute or more, 10 mL/minute or more, 15 mL/minute or more, 20 mL/minute or more, 25 mL/minute or more, 30 mL/minute or more, 35 mL/minute or more, 40 mL/minute or more, 45 mL/minute or more, 50 mL/minute or more, 55 mL/minute or more, 60 mL/minute or more, 65 mL/minute or more, 70 mL/minute or more, 75 mL/minute or more, 80 mL/minute or more, 85 mL/minute or more, 90 mL/minute or more, or 95 mL/minute or more). In some examples, the pump can be configured to flow the mixture through the one or more devices at a flow rate of 100 mL/minute or less (e.g., 95 mL/minute or less, 90 mL/minute or less, 85 mL/minute or less, 80 mL/minute or less, 75 mL/minute or less, 70 mL/minute or less, 65 mL/minute or less, 60 mL/minute or less, 55 mL/minute or less, 50 mL/minute or less, 45 mL/minute or less, 40 mL/minute or less, 35 mL/minute or less, 30 mL/minute or less, 25 mL/minute or less, 20 mL/minute or less, 15 mL/minute or less, 10 mL/minute or less, 9 mL/minute or less, 8 mL/minute or less, 7 mL/minute or less, 6 mL/minute or less, 5 mL/minute or less, 4 mL/minute or less, 3 mL/minute or less, or 2 mL/minute or less). The flow rate can range from any of the minimum values described above to any of the maximum values described above. For example, the mixture can flow through the one or more devices at a flow rate of from 1 to 100 mL/minute (e.g., from 1 to 50 mL/minute, from 50 to 100 mL/minute, from 1 to 20 mL/minute, from 20 to 40 mL/minute, from 40 to 60 mL/minute, from 60 to 80 mL/minute, from 80 to 100 mL/minute, from 1 to 90 mL/minute, from 1 to 80 mL/minute, from 1 to 70 mL/minute, from 1 to 60 mL/minute, from 1 to 40 mL/minute, from 1 to 30 mL/minute, from 1 to 25 mL/minute, from 1 to 20 mL/minute, from 1 to 15 mL/minute, from 1 to 10 mL/minute, from 1 to 5 mL/minute, from 5 to 100 mL/minute, from 10 to 100 mL/minute, from 15 to 100 mL/minute, from 20 to 100 mL/minute, from 25 to 100 mL/minute, from 30 to 100 mL/minute, from 40 to 100 mL/minute, from 60 to 100 mL/minute, from 70 to 100 mL/minute, from 90 to 100 mL/minute, from 5 to 95 mL/minute, from 10 to 90 mL/minute, from 4 to 40 mL/minute, from 4 to 25 mL/minute, from 4 to 20 mL/minute, from 6 to 16 mL/minute, or from 18 to 28 mL/minute).

Also disclosed herein are methods of making any of the devices disclosed herein. For example, the methods can comprise making the device using additive manufacturing, such as stereolithography. In some examples, the method comprises making the device based on a 3D model.

Also disclosed herein are methods of use of any of the devices or systems disclosed herein.

For example, the methods can comprise flowing the mixture from the inlet to the first outlet and the second outlet while subjecting the region of the separation chamber to the magnetic field thereby separating the mixture into the first portion at the first outlet and the second portion at the second outlet.

In some examples, the methods can further comprise flowing the first portion from the inlet of the second device to the first outlet and the second outlet while subjecting the region of the separation chamber of the second device to the magnetic field, thereby separating the first portion into the third portion at the first outlet of the second device and the fourth portion at the second outlet of the second device.

In some examples, each of the one or more device(s) independently can process 1 gram of total solids per hour (g/hour) or more (e.g., 2 g/hour or more, 3 g/hour or more, 4 g/hour or more, 5 g/hour or more, 10 g/hour or more, 15 g/hour or more, 20 g/hour or more, 25 g/hour or more, 30 g/hour or more, 35 g/hour or more, 40 g/hour or more, 45 g/hour or more, 50 g/hour or more, 55 g/hour or more, 60 g/hour or more, 65 g/hour or more, 70 g/hour or more, 75 g/hour or more, 80 g/hour or more, 85 g/hour or more, 90 g/hour or more, or 95 g/hour or more). In some examples, each of the one or more device(s) independently can process 100 grams of total solids per hour (g/hour) or less (e.g., 95 g/hour or less, 90 g/hour or less, 85 g/hour or less, 80 g/hour or less, 75 g/hour or less, 70 g/hour or less, 65 g/hour or less, 60 g/hour or less, 55 g/hour or less, 50 g/hour or less, 45 g/hour or less, 40 g/hour or less, 35 g/hour or less, 30 g/hour or less, 25 g/hour or less, 20 g/hour or less, 15 g/hour or less, 10 g/hour or less, 5 g/hour or less, 4 g/hour or less, 3 g/hour or less, or less, or 2 g/hour or less). The amount of total solids per hour processed by each of the one or more devices can independently range from any of the minimum values described above to any of the maximum values described above. For example, each of the one or more device(s) independently can process from 1 gram to 100 grams of total solids per hour (e.g., from 1 g/hour to 50 g/hour, from 50 g/hour to 100 g/hour, from 1 g/hour to 20 g/hour, from 20 g/hour to 40 g/hour, from 40 g/hour to 60 g/hour, from 60 g/hour to 80 g/hour, from 80 g/hour to 100 g/hour, from 1 g/hour to 90 g/hour, from 1 g/hour to 80 g/hour, from 1 g/hour to 70 g/hour, from 1 g/hour to 60 g/hour, from 1 g/hour to 40 g/hour, from 1 g/hour to 30 g/hour, from 1 g/hour to 10 g/hour, from 1 g/hour to 5 g/hour, from 5 g/hour to 100 g/hour, from 10 g/hour to 100 g/hour, from 20 g/hour to 100 g/hour, from 30 g/hour to 100 g/hour, from 40 g/hour to 100 g/hour, from 60 g/hour to 100 g/hour, from 70 g/hour to 100 g/hour, from 90 g/hour to 100 g/hour, from 5 g/hour to 95 g/hour, or from 10 g/hour to 90 g/hour).

In some examples, each of the one or more devices is independently operated continuously for an amount of time of 30 minutes or more (e.g., 35 minutes or more, 40 minutes or more, 45 minutes or more, 50 minutes or more, 55 minutes or more, 1 hour or more, 1.5 hours or more, 2 hours or more, 2.5 hours or more, 3 hours or more, 3.5 hours or more, 4 hours or more, 4.5 hours or more, 5 hours or more, 5.5 hours or more, 6 hours or more, 7 hours or more, 8 hours or more, 9 hours or more, 10 hours or more, 11 hours or more, 12 hours or more, 14 hours or more, 16 hours or more, 18 hours or more, 20 hours or more, 22 hours or more, 24 hours or more, 30 hours or more, 36 hours or more, or 42 hours or more). In some examples, each of the one or more devices is independently operated continuously for an amount of time of 48 hours or less (e.g., 42 hours or less, 36 hours or less, 30 hours or less, 24 hours or less, 22 hours or less, 20 hours or less, 18 hours or less, 16 hours or less, 14 hours or less, 12 hours or less, 11 hours or less, 10 hours or less, 9 hours or less, 8 hours or less, 7 hours or less, 6 hours or less, 5.5 hours or less, 5 hours or less, 4.5 hours or less, 4 hours or less, 3.5 hours or less, 3 hours or less, 2.5 hours or less, 2 hours or less, 1.5 hours or less, 1 hour or less, 55 minutes or less, 50 minutes or less, 45 minutes or less, 40 minutes or less, or 35 minutes or less). The amount of time that each device is continuously operated can independently range from any of the minimum values described above to any of the maximum values described above. For example, each of the one or more devices is independently operated continuously for an amount of time of from 30 minutes to 48 hours (e.g., from 30 minutes to 24 hours, from 24 hours to 48 hours, from 30 minutes to 12 hours, from 12 hours to 24 hours, from 24 hours to 36 hours, from 36 hours to 48 hours, from 30 minutes to 42 hours, from 30 minutes to 36 hours, from 30 minutes to 30 hours, from 20 hours to 18 hours, from 30 minutes to 6 hours, from 30 minutes to 4 hours, from 30 minutes to 2 hours, from 1 hour to 48 hours, from 2 hours to 48 hours, from 4 hours to 48 hours, from 6 hours to 48 hours, from 12 hours to 48 hours, from 18 hours to 48 hours, from 30 hours to 48 hours, from 42 hours to 48 hours, from 1 hour to 42 hours, from 2 hours to 36 hours, from 3 hours to 30 hours, or from 4 hours to 24 hours).

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1—Device for the Continuous Separation of Functionalized Magnetic Microparticles A 3D printed device is disclosed that is designed to continuously separate magnetic beads and nonmagnetic solids in fluid flow. The separation device includes one triangular shaped separation chamber with one inlet and two outlets: one for pure, nonmagnetic product, and the other for magnetic solids. Each outlet and the inlet have a tapered connector for attaching flexible tubing. Two bar-shaped permanent magnets are placed around the device, held in place by their attraction to the other magnet and a thin plastic spacer. The magnets are placed on the two large faces of the device spanning the length of the device from the inlet to one outlet to pull the magnetic particles to the upper outlet while nonmagnetic naturally settle into the bottom outlet. Mounting pegs extend from either side of the device that attach to a stand to keep the device stationary during operation.

The device is capable of continuous separation for multiple hours and can be parallelized or ran in series to improve both solids throughput and separation efficiency. The effective solid size range capable of separation is between 10-500 µm. The device can process >10 g solids per hour and can achieve a separation efficiency of >99% in a single pass.

Magnetic force has been used as the driving force for separations on both large and small scales but has yet to be applied continuously at an intermediate scale (Iranmanesh et al. Chem. Soc. Rev. 2017, 46, 5925). Rotating drum separators are used to continuously separate ferro-magnetic ores from nonmagnetic rock, processing tons of material per day (Iranmanesh et al. Chem. Soc. Rev. 2017, 46, 5925). Continuous magnetic separation is also used at nano-scale to separation biomacromolecules or cells tagged with a magnetic marker (Iranmanesh et al. Chem. Soc. Rev. 2017, 46, 5925). However, a continuous magnetic separation not been demonstrated at a scale between nanoparticles and mining operations (e.g., millimeter scale).

Field-flow fractionator has been used to continuously sort paramagnetic nanoparticles based on size (Iranmanesh et al. Chem. Soc. Rev. 2017, 46, 5925). In contrast, the exemplary device is designed to separate magnetic catalyst microparticles (e.g., at least 3 orders of magnitude larger than nanoparticles) with a narrow size distribution from crystalline product with a wide size distribution. Magnetic separation is used in biochemistry to process protein separation and purification, exclusively done in batches (Iranmanesh et al. Chem. Soc. Rev. 2017, 46, 5925). Herein, the exemplary device is configured for separation directly related to the scale of magnetic particles being separated, the continuous operation, and the catalyzed solids-forming reaction application.

The devices described herein can allow for the continuous separation of magnetic particles from nonmagnetic particles in a size range of from 50 µm to greater than 200 µm. The devices described herein allow for separation of magnetic catalysts from crystalline material of similar size and/or density.

Example 2—Device for Continuous Separation of Solid, Magnetic Particles from Nonmagnetic Particles of Similar Size A 3D printed device is disclosed that is designed for the continuous separation of magnetic beads and non-magnetic solids of similar size. The separation device comprises one inlet containing the material to separate and two outlets: one for pure, non-magnetic product and one for magnetic solids. The bulk volume of the device allows for time for the solid phases to separate. A magnet is placed on top of the device to pull the magnetic particles into the top outlet while nonmagnetic particles settle into the bottom outlet.

The device is capable of a continuous separation for multiple hours and can be parallelized or ran in series to improve both solids throughput and separation efficiency. The effective solid size range capable of separation is between 10-500 µm. The device can process >10 g solids per hour and achieve a separation efficiency of >99% in a single pass.

Advantages include, but are not limited to: i) application of computational fluid dynamics packages, ii) device advantageously is arranged at an angle with respect to flow and the long axis of the magnets, or a combination thereof.

This device is useful for solid-solid separations where one solid responds to a magnetic field and the other is nonmagnetic. Separations of solids in the 10 µm to 500 µm range would particularly benefit from this device.

Very few technologies currently exist for solid-solid separation in the 10-1000 µm range. Sieving is common for size based separation, but continuous sieving is non-ideal and typically not done. This device allows for a continuous flow, solid-solid separation of particles that can be identical in size assuming one particle is magnetic or responds to a magnetic field.

Example 3—Continuous Recycling of an Immobilized Biocatalyst in a Solids Forming Reaction by Magnetic Separation β-lactam antibiotics are used in the treatment of bacterial infections. Examples of β-lactam antibiotics include Penicillin G and Cephalosporin C, shown below. Fifteen of the antibiotics in the WHO list of essential medicines are β-lactam antibiotics. From 2000 to 2010, the consumption of cephalosporins increased 94%, primarily in developing countries (Van Boeckel et al. The Lancet Infectious Diseases, 2014, 14(8), 742-750; Klein et al. PNAS 2018, 115, E3463-E3470). Cephalexin is the most consumed cephalosporin worldwide.

Scheme 1. Penicillin G and Cephalosporin C.

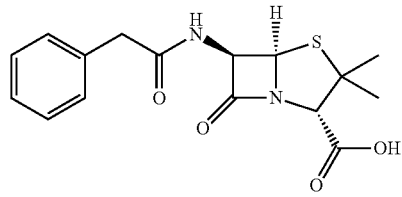

Penicillin G

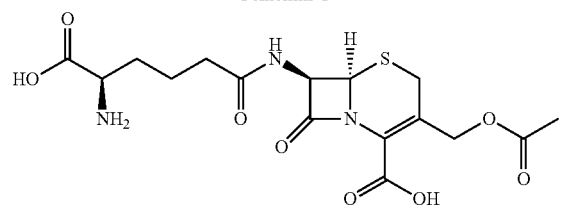

Cephalosporin C

Localized production and increasing demand has led to shortages. Expensive synthesis has led to localized production of β-lactam antibiotics. China is one of the main producers of antibiotics. In the las five years, China has exported $800 m of antibiotics to the US, including penicillin. Localized production and increasing, unpredictable demand leads to potential supply chain issues and shortages (Quadri et al. *Clin Infect Dis.* 2015, 60(12), 1737-42). From 2001-2013, the number of shortage months for cephalosporin and penicillin were almost 450 and almost 300, respectively.

Figure 8:
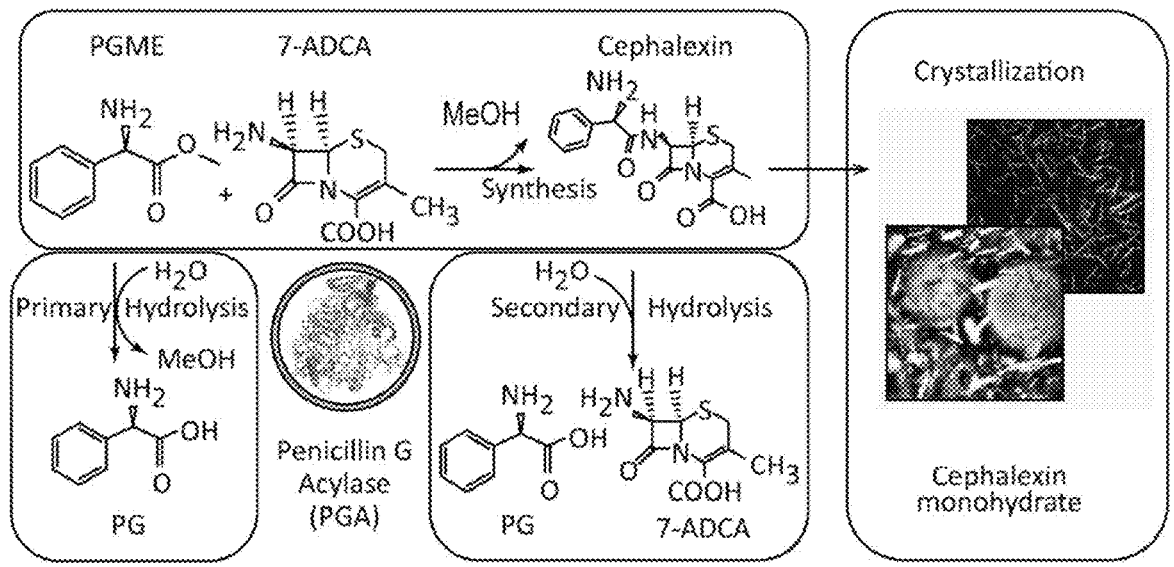
FIG. 8. Reactive crystallization scheme for synthesis of cephalexin as well as side hydrolysis reactions and crystallization of cephalexin monohydrate.

Enzymatic synthesis and crystallization of β-lactam antibiotics is shown schematically in FIG. 8 (Encarnación-Gómez et al. *React Chem Eng* 2016, 1, 321-9; McDonald et al. *Chem Eng Soc* 2017, 165, 81-88).

Figure 9:
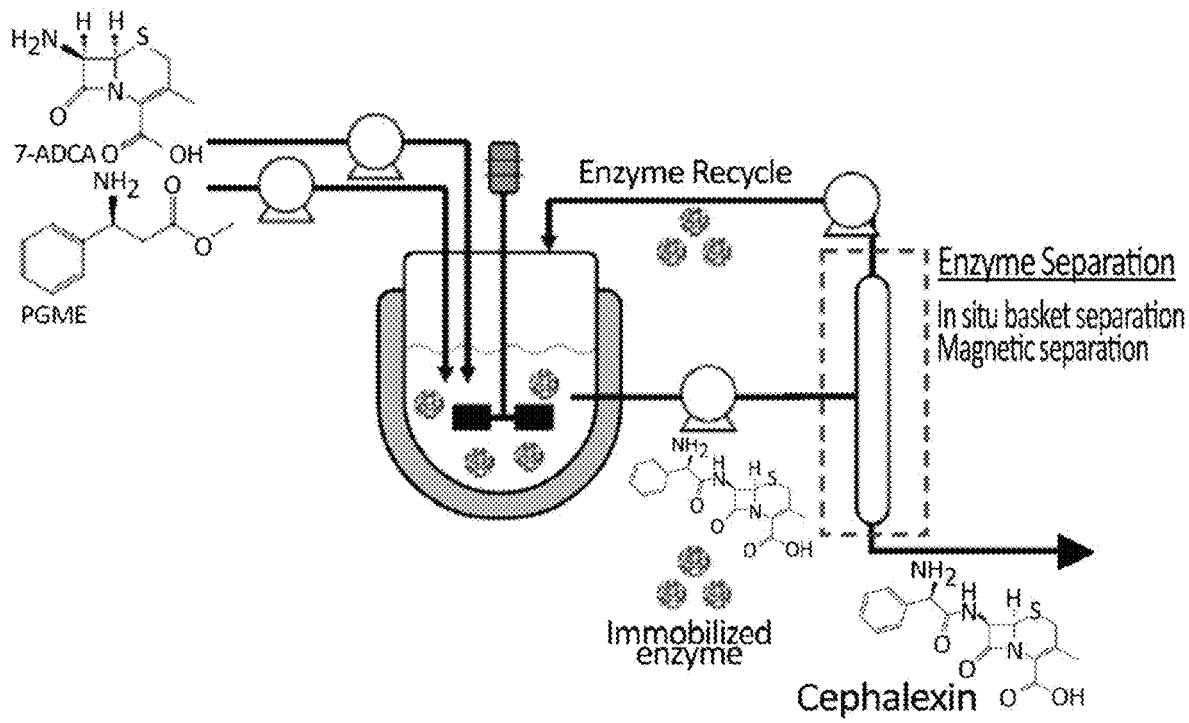
FIG. 9. Process flow diagram for pilot-scale reactive crystallization of cephalexin with magnetic separation.

The continuous synthesis and crystallization of β-lactam antibiotics is shown schematically in FIG. 9. The presence of an immobilized catalyst and crystallizing product creates a unique solid-solid separation design problem.

Figure 10:
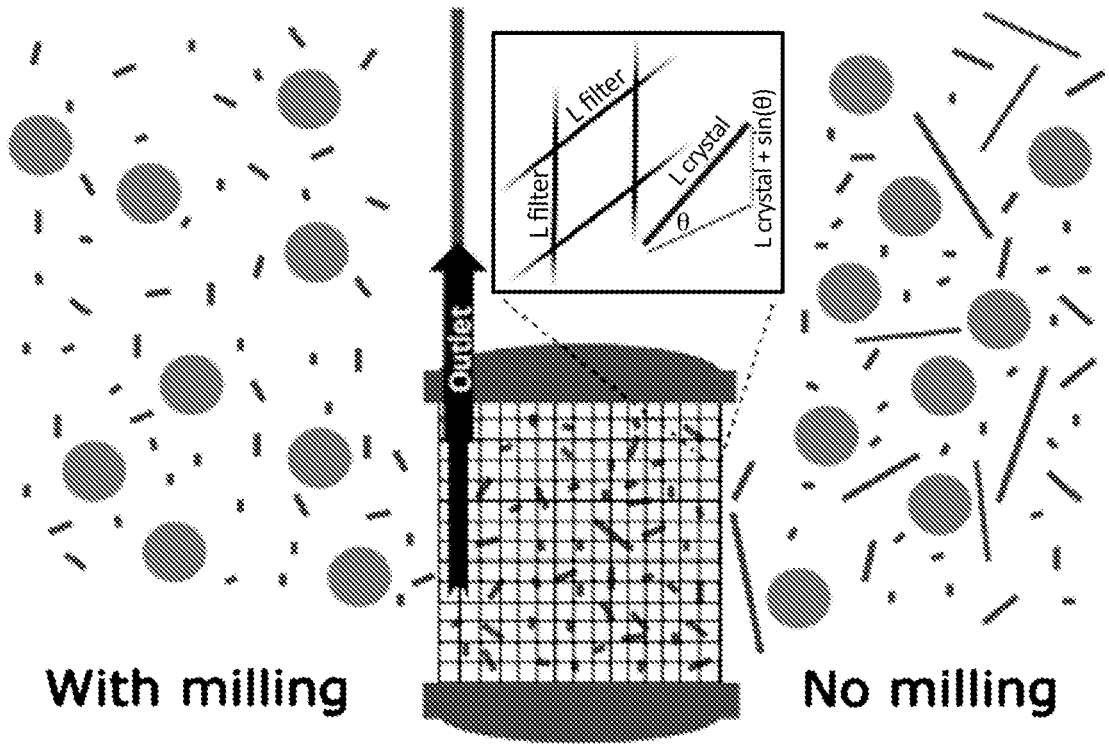
FIG. 10. Schematic diagram of in situ basket separation.
Figure 11:
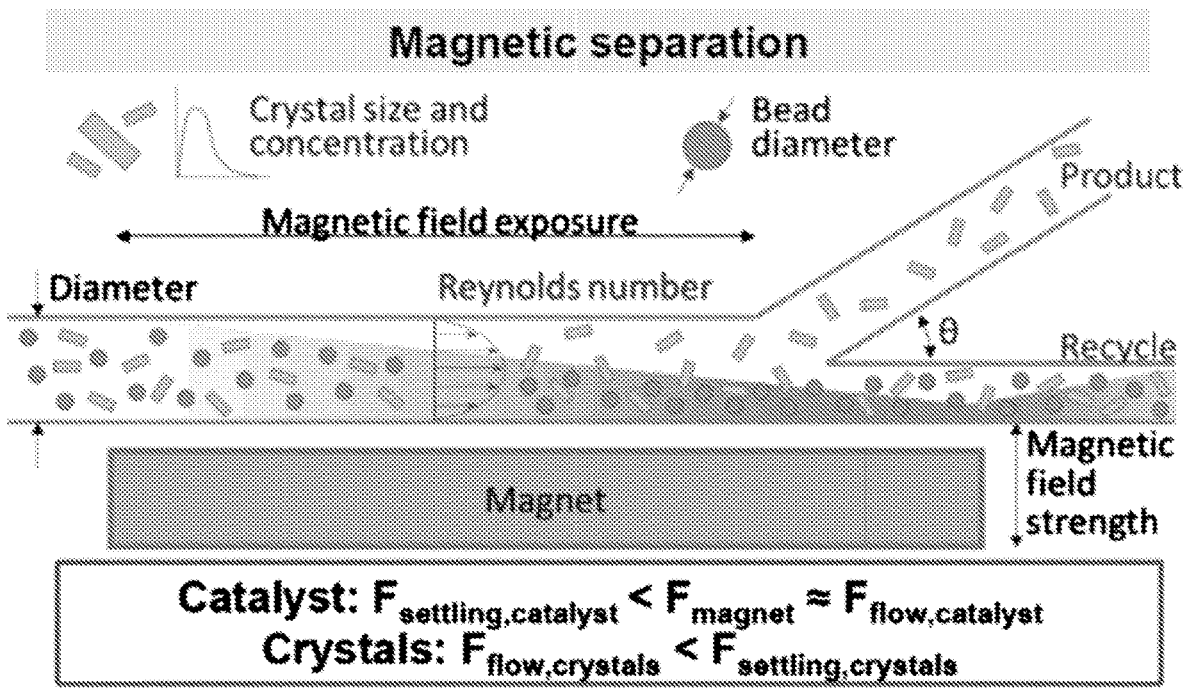
FIG. 11. Schematic diagram of magnetic separation using an example device as disclosed herein according to one implementation.

In situ basket separation limits the design of catalyst beads (FIG. 10). Disclosed herein are devices, systems, and methods of magnetic separation that can address these and other needs (FIG. 11).

Figure 12:
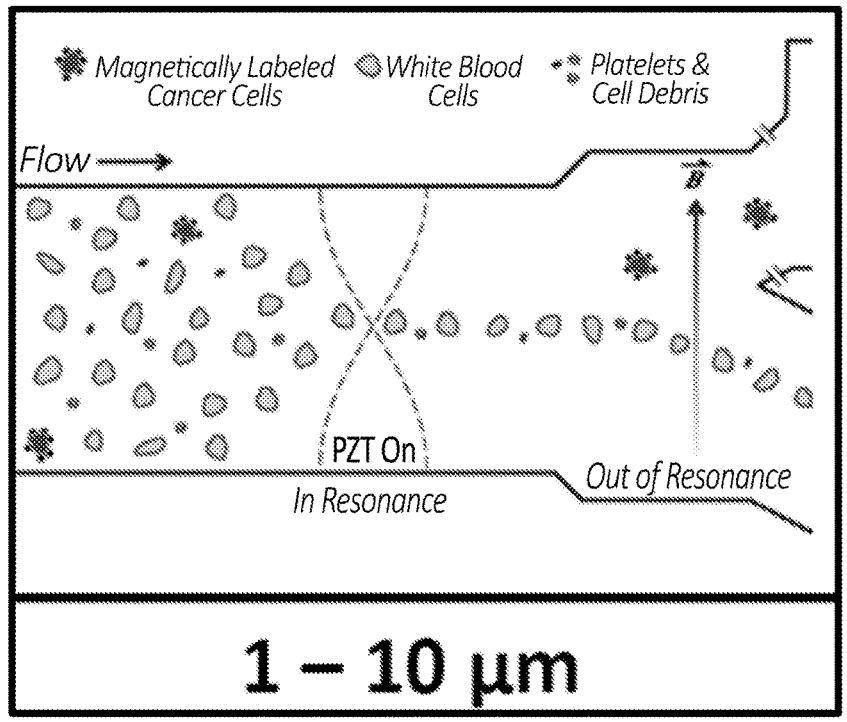
FIG. 12. Schematic diagram of magnetic separation of 1-10 μm sized particles.
Figure 13:
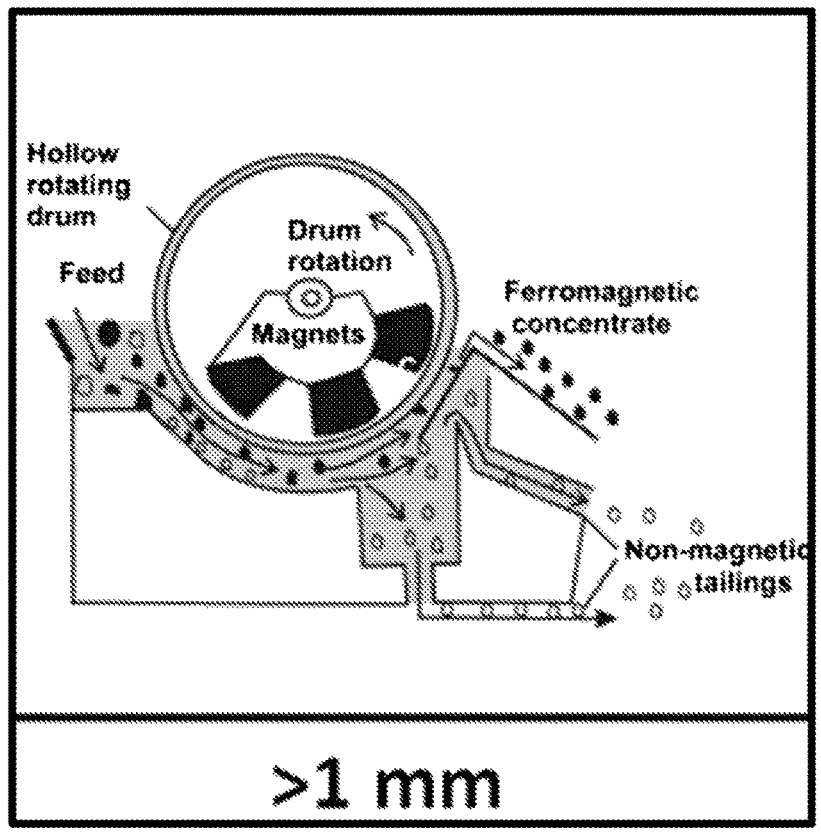
FIG. 13. Schematic diagram of magnetic separation of >1 mm sized particles
Figure 14:
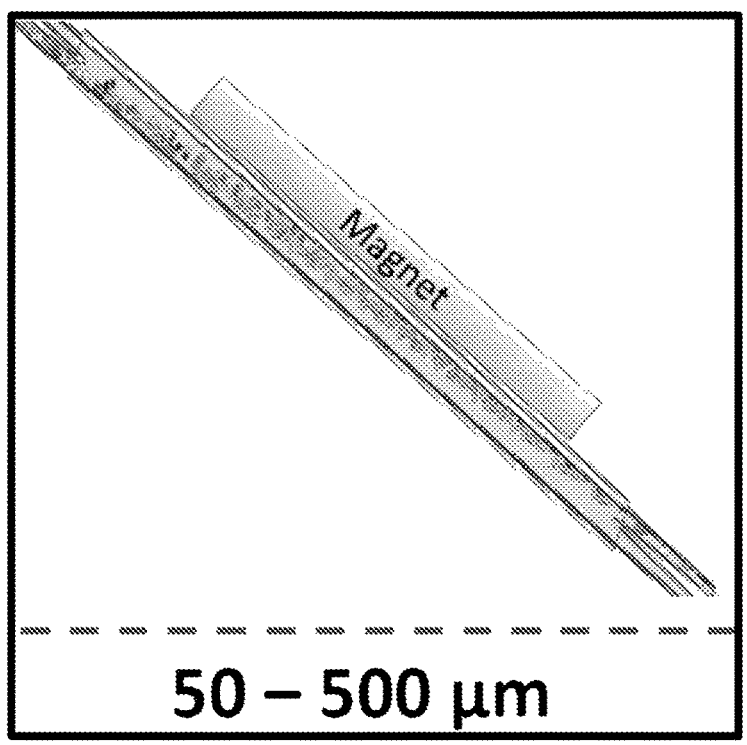
FIG. 14. Schematic diagram of magnetic separation of 50-500 μm particles using an example device as disclosed herein according to one implementation.

Magnetic separations are common, but are currently limited in scale and/or to particles of a certain size (FIG. 12 and FIG. 13) (Shields et al. *Lap Chip* 2016, 16, 3833-3844). The devices, systems, and methods disclosed herein can address these and other needs (FIG. 14).

Several iterations of the devices were fabricated and tested.

Figure 15:
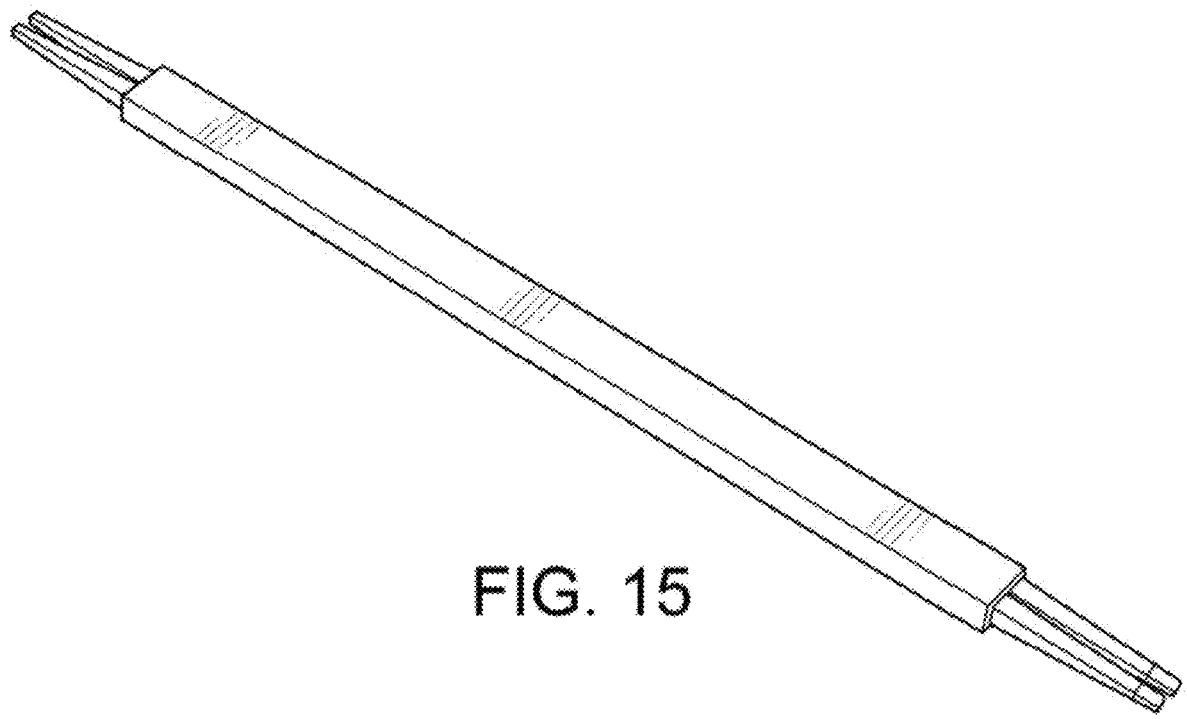
FIG. 15. A schematic view of an example device as disclosed herein according to one implementation.
Figure 16:
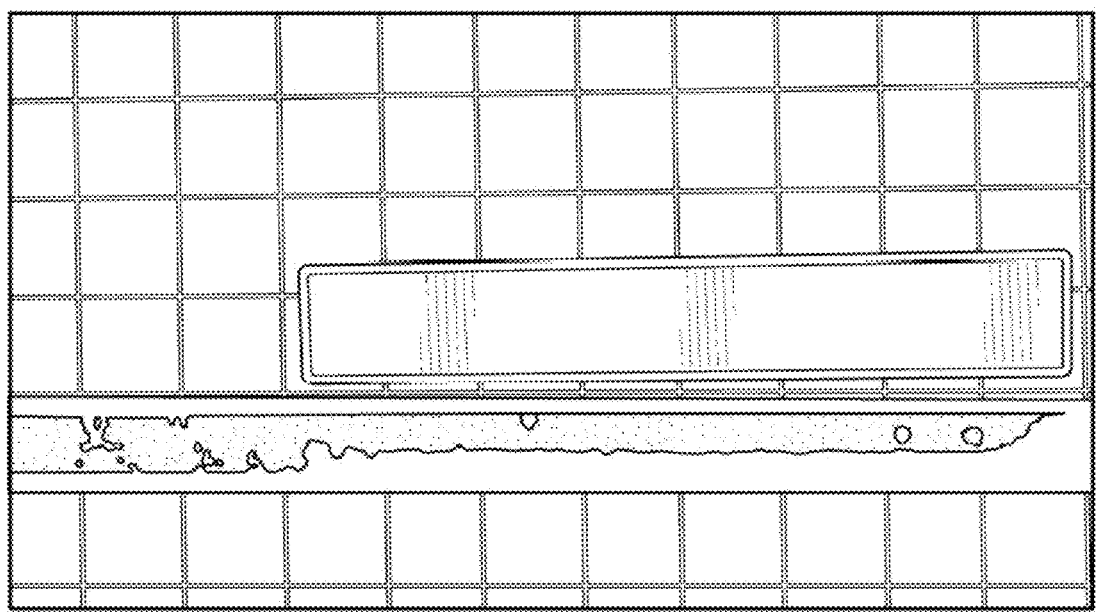
FIG. 16. Photograph of a magnetic separation using an example device as disclosed herein according to one implementation.
Figure 17:
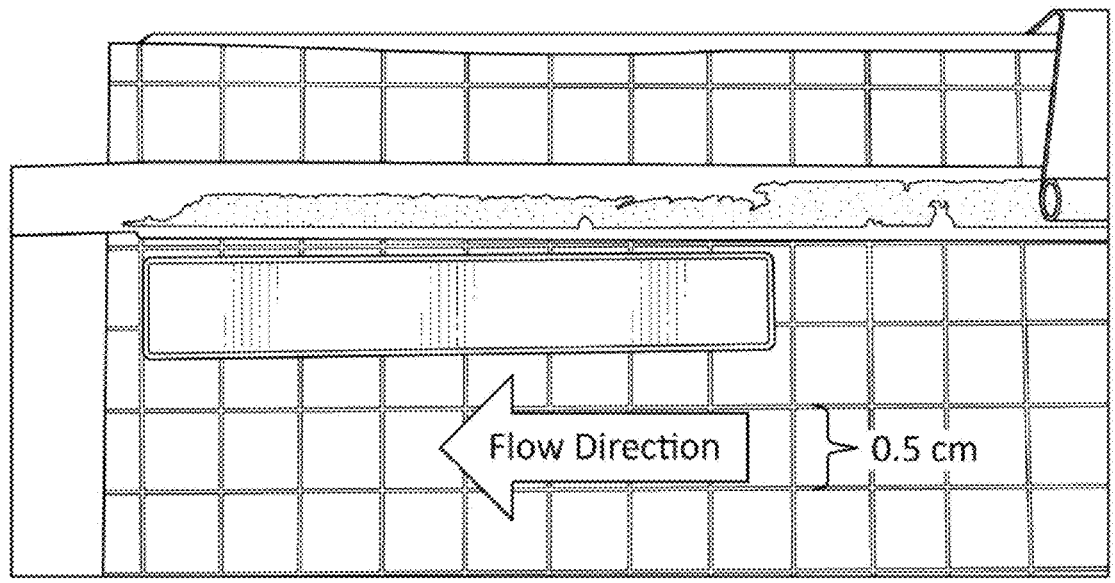
FIG. 17. Photograph of a magnetic separation using an example device as disclosed herein according to one implementation.

A photograph of an example of a first iteration of a separation device as described herein is shown in FIG. 15. Initial test of this device involved 212 μm magnetic and nonmagnetic beads. However, during operation, bead clumping was observed around the magnet which altered flow patterns in the device (FIG. 16 and FIG. 17).

Figure 18:
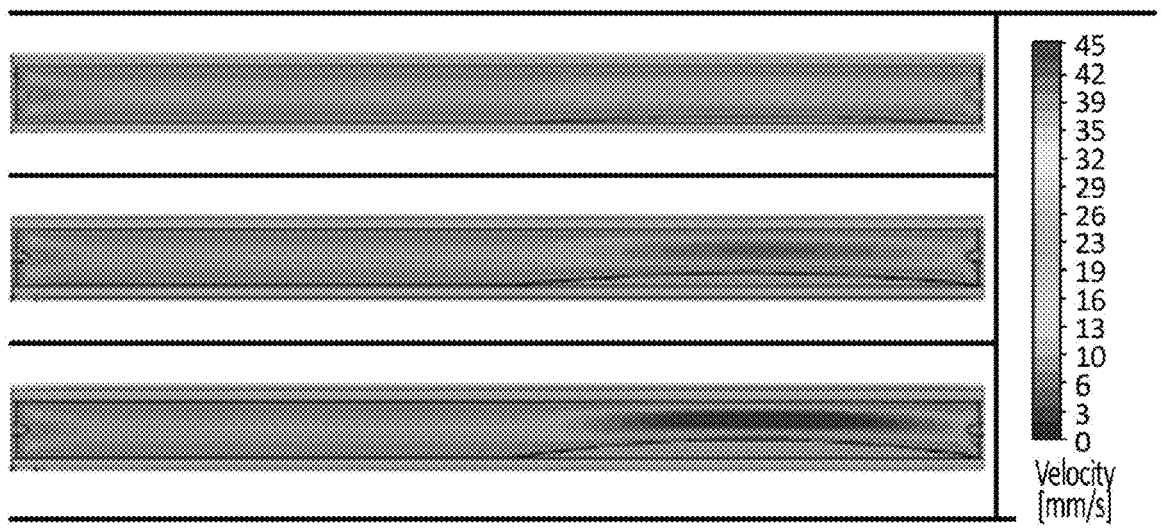
FIG. 18. Simulations showing effect of particle accumulation around magnet.
Figure 19:
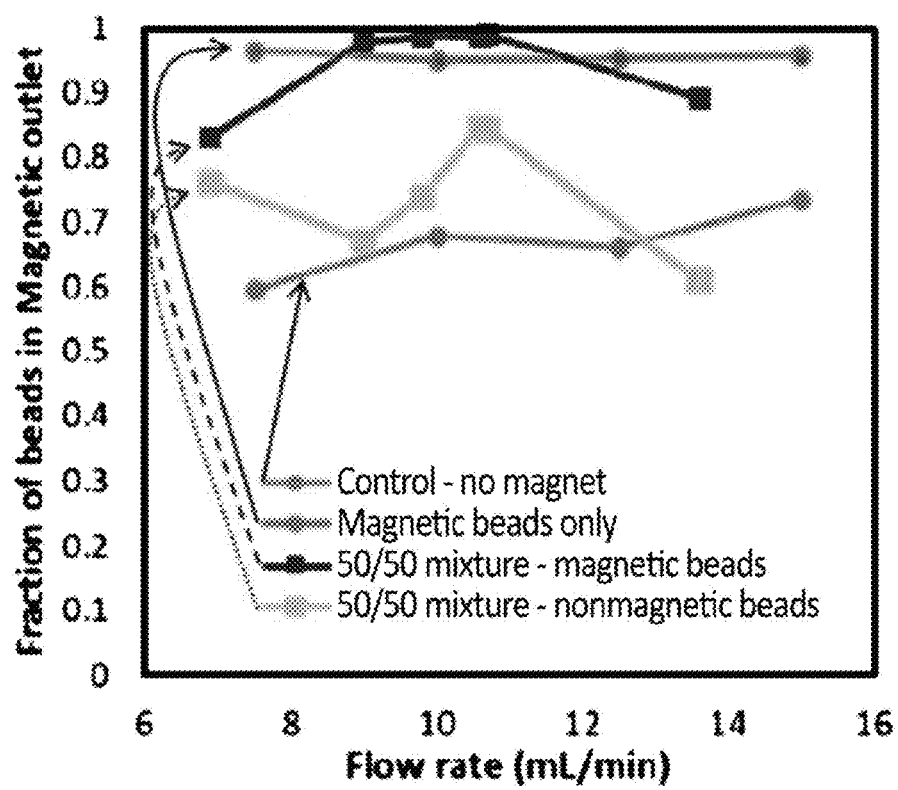
FIG. 19. Separation data for a magnetic separation using an example device as disclosed herein according to one implementation.

CFD simulations show the impact of clumping on fluid velocity in the device (FIG. 18). High separation efficiency was still observed at intermediate flow rates, but a large amount of nonmagnetic beads were also recycled (FIG. 19).

Figure 20:
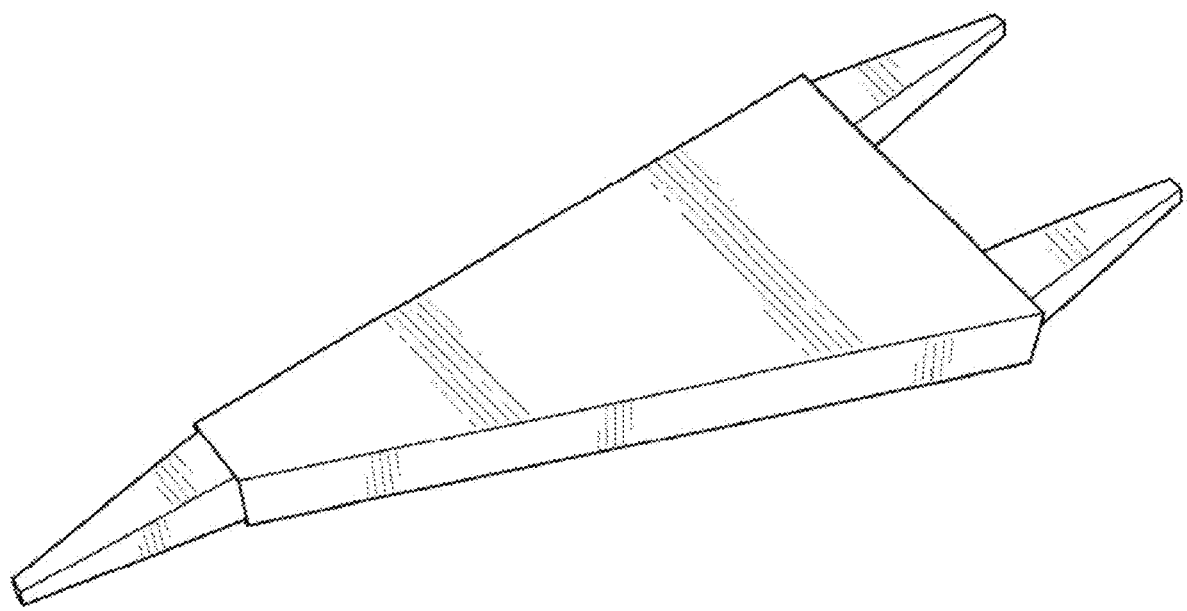
FIG. 20. A schematic view of an example device as disclosed herein according to one implementation.
Figure 21:
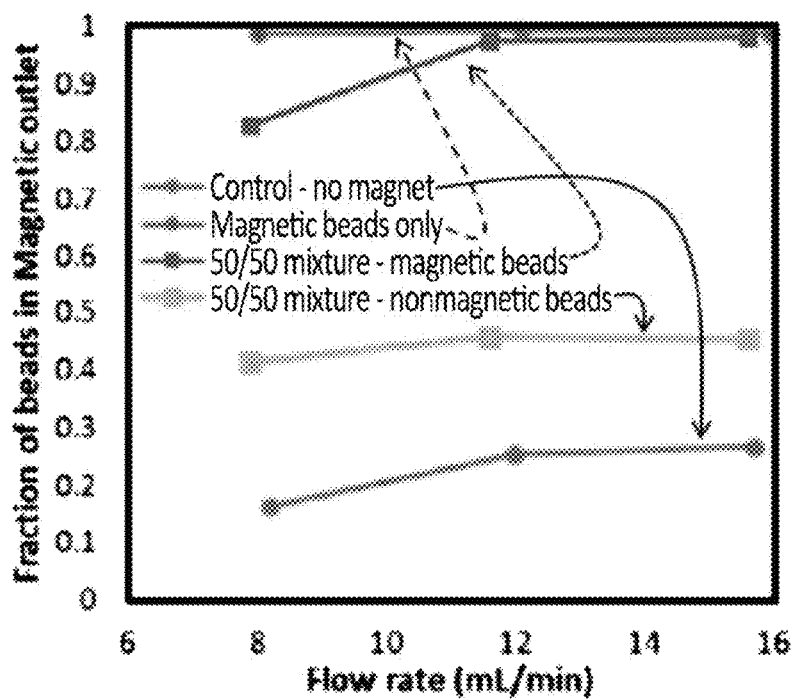
FIG. 21. Separation data for a magnetic separation using an example device as disclosed herein according to one implementation.
Figure 22:
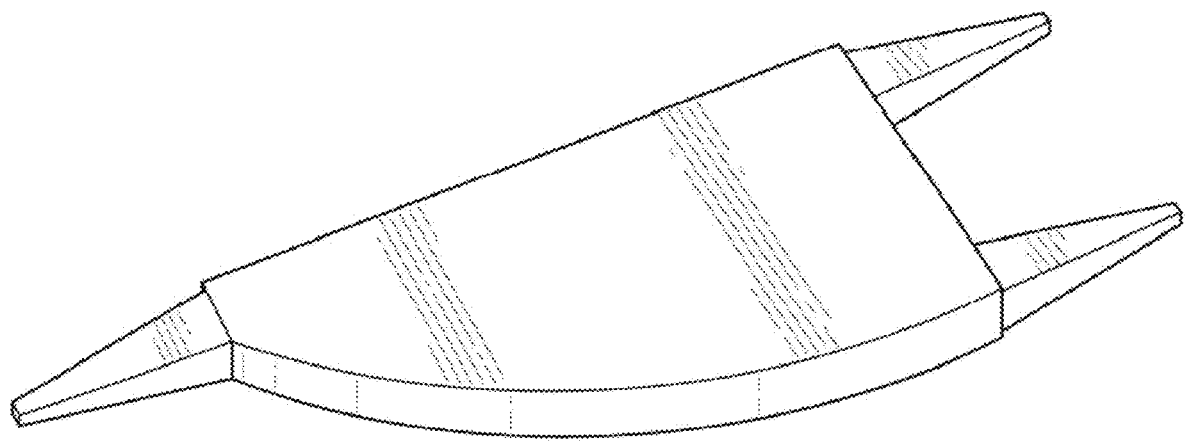
FIG. 22. A schematic view of an example device as disclosed herein according to one implementation.
Figure 23:
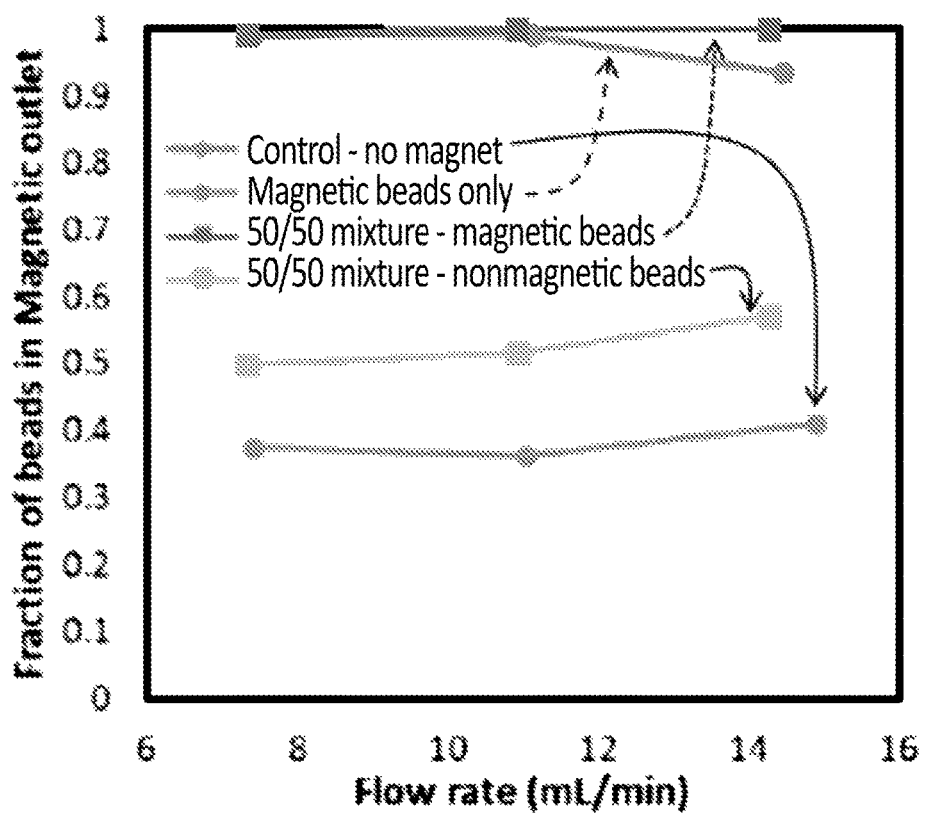
FIG. 23. Separation data for a magnetic separation using an example device as disclosed herein according to one implementation.

Two versions of a second iteration of the device were designed to alleviate settling issues (FIG. 20 and FIG. 22). Both iterations greatly improved separation relative to the first iteration (FIG. 21 and FIG. 23). Both iterations exhibited near perfect separation with crystals (FIG. 21 and FIG. 23). The triangular shaped device (FIG. 20) exhibited a lower retention of nonmagnetic spheres (FIG. 21). Both of the second iteration devices (FIG. 20 and FIG. 22) had a low separation efficiency on 60 μm particles (~55%) (FIG. 21 and FIG. 23), though this was still an improvement relative to the device of FIG. 15.

Figure 24:
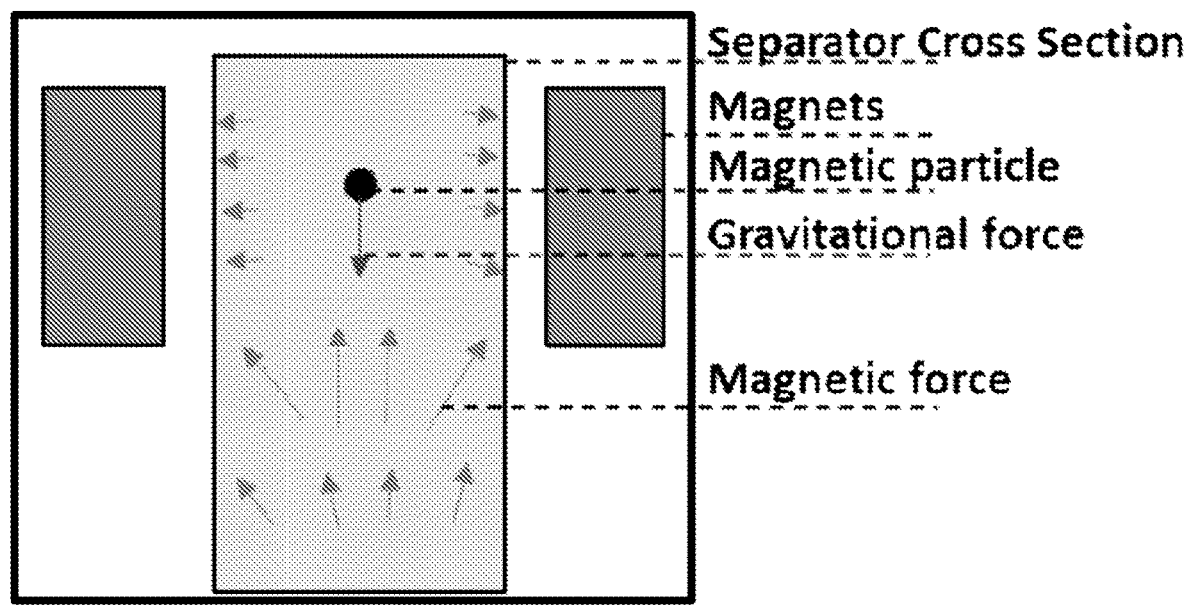
FIG. 24. Schematic diagram of the forces acting on the magnetic particles in an example device wherein two magnets are placed proximate opposing faces of the device.

A schematic diagram of the forces acting on the magnetic particles in the devices wherein two magnets are placed proximate opposing faces of the devices is shown in FIG. 24.

Figure 25:
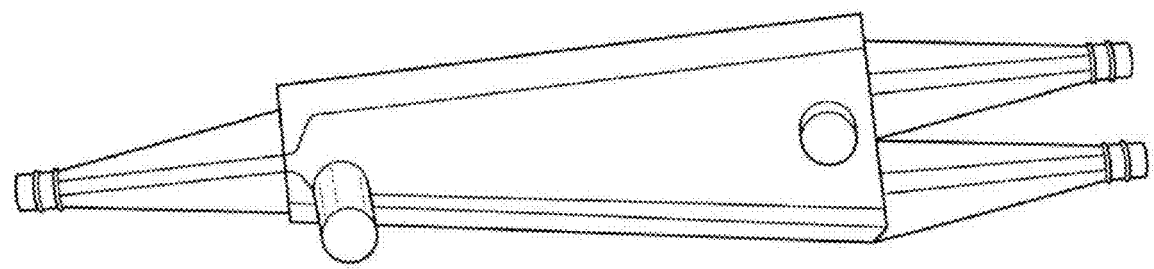
FIG. 25. A schematic view of an example device as disclosed herein according to one implementation.

A third iteration of the device was designed that reduced the device volume for increased fluid velocity (FIG. 25). This iteration of the device had a 66% reduction in volume relative to the device of FIG. 20. This iteration of the device allowed for separation of much smaller magnetic particles (<100 μm) (FIG. 26), while previous devices were unable to separate beads <200 μm efficiently.

Figure 26:
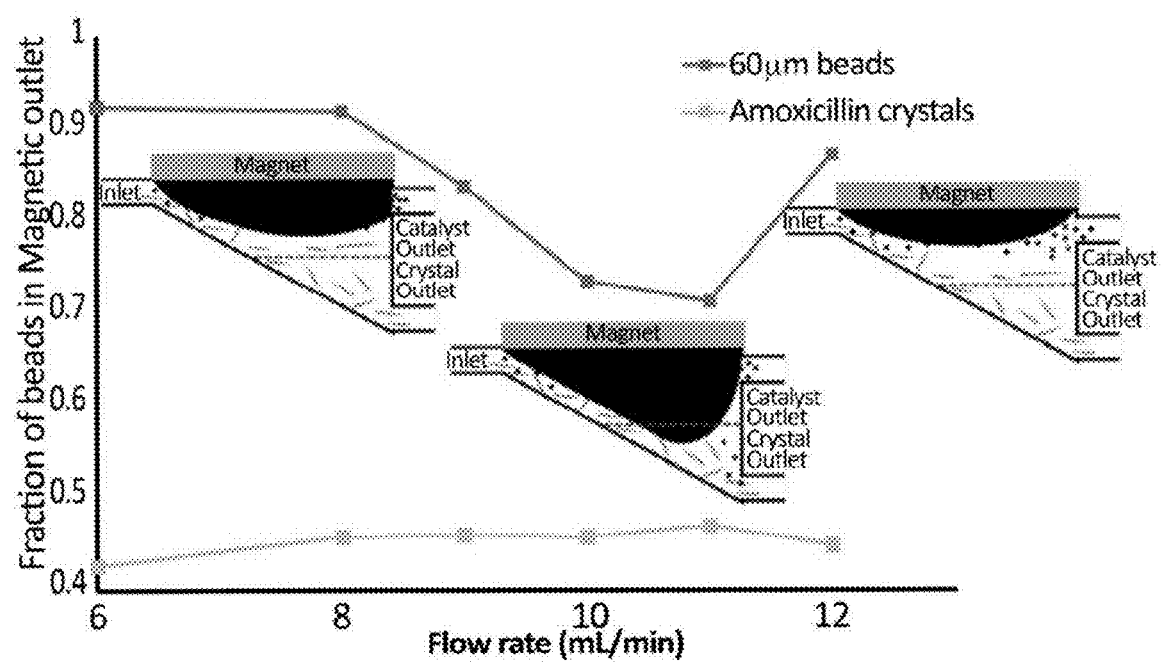
FIG. 26. Separation data for a magnetic separation using an example device as disclosed herein according to one implementation.
Figure 27:
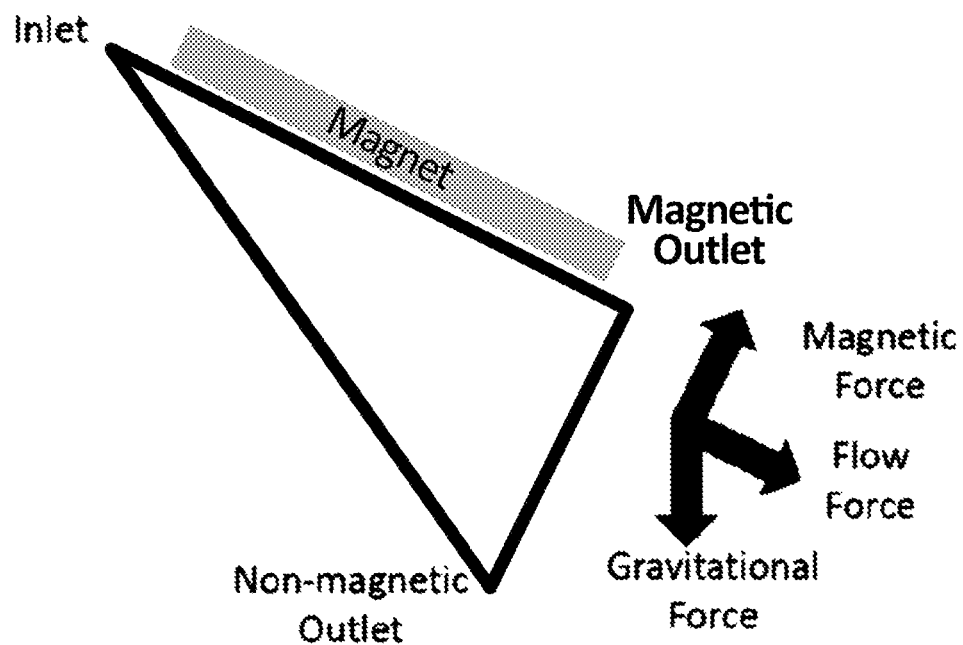
FIG. 27. A schematic view of an example device as disclosed herein according to one implementation.
Figure 28:
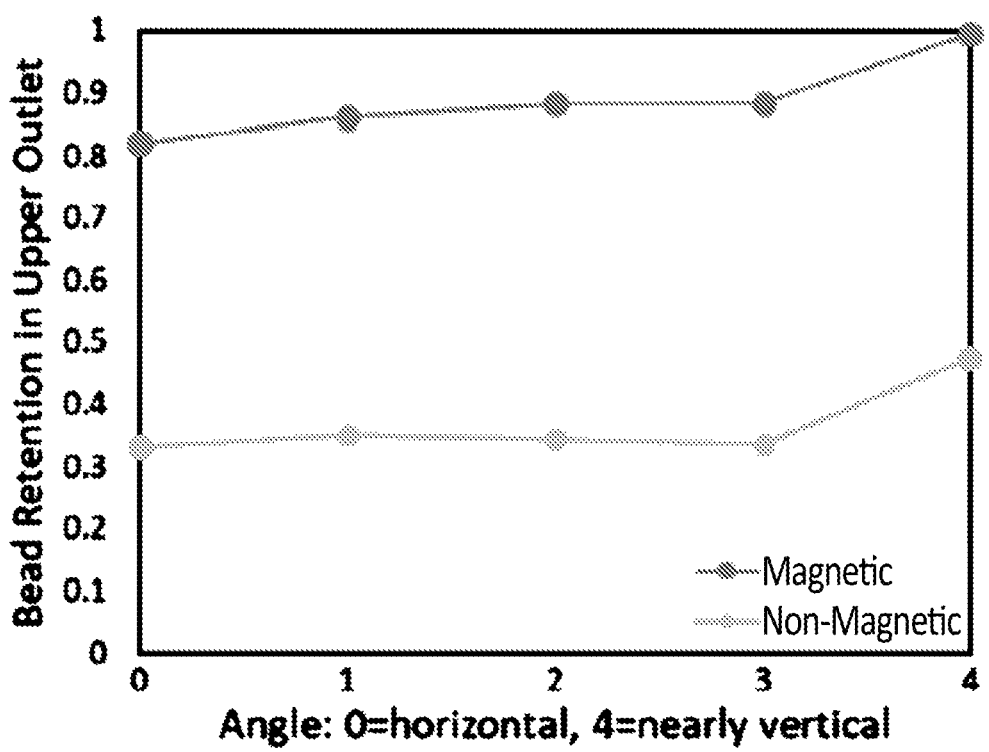
FIG. 28. Separation data for a magnetic separation using an example device as disclosed herein according to one implementation.

Use of gravity lowers non-magnetic (crystal) retention, but reduces magnetic retention. Magnetic beads tend to clump around magnet (FIG. 26). Angling of the device was investigated (FIG. 27) and was found to improve separation performance. Angling the device reduces clumping but increases non-magnetic retention (FIG. 28).

Figure 29:
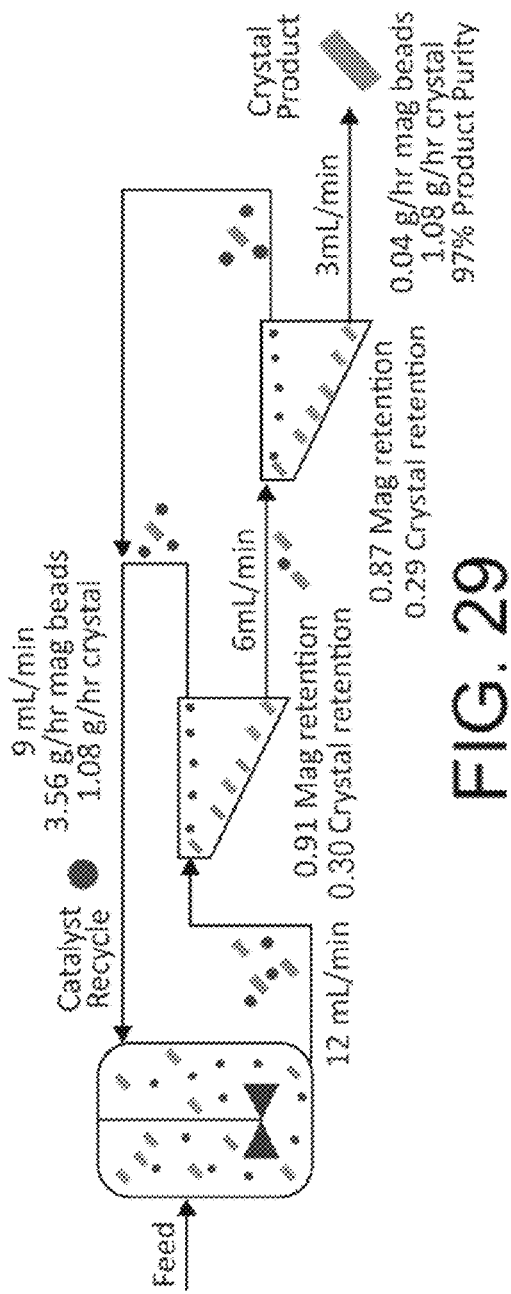
FIG. 29. Schematic diagram of a process flow using two devices connected in serial for a continuous flow separation.
Figure 30:
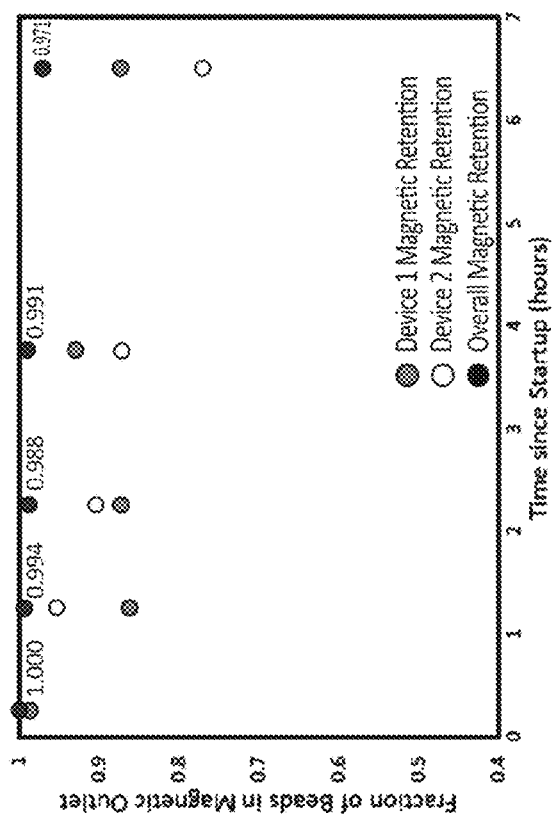
FIG. 30. Separation data for a magnetic separation using an example system as disclosed herein according to one implementation.

Long-term use of devices in series are promising for continuous pilot plant. FIG. 29 shows an operation of the device for continuous operation. The continuous operation of multiple devices in series over 6 hours (>700 residence times) resulted in 97% pure amoxicillin crystals with 3% of magnetic beads remaining (FIG. 30). A magnetic trap can be used to retain the remaining magnetic particles for recycle.

Magnetic separation could allow for efficient solid-solid separation of magnetic catalysts and crystalline product. Iterative simulation and design helped create final device design to minimize issues with previous iterations. An example of the device has been tested and shown able to operate in series separate particles at >99% efficiency for at least 4 hours.

Example 4—Continuous Recycling of an Immobilized Biocatalyst in a Solids Forming Reaction by Magnetic Separation Introduction. Continuous manufacturing has many advantages over batch-wise processes, especially in the pharmaceutical arena. The FDA is encouraging research into continuous manufacturing as a means of improving drug quality and manufacturers expect improvements in process economics to accompany the transition from batch to continuous. The success of recent efforts to move commercial production, at least in part, to a continuous setup is promising, but significant work is needed to reach end-to-end continuous manufacturing, especially for challenging chemistries. Biocatalysts, such as enzymes, have made some difficult chemistries possible thanks to their unmatched specificity and selectivity.

Use of a biocatalyst in a continuous process requires that the enzyme be recycled or otherwise retained within the reactor. So far, this has been accomplished in three ways: ultrafiltration, immobilization on beads with filtration, and immobilization on a fixed substrate. In ultrafiltration, a membrane allows low molecular weight products to pass through the reactor while the high molecular weight catalyst is retained. With immobilization on beads, a frit is used to keep beads in the reactor while the solution is filtered and sent on for further processing. For immobilization on a fixed substrate, often beads in a packed bed or fibers in a tubular module, the reaction takes place as the solution is pumped through the module. None of these methods are amenable to solids-forming reactions; solids cannot permeate an ultrafilter, nor can they pass through a frit, and they will quickly choke a packed bed or hollow fiber.

This study was inspired by the reactive crystallization of beta-lactam antibiotics, whereby penicillin G acylase (PGA) converts solution-phase reactants into antibiotics which subsequently form needle-shaped crystals. Herein, the design of a continuous separator is detailed, from dimensional analysis to computational fluids dynamics (CFD) simulations to iterative rapid prototyping with additive manufacturing. There are many other examples of biocatalytic reactions that form solids for which the proposed devices, systems, and methods could be practical (Wegman M A et al. *Biotechnology and bioengineering* 2002, 79, 356-361; Buque-Taboada E M et al. *Biotechnology and Bioengineering* 2004, 86, 795-800; Hurh B et al. *Journal of fermentation and bioengineering* 1994, 77, 382-385; Würges K et al. *Advanced Synthesis & Catalysis* 1994, 353, 2431-2438; Cho B K et al. *Biotechnology and Bioprocess Engineering* 2006, 11, 299-305). One can also imagine immobilizing metal/organometallic catalysts in a similar manner for continuous solid-solid separation.

A magnetic based separation offered several benefits over other solid-solid separations. The simplest separator, a sieve, requires that the catalyst be significantly larger than the solid products. As the size of the catalyst increases, the effectiveness factor decreases such that a practical sieve-based separation, based on the observed product crystal sizes, requires an impractically large catalyst. Buoyancy-force-based separation in a settler requires large beads and a significant difference in density between the product and catalyst. However, to load the required amount of enzyme on the beads requires a high surface area immobilization substrate, either small beads or high-porosity low-density beads. Drag-force-based separation, for example in an elutriator or hydrocyclone, is difficult to scale down to the continuous pharmaceutical scale, however recent progress has been made (Syed M S et al. *Lab on a Chip* 2017, 17, 2459-2469). Magnetic separation is based on a field only felt by the particles to be retained, independent of particle size and density, enabling finer control.

Traditional solid-solid separations rely on significant differences in the physical properties of the product and catalyst particles, namely, size and density. However, in this application, the product particles are needle-like, and the size and density of the catalyst particles are mostly constrained by the required enzyme concentration in the reactor. These facts severely complicate most separation methods such as sieves, settling tanks, hydro-cyclones, and elutriators because a difference in size or density between product and catalyst large enough for a high efficiency separation required in pharmaceutical processes may not be possible. By using magnetic separation, a magnetic force is felt by only the catalyst particles and not the product particles. This magnetic force only depends on the magnetic field and the magnetic properties of the catalyst particles. Therefore, it is possible to leverage this magnetic force to drive a high-efficiency separation between product and catalyst. This creates a high purity product stream in very few steps and allows the biocatalyst to be recycled into the reactor.

Magnetic separation has been implemented in several prior systems, however the application detailed here differs because it is continuous and implemented at the pharmaceutical pilot plant scale. There are many published examples of magnetic biocatalysts being used in batch processes, including for the enzyme used in this study, penicillin G acylase, or PGA (Luo X et al. *Biomacromolecules* 2010, 11, 2896-2903; Netto C G et al. *Journal of Molecular Catalysis B: Enzymatic* 2013, 85, 71-92; Liu R et al. *International Journal of Biological Macromolecules* 2020, 162, 1587-1596). Magnetic separation has also been utilized for sorting cells; by conjugating antibodies to magnetic particles cells presenting particular antigens can be selected based on their movement in a magnetic field (Pamme N et al. *Lab on a Chip* 2006, 6, 974-980; Guo P L et al. *Biosensors and Bioelectronics* 2015, 74, 628-636; Zborowski M et al. *Journal of Magnetism and Magnetic Materials* 1999, 194, 224-230). Pamme et al. designed a continuous microfluidic device for deflecting magnetic particles from non-magnetic particles (Pamme N et al. *Analytical Chemistry* 2004, 76, 7250-7256). Herein, starting with a similar configuration to the microfluidic device, a new device is designed to work at four orders of magnitude greater throughput. The utility of the separator is demonstrated in the continuous reactive crystallization of beta-lactam antibiotics.

Background, materials, and methods. This study can be divided into four interconnected parts: (1) dimensional analysis and Buckingham $\pi$ theory, (2) CFD simulations, (3) iterative prototyping and testing, and (4) demonstration with a solids-forming reaction.

Figure 31:
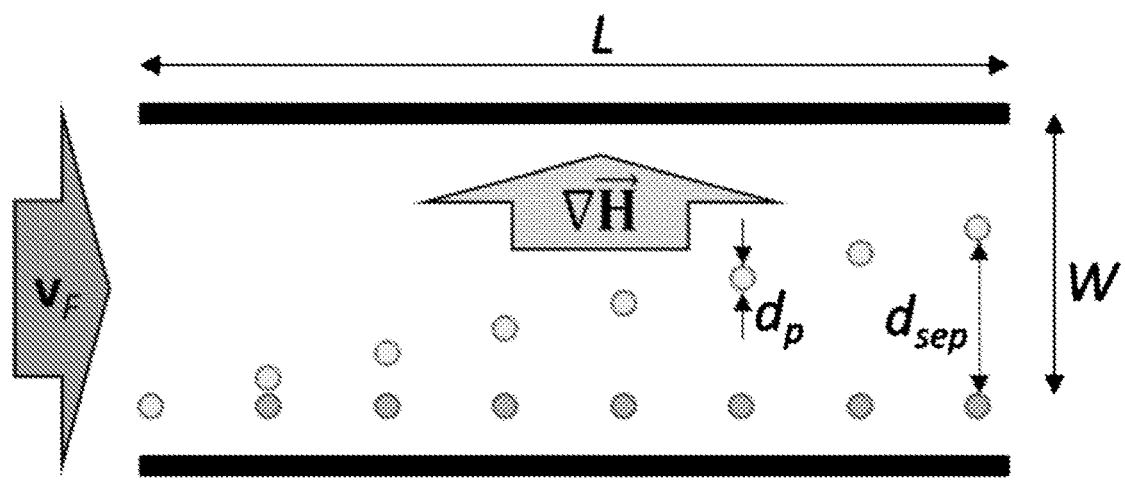
FIG. 31. Visualization of a hypothetical separator with uniform flow velocity ($v_F$), magnetic field (shown as the gradient of the magnetic field $\nabla H$), length (L), and width (W). Magnetic particles are shaded yellow and non-magnetic particles are shaded grey.

Buckingham $\pi$ theory. Buckingham $\pi$ theory is used to surmise a functional form for the equations describing the magnetic separation. For the design of the initial device, similar to previous studies (Pamme N et al. *Analytical Chemistry* 2004, 76, 7250-7256), the dimensionless quantity $d_{sep}/W$ was chosen to quantify performance, where $d_{sep}$ is the distance by which a magnetic particle would be separated from a non-magnetic particle at the outlet of the device, and W is the width of the device. If $d_{sep}/W=0$ there is no separation, if $d_{sep}/W=1$ there is perfect separation, and if $d_{sep}/W>1$ there is too much deflection, which could result in particles adhering to the separator wall. FIG. 31 shows the conceptualization of $d_{sep}/W$ in a hypothetical separator with uniform flow ($v_F$), magnetic field ($\vec{H}$), length (L), and width (W). The magnetic field was simulated based on the known performance of the N52 grade permanent magnets used (magnetic moment m=3.53 A/m$^2$, relative permeability $\mu_r$=1.05).

Computational fluid dynamics simulations. Computational fluid dynamics simulations were conducted with SOLIDWORKS Flow Simulation, an embedded package for SOLIDWORKS 3D CAD software. This aided the iterative design process by streamlining the modeling, simulating, and printing cycle into one application. An advantage of fluid simulations is lessening the number of design cycles it takes to optimize a separator.

SOLIDWORKS Flow Simulation employs time-dependent Reynolds-averaged 3D Navier-Stokes equations and k-e turbulence model as the foundations for the fluid simulation. Transient equations are solved by using local time-steps. The software includes boundary layer modeling for laminar, turbulent, and transitional boundary layers. Calculations for friction, heat transfer, and flow separation are also available, although they were not used in this analysis (https://www.solidworks.com/sw/docs/Flow_Basis_of_CAD_Embedded_CFD_Whitepaper.pdf).

Mesh generation can be an important step in conducting CFD simulations because it affects the precision and convergence of the solution. SOLIDWORKS generates a basic cubic mesh in the computational region defined by the model geometry, then, this mesh is refined by splitting the basic cell into 8 smaller cells automatically according to the solution gradient or in specified regions such as near the walls of the device. A moderately fine mesh with local refinement near the interior walls of each device was used in each flow simulation.

Inlet and outlet velocities were defined as the primary boundary conditions for the flow simulations because inlet and outlet flow are parameters that can be easily measured and controlled in testing. SOLIDWORKS also requires the user to indicate a pressure boundary condition, so the non-magnetic outlet was always specified at environmental pressure. In each simulation, inlet velocity(s), velocity of the magnetic outlet, and pressure of non-magnetic outlet were specified.

SOLIDWORKS Flow Simulation requires the user to define at least one "Goal" for the simulation. These Goals are used for convergence control, stopping criteria for the solver, and to summarize the most important results from the simulation. In each simulation, an Equation Goal was created that required the simulation to provide a solution in which the mass continuity equation was satisfied; That is, the mass flow rate at the inlets minus the mass flow rates at the outlets must equal zero. This also applies to both steady state simulations and to each time step in a time-dependent simulation.

The Particle Study is another feature that simulates the motion of spherical particles injected into the fluid. This provides a prediction of how particles will separate and settle within a device under any given flow condition. Solid and liquid particles can be simulated with specified diameters, material properties, and wall conditions. Although the flow simulation does not support a way to model magnetic influences on certain particles, the gravity constant and particle densities can be manipulated to create a net buoyant or sinking force on the particles approximately equal to the average magnetic force across the width of the device. This method was demonstrated to give a sufficient approximation for how magnetic particles move within a device with accommodating geometry. Results from these particle studies were used to estimate the fraction of different types of particles that will appear in each outlet stream and settle within the device.

Two types of CFD simulation were used, steady state and transient flow. Steady state simulations are meant to simulate the ideal separator, with smooth flow and no accumulation of particles. Transient flow was used to simulate the periodic nature of the peristaltic pump used in the physical experiments. Velocity data and particle study results were analyzed to predict how the real device will perform and understand how to improve subsequent designs.

Simulations were used in conjunction with physical experiments in an iterative fashion. A device is simulated, it is then evaluated at various flow rates and bead concentrations, observations from experiments are incorporated into the simulations, and finally a new device is designed, simulated, and printed thus restarting the cycle.

Iterative prototyping and testing. The decision to study magnetic separation for the beta-lactam pilot plant was made after a test using a flexible tube wrapped around a stack of disk magnets with a y-split showed that magnetic beads could be separated out from a stream of non-magnetic beads producing a pure non-magnetic stream, however, this result was difficult to reproduce consistently. It was clear that the magnetic forces needed to be studied in more detail to repeat the separation consistently.

Additive manufacturing enables rapid cycling between simulation, evaluation, and redesign. Stereolithographic printing with detail of 50 µm of glass fiber impregnated resin afforded durable, high-detail devices. For a final device a bio-pharmaceutical-compatible resin should be used; however, for initial testing this was unnecessary.

For initial separator design inert paramagnetic and non-magnetic polyethylene spherical beads measuring 212-250 µm or 53-63 µm in diameter were studied (Cospheric, Santa Barbara, CA). The larger beads were used in initial experiments as individual beads are discernable, the smaller beads were used to simulate crystals. The magnetic susceptibility of the paramagnetic beads was determined with settling experiments where a magnet of known strength was placed at the bottom of a settling chamber filled with water-ethanol solutions of known density and viscosity. The beads were tracked with a slow-motion capture camera and their displacement tracked over time. A force balance was used to calculate the magnetic force from the acceleration, buoyant force, and drag force. The drag force was correlated to the particle Reynolds number. The magnetic susceptibility ($\chi$) was determined. The magnetic force $F_m$ is defined as:

$$F_m = \frac{\mu_0 V_P \chi}{2} \nabla H^2$$

where $\mu_0$ is the permeability of free space and $V_P$ is the volume of a particle. For the purpose of particle studies, the magnetic force was approximated as a constant force across the width of the device.

Amoxicillin was used as the model crystal for crystal/biocatalyst separation studies. Amoxicillin is needle-like in shape, with a tendency to form spherulites and agglomerates in high supersaturation. It can grow to >1000 µm in length but most crystals measure a few hundred µm in length by 10-20 µm in width, giving them an average equivalent spherical diameter of approximately 50 µm.

A brief description of the device testing procedure is given below. An Ismatec Reglo ICC peristaltic pump is used to control the flow rates to all but one of the device connections, with the flow rate through the final connection being governed by a mass balance around the device. Beads, 10.0 g/L, suspended in water with 0.01% v/v Triton X-100 surfactant to assist suspension, were pumped through the device at flow rates up to 40 mL/min, depending on the configuration of each particular device. Crystals were suspended in saturated solution. The outlet from the device was collected and flow rate determined gravimetrically. The collected samples were evaporated in an oven and the dry weight of the beads/crystals measured to assess separation factors and selectivity.

As a starting point, the initial device comprised two inlets and two outlets (FIG. 15). One inlet feeds solids while the second inlet provides a co-current sweeping stream. While maintaining laminar flow there should be little crossover between streams. The magnetic field gradient pulls magnetic particles out of the feed lane and into the sweep lane. At the outlets the sweep lane is recycled while the feed lane is destined for further downstream processing.

Biocatalyst demonstration. Biocatalyst beads were used. The polyethylene beads used to design the device have no surface functionality required for immobilizing an enzyme catalyst. The biocatalyst beads contain a magnetite core with epoxy-functionalized silica shell. PGA from E. coli was covalently bound to 95% of the biocatalyst beads, and mCherry fluorescent protein was bound to the remaining 5% to act as a tracer, as the biocatalyst beads are too small to be easily observed. The small bead size is needed to achieve a practical enzyme loading per gram of catalyst and avoid mass transfer limitations encountered with porous beads.

Figure 54:
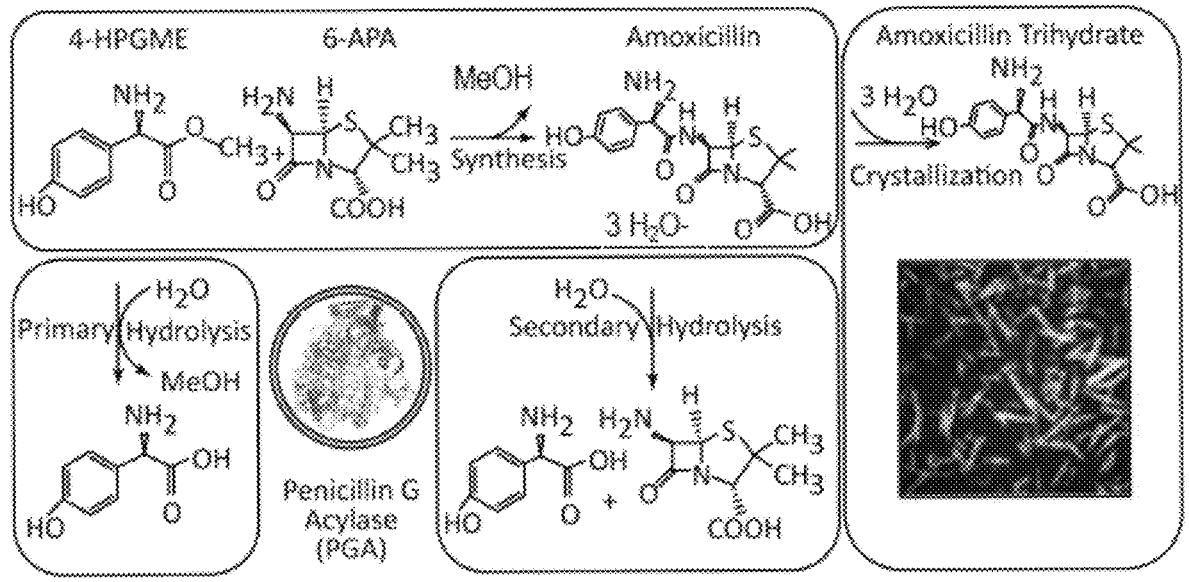
FIG. 54. Reactive crystallization scheme for synthesis of amoxicillin by penicillin G acylase (PGA) as well as side hydrolysis reactions and crystallization of amoxicillin trihydrate.

The solids-forming reaction forms amoxicillin from the condensation of 6-aminopenicillanic acid (6-APA, Alfa Aesar, Heysham, England) with 4-hydroxy phenylglycine methyl ester (4-HPGME) with methanol as byproduct (FIG. 54). Steady state recycling of the biocatalyst was confirmed by gravimetric determination of the amoxicillin production rate. Separation efficiency was assessed by fluorescent microscopy to identify mCherry tagged beads.

Results and Discussion

Buckingham π analysis. Buckingham π analysis indicates that seven dimensionless groups should describe the separator device. The dependent dimensionless separation distance $d_{sep}/W$ should be a function of six dimensionless groups:

the Reynolds number, $$R_e = \frac{\rho_f v_f W}{\mu_f},$$

$$\text{Froude number, } F_r = \sqrt{\frac{gW}{v_f^2}},$$

$$\text{device aspect, ratio, } AR = \frac{L}{W},$$

$$\text{relative particle density, } D_p = \frac{\rho_P}{\rho_f},$$

$$\text{relative particle diameter, } x_P = \frac{d_P}{W},$$

$$\text{and the ratio of the magnetic force to the drag force, } \left(\frac{\mu_P d_P H^2}{\rho_P v_f^2}\right).$$

Here, the subscripts P and f refer to the particle and fluid, respectively, ρ is density, μ is viscosity of the fluid or magnetic permeability of the particle, g is the gravitational acceleration, and H is the gradient of the field strength squared.

The analysis indicates that $d_{sep}/W$ increases with the inverse of the Reynolds number.

Iterative design. Simulations on the device indicated that perfect separation should be achievable for 212-250 μm beads.

Description of results of simulation. From the settling experiments, it was estimated that the magnetic particles will move toward the magnet at an average velocity of 31 mm/s. Therefore, the maximum velocity that allows all magnetic particles to reach the retentate side of the device is estimated to be 22 milliliters per minute. Particle study data near this upper constraint are shown in Table 1. The sum of particles in the permeate and retentate is less than the total number of particles fed, therefore, significant accumulation of magnetic particles on the wall of the device may occur. Initial simulations also indicated that all nonmagnetic particles would exit in the retentate at total inlet flowrates below 180 milliliters per minute.

TABLE 1

Summary of particle simulations.

| Total Flowrate (mL/min) | % Magnetic particles in retentate | % Magnetic particles in permeate |
|---|---|---|
| 18 | 18 | 0 |
| 22 | 38 | 4 |
| 26 | 38 | 12 |

The control experiment with non-magnetic beads resulted in 25-40% of beads crossing into the retentate despite no magnetic force. This crossover, which was not seen in the simulations of the first iteration, indicated that the flow may not be as perfect as assumed. Slow-motion video capture indicated that the peristaltic pumps created a pulsating flow. A transient simulation of the first device iteration showed that the pulsating flow could increase dispersion of the particles and explain a percentage of the non-magnetic particles crossing into the retentate. The peristaltic pump, with independently calibrated channels, could result in pulsating flow from the inlets in phase or out of phase. Further simulations showed that out of phase pumping could cause further dispersion of the beads, explaining the trend in FIG. 32 for non-magnetic beads.

Figure 32:
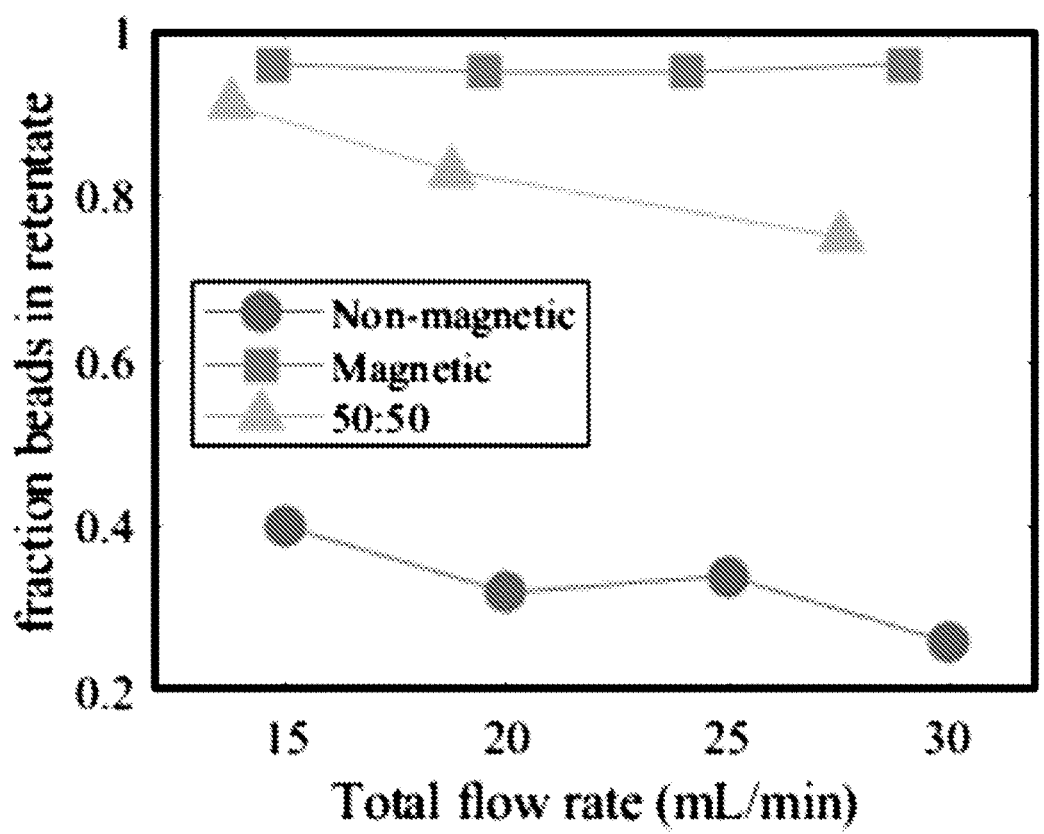
FIG. 32. The fraction of beads in the retentate for the first device iteration. Simulations indicated that non-magnetic beads should not be in the retentate (0.0 on y-axis), magnetic beads should be found only in the retentate (1.0), and a 50:50 mixture of the two should be separated perfectly (0.5).
Figure 33:
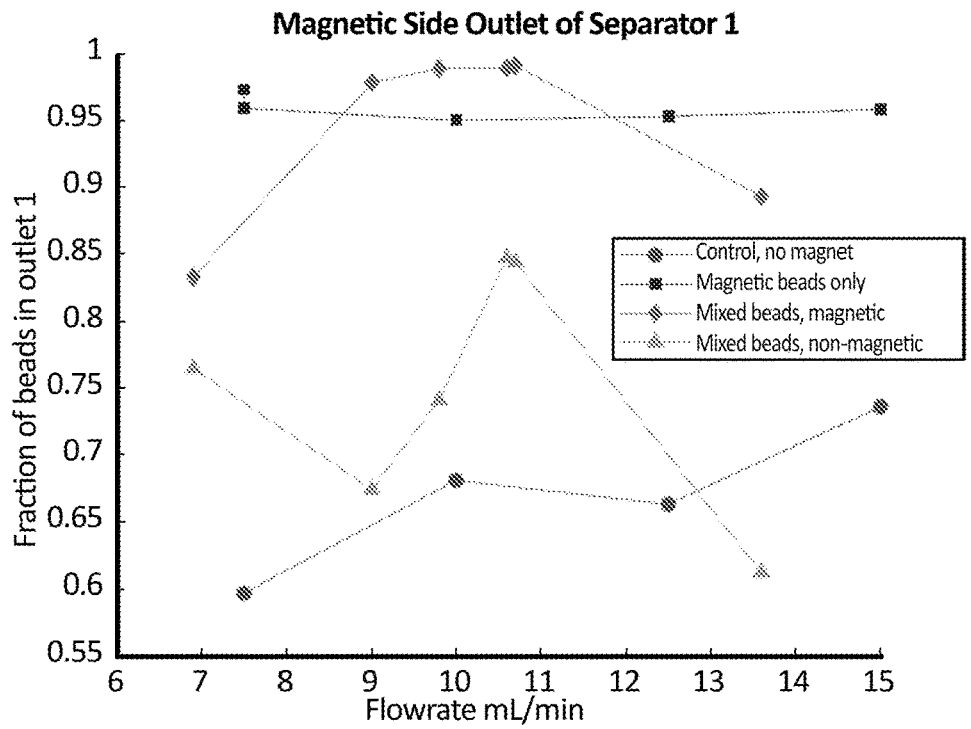
FIG. 33. Separation data for a magnetic separation using an example system as disclosed herein according to one implementation.

In the magnetic bead test, beads were observed accumulating on the device wall next to the magnet. The deposit appeared to only have a moderate impact on retention of the magnetic beads. With magnetic beads alone, >95% retention was observed across all flow rates (FIG. 32). The impact on non-magnetic beads was considerable. The device, designed with the help of the dimensionless analysis, did not account for the accumulation of beads. An additional term would be needed to characterize the flow rate ½ dP from the device wall and consider the friction with the wall. In simulations, a protuberance approximating the shape of the bead accumulation was added and its impact on the separation analyzed (FIG. 18). The deposit causes the net velocity across the width of the device to flow towards the retentate outlet, carrying with it a number of non-magnetic beads and diverting them from the product stream (FIG. 18). The data suggests that this effect diminished with increasing flowrate, although even the highest flowrate tested had 20% more beads in it than expected (FIG. 33). It should be noted that the preference of non-magnetic beads for the recycle stream is not necessarily bad, for the purposes of a continuous reactive crystallizer recycling of the product can in fact enhance the crystallization (Wibowo C et al. AIChE Journal 2001, 47, 2474-2492). Still, the presence of the magnetic bead accumulation appeared to be causing some magnetic beads to end up in the product stream, as the length and width of the separator is reshaped by the deposit.

Second Design Iteration. Applying these learnings to the second iteration of the device, the distance between the two outlets was increased to mitigate the effects of the bead dispersions and clumping observed in the real system. To accommodate the larger distance of separation the device was gradually widened to prevent dead zones with zero fluid velocity where particles may accumulate. Devices 2 and 3 were created with slightly different shapes to determine if this significantly affected performance (FIG. 20 and FIG. 22). Many operating points of each device were simulated to estimate the performance of the new devices, and the optimal operating point of each device that minimized the number of particles in the wrong outlets was determined to be between 18 and 28 milliliters per minute of inlet flowrate.

The particle simulations also indicated that a significant number of beads may accumulate on the walls of the device. In testing, this was confirmed to be a major challenge. With the magnets placed above the device, the clumping was even more severe than the simulations had predicted, likely due to the way the magnetic force was estimated in the simulation. It was discovered that the issue could be mitigated by adjusting the placement of the magnets and the orientation of the device. The magnet placement that worked the best in practice was when they were placed on both sides of the upper part of the device. This creates channel where there is very little force on the magnetic beads, however when they begin to fall, the magnetic force will keep them in the channel.

Figure 34:
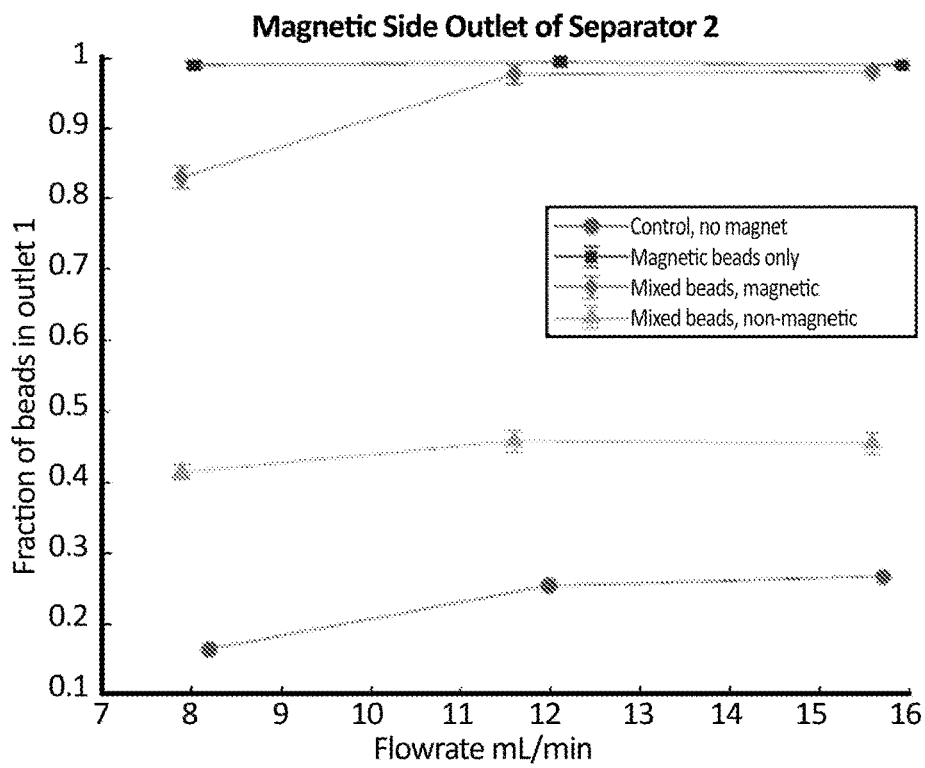
FIG. 34. Separation data for a magnetic separation using an example system as disclosed herein according to one implementation.
Figure 35:
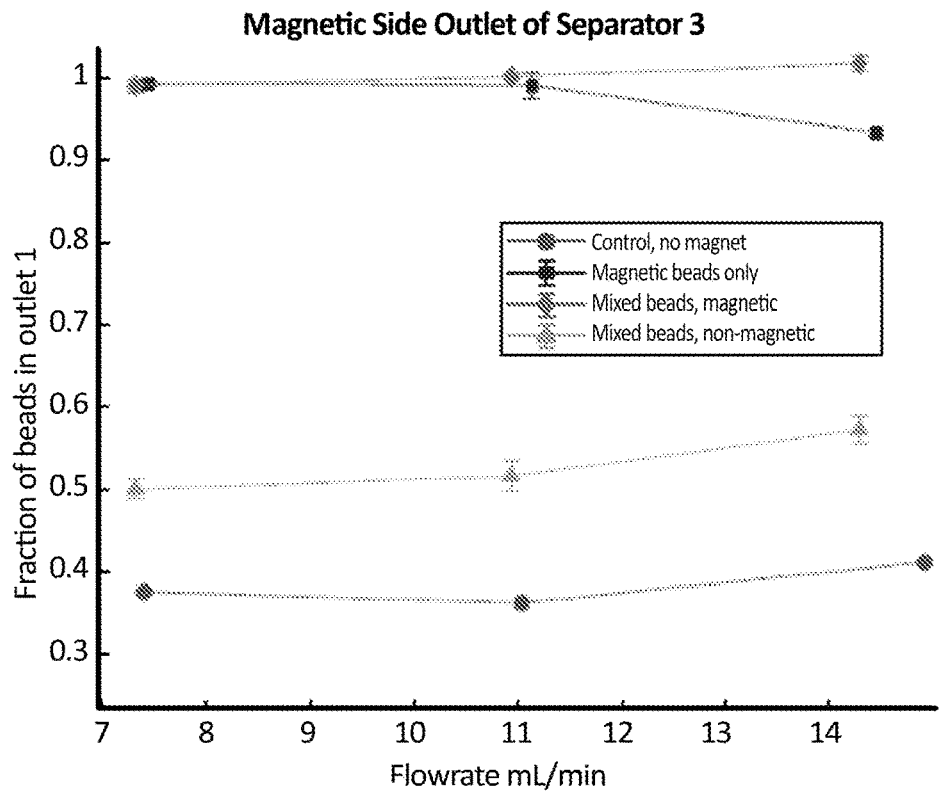
FIG. 35. Separation data for a magnetic separation using an example system as disclosed herein according to one implementation.

With the device in this angled configuration with magnets on each side, separations were performed at several flowrates with nonmagnetic, magnetic, and mixed beads. It was observed that each device was able to recover over 99% of the magnetic beads at some flowrates (FIG. 34 and FIG. 35).

Figure 36:
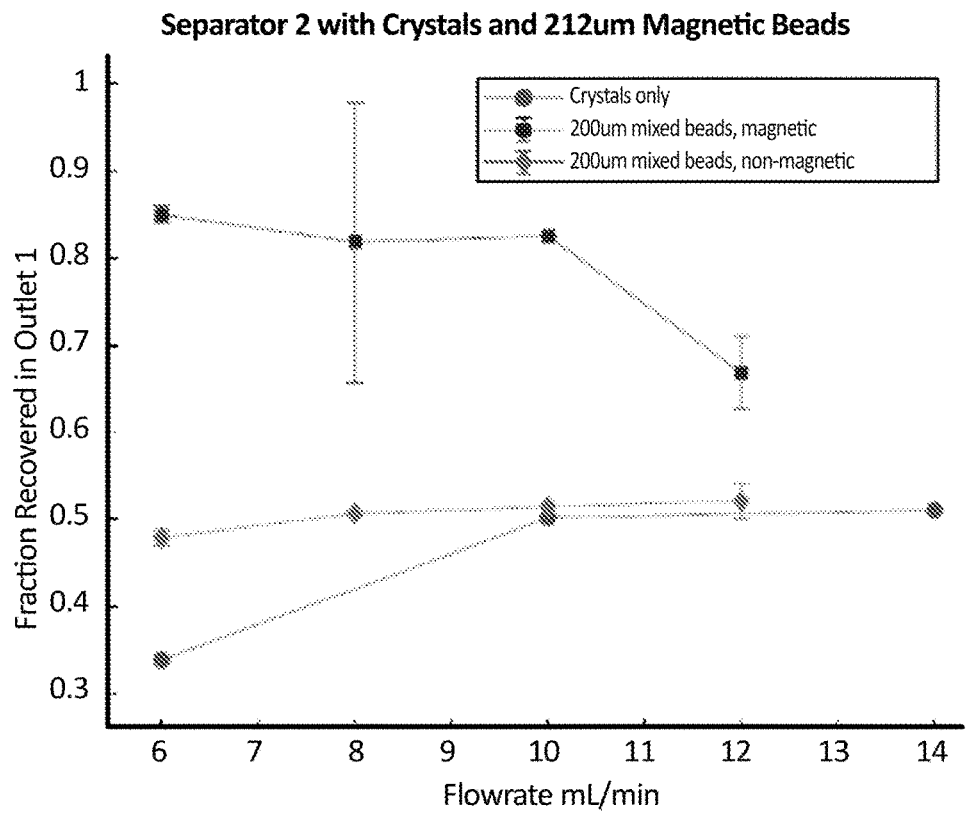
FIG. 36. Separation data for a magnetic separation using an example system as disclosed herein according to one implementation.

The testing was repeated with a mixture of crystals and magnetic beads as would be the case in the application system. It was observed that the magnetic bead recovery decreased when the crystals were added (FIG. 36). This is likely due to the difference fluid properties with the crystal mixture and interparticle interactions.

Functionalized magnetic spheres are not commercially available at sizes larger than 90 micron diameter. Therefore, the device was tested with smaller beads of 60-micron diameter. Unfortunately, the second iteration devices were unable to achieve a magnetic bead retention greater than 60% with the smaller beads. A third design iteration was necessary to address some of the challenges encountered in the second iteration and improve performance with smaller beads that would be more likely to be used in a real system.

Third Design Iteration. The third design iteration sought to rectify some of the shortcomings of device 2 in relation to the beta-lactam system it is to be applied to. The length and height of the device were reduced, and overall volume of the device was reduced by about 66% leading to a much higher volumetric flow within the device (FIG. 25). Some "head space" was added to allow room for some beads and or bubbles to accumulate in the device without affecting the fluid flow pattern too much. Finally, some mounting pegs were added to the exterior of the device that matched with a custom stand so the device angle could be precisely controlled and reproduced (FIG. 25).

Figure 37:
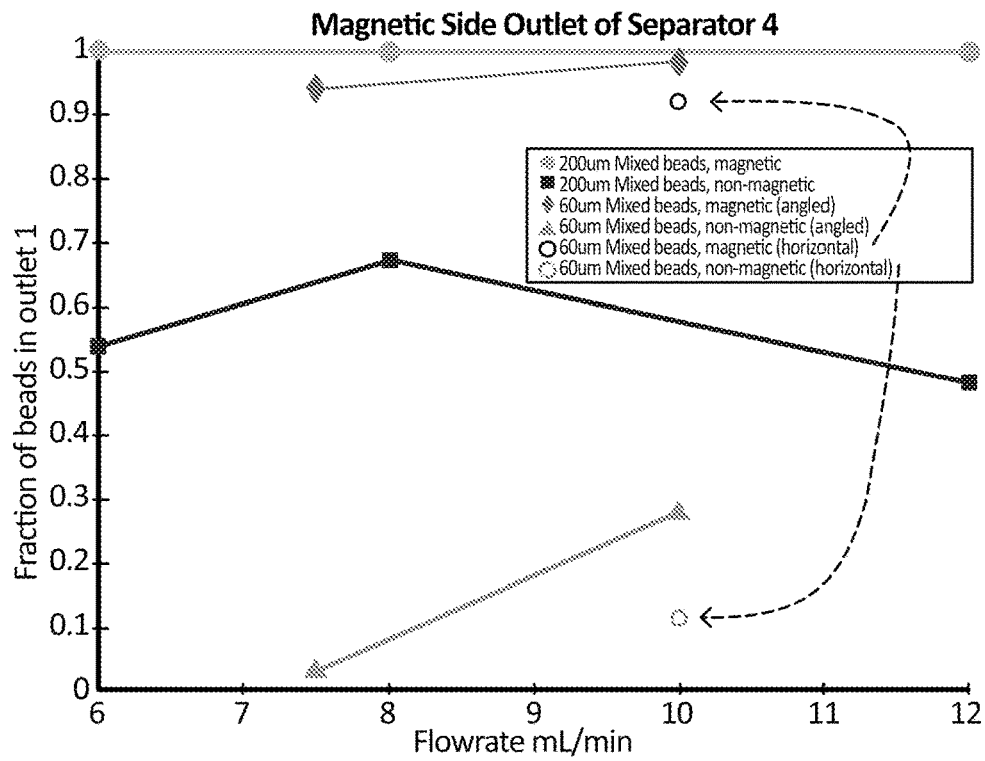
FIG. 37. Separation data for a magnetic separation using an example system as disclosed herein according to one implementation.

This device was tested first with 212 µm beads then with 60 µm beads to compare to previous design iterations (FIG. 37). This device was able to repeatedly recover over 99% of the 212 µm magnetic beads in the horizontal configuration (FIG. 37). This is a significant improvement over device 2 which was only achieved over 99% at some flowrates and required the device to be maintained at an angle. The smaller volume and higher fluid velocity within the device is strong enough to carry the magnetic beads through the field without many of them accumulating on the walls, and this leads to high magnetic bead recovery.

Figure 38:
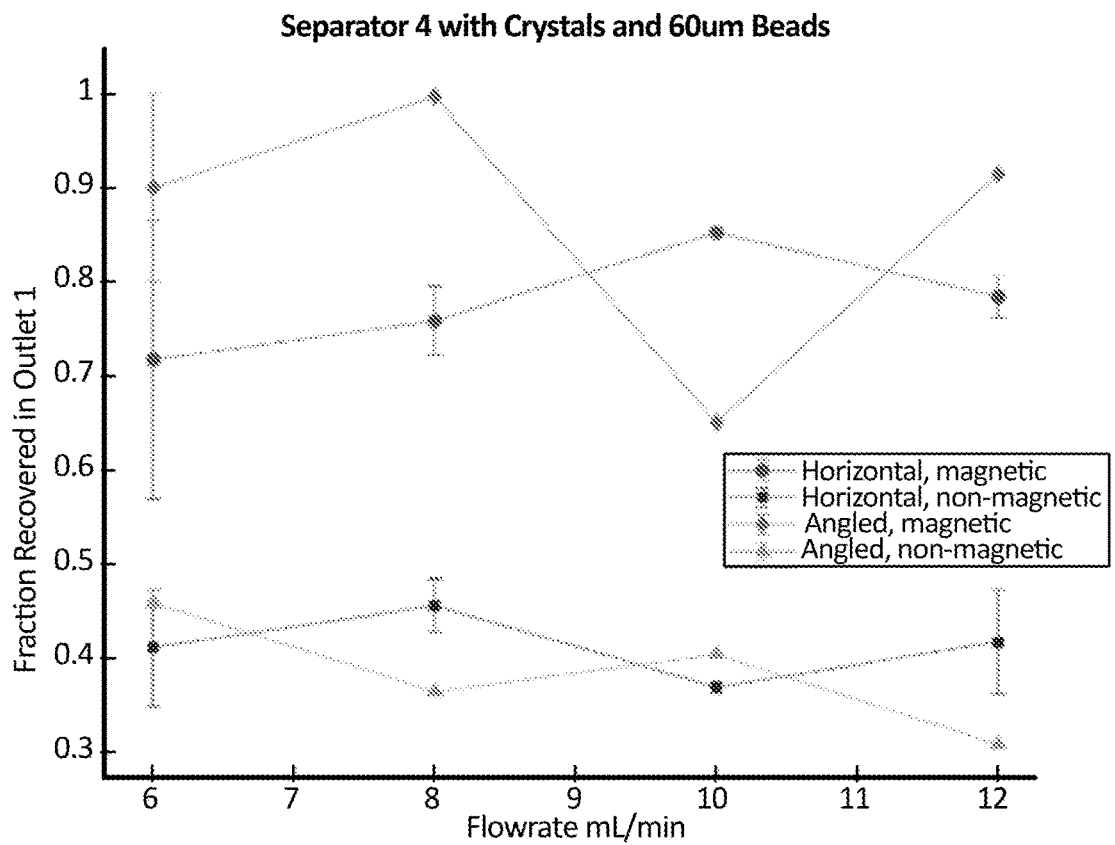
FIG. 38. Separation data for a magnetic separation using an example system as disclosed herein according to one implementation.

The 60-micron beads were separated with greater than 90% magnetic bead recovery, and angling the device assisted this separation (FIG. 38).

Next the device was tested with a solution of amoxicillin crystals and 60 micron beads. Resulting in several separations with greater than 90% magnetic bead recovery.

Example 5—Continuous Recycling of an Immobilized Biocatalyst During a Solids-Forming Reaction by Magnetic Separation Abstract. End-to-end continuous manufacturing can provide improvements to product quality, control, and process economics over tradition batch processes. The design of new continuous unit operations for product isolation and catalyst recovery is necessary for realization of fully continuous processes involving difficult or coupled chemistries and separations. Herein, a magnetic separation technique is designed and applied to continuously separate biofunctionalized catalyst particles from a solid, crystalline product. Magnetic force can be used to enhance traditional solid-solid separation techniques to yield a high purity product stream and continuously return catalyst to a reactor. Herein, a separator was created that can recover and recycle >99.9% of immobilized enzyme catalyst to the continuous reactive crystallizer while simultaneously yielding pure amoxicillin through coupling of separators in series and a catalyst trap. The methods for designing similar magnetic separation systems could be applied to other continuous, heterogeneously catalyzed, solids-forming reactions.

An application of magnetic separation suitable for micron-scale solid-solid separation is designed and demonstrated on a pilot plant scale synthesis of amoxicillin trihydrate.

Introduction. Continuous manufacturing has many advantages over batch-wise processes, including increased system control and less variation in product quality, especially in the pharmaceutical arena (Burcham C L et al. *Annual Review of Chemical and Biomolecular Engineering*, 2018, 9(1), 253-281; Gutmann B et al. *Angewandte Chemie International Edition*, 2015, 54(23), 6688-6728; Lee S L et al., *Journal of Pharmaceutical Innovation*, 2015, 10(3), 191-199; Algorri M et al. *Journal of Pharmaceutical Sciences*, 2022, 111(3), 593-607). The FDA is encouraging research into continuous manufacturing as a means of improving drug quality and manufacturers expect improvements in process economics to accompany the transition from batch to continuous (Fisher A C et al. *International Journal of Pharmaceutics*, 2022, 622, 121778; Su Q et al. *Computers & Chemical Engineering*, 2019, 125, 216-231). The success of recent efforts to move commercial production, at least in part, to a continuous setup is promising (Burcham C L et al. *Annual Review of Chemical and Biomolecular Engineering*, 2018, 9(1), 253-281; Fisher A C et al. *International Journal of Pharmaceutics*, 2022, 622, 121778; Cole K P et al. *Science*, 2017, 356(6343), 1144-1150; Adamo A et al. *Science*, 2016, 352(6281), 61-67; Hernando M V et al. *Organic Process Research & Development*, 2022, 26(4), 1145-1151; Liu W J et al. *AIChE Journal*, 2017, 63(3), 967-974; Neuburger J et al., *Chemical Engineering and Processing—Process Intensification*, 2021, 168, 108578; Rogers L et al. *Organic Process Research & Development*, 2020, 24(10), 2183-2196; Singh R et al. Advanced Control of Continuous Pharmaceutical Tablet Manufacturing Processes, in Process Simulation and Data Modeling in Solid Oral Drug Development and Manufacture, M. G. Ierapetritou and R. Ramachandran, Editors. 2016, Springer New York: New York, NY. p. 191-224; Ho C H et al. *ACS Sustainable Chemistry & Engineering*, 2019, 7(1), 1038-1051), but significant work is needed to reach end-to-end continuous manufacturing, especially for challenging chemistries. Biocatalysts, such as enzymes, have made some difficult chemistries possible thanks to their unmatched specificity and selectivity. Enzymatic reactions are well poised for implementation in continuous processes as both biocatalysis and continuous production can each improve aspects of process quality and process greenness.

This study was inspired by the continuous reactive crystallization of β-lactam antibiotics, whereby penicillin G acylase (PGA) converts solution-phase reactants into antibiotics which subsequently form needle-shaped crystals (Encarnación-Gómez L G et al. *Reaction Chemistry & Engineering*, 2016, 1(3), 321-329; McDonald M A et al. *Computers & Chemical Engineering*, 2019, 126, 332-341; McDonald M A et al. *Chemical Engineering Science*, 2017, 165, 81-88; McDonald M A et al. *Computers & Chemical Engineering*, 2019, 123, 331-343). Reactive crystallizations are processes in which supersaturation, or the driving force behind crystallization, is generated from a solution-phase reaction (McDonald M A et al. *Reaction Chemistry & Engineering*, 2021, 6(3), 364-400). Generally, reactive crystallization can be useful for process intensification (Doeker M et al. *Green Chemistry*, 2022, 24(1), 295-304), improved kinetic properties for catalytic systems (McDonald M A et al. *Computers & Chemical Engineering*, 2019, 123, 331-343), increased selectivity toward desired products in parallel reactions, or for isolation of desired intermediates as in the case of PGA-catalyzed β-lactam synthesis (Liu W J et al. *AIChE Journal*, 2017, 63(3), 967-974; Encarnación-Gómez L G et al. *Reaction Chemistry & Engineering*, 2016, 1(3), 321-329; McDonald M A et al. *Computers & Chemical Engineering*, 2019, 123, 331-343; Doeker M et al. *Green Chemistry*, 2022, 24(1), 295-304; Amari S et al. *Chemical Engineering Research and Design*, 2021, 176, 116-122; Fellechner O et al. *Chemie Ingenieur Technik*, 2019, 91(11), 1522-1543; Hu C et al. *Reaction Chemistry & Engineering*, 2020, 5(10), 1950-1962; Janbon S L M et al. *Organic Process Research & Development*, 2019, 23(3), 302-308; Jiang M et al. *Organic Process Research & Development*, 2019, 23(5), 882-890; Jiang M F et al. *Journal of Crystal Growth*, 2019, 523, 7; Liu W J et al. *Procedia Engineering*, 2015, 102, 499-507; Nikačević N M et al. *Chemical Engineering and Processing: Process Intensification*, 2012, 52, 1-15; Purwins M et al. *Journal of Crystal Growth*, 2006, 287(2), 408-413; Su W et al. *Chemical Engineering Journal*, 2022, 431, 134186; Teychené S et al. *Current Opinion in Colloid & Interface Science*, 2020, 46, 1-19). The formation of solid product directly from liquid product can be important in β-lactam production for increased selectivity and process intensification.

For many enzymatic reactions, immobilized enzyme is often beneficial for increased enzyme stability and reuse, assurance of lack of protein in the final API, use in a wider array of solvents, and ease of implementation in continuous processing (Truppo M D et al. *ACS Medicinal Chemistry Letters*, 2017, 8(5), 476-480; Thompson M P et al. *Organic Process Research & Development*, 2019, 23(1), 9-18). In addition, for low-value, high-volume pharmaceuticals such as β-lactam antibiotics, excessive cost of enzyme isolation and purification can be mitigated in part by immobilization. However, in the case of biocatalytic reactive crystallizations, additional challenges arise with use of solid, immobilized biocatalyst in the presence of crystallizing product.

To enable use of solid catalyst to produce solid API, it was sought to design a solid-solid separation technique that would take advantage of user-selected immobilization property differences between the resulting catalyst particle and the resulting API. The use of size or density based solid-solid separations have previously been designed to address such issues, including in continuous processes, however such designs are limited by careful control of particle size, adding to the system complexity and cost. Robust control of crystal size distributions typically requires milling, leaving catalyst particles to be designed to be much larger than the crystalline particles (Salami H et al. *Chemical Engineering Research and Design*, 2022, 177, 473-483). For catalytic particles, size increases typically result in reduced catalytic efficiencies and mass transfer limitations. To avoid these issues, the addition of bead magnetic properties provides an additional degree of freedom to manipulate for separation.

The use of magnetic separation has been implemented in other areas including cell separation (Frenea-Robin M et al. *Magnetochemistry*, 2022, 8(1), 11; Zborowski M et al. *Analytical Chemistry*, 2011, 83(21), 8050-8056; Haik Y et al. *Journal of Magnetism and Magnetic Materials*, 1999, 194(1), 254-261), microbiology for DNA isolation (Borlido L et al. *Biotechnology Advances*, 2013, 31(8), 1374-1385), and in the mining industry for ore isolation (Oberteuffer J. *IEEE Transactions on Magnetics*, 1974, 10(2), 223-238); however, most examples of magnetic separation are used in batch or semi-batch processes. In addition, there is a gap in particle scale for these separations. Typical magnetic cell sorting or DNA isolation with magnetic beads utilize <10 μm particles (FIG. 12), whereas mining separations involve millimeter scale or larger particles (FIG. 13), leaving a gap in magnetic separation technology on the <10-1000 μm scale. Overall, the design of a magnetophoretic system can expand the applicability of magnetic separations to include biocatalytic and continuous processing applications.

Herein, a magnetophoretic separation system is demonstrated to allow use of immobilized penicillin G acylase (PGA) in a crystallizing system. While demonstrated for PGA-catalyzed reactive crystallization of amoxicillin trihydrate, this system can be generalized with further optimization to other solid-catalyzed solids forming reactions. There are many other examples of biocatalytic reactions that form solids for which the devised and methods disclosed herein could be practical. One can also imagine immobilizing metal/organometallic catalysts in a similar manner for continuous solid-solid separation. While reactive crystallizations are still limited in use, technologies such as solid-solid separation techniques can enable other systems to take advantage of reactor process intensification through in situ crystallization. Importantly, the general methods for designing a such a separation system are described herein and can be generalizable.

A goal of this study was to create a separator capable of continuously removing catalytically functionalized magnetic spheres from a slurry of crystalline product with high separation efficiency and product purity on a pilot plant scale. The design of a continuous magnetic separator is detailed from computational fluids dynamics (CFD) simulations to iterative rapid prototyping with additive manufacturing. The separation system allows for processing and separation of slurries at pilot scale volumetric throughputs. The device is inexpensive through use of 3D printed materials and neodymium magnets, allowing for a low-cost system that can be parallelized or used in series for enhanced separations. The device design and separation ability of the separator in both single and dual device setups for a wide range of particle sizes is described herein. Further, continuous separation performance was tested during an 8-hour continuous pH-shift crystallization of amoxicillin trihydrate. Finally, recovery and continuous recycle of immobilized biocatalyst was demonstrated during an 11-hour enzymatic reactive crystallization to isolate highly pure amoxicillin trihydrate generated biocatalytically from PGA-bound magnetic agarose particles.

Figure 39:
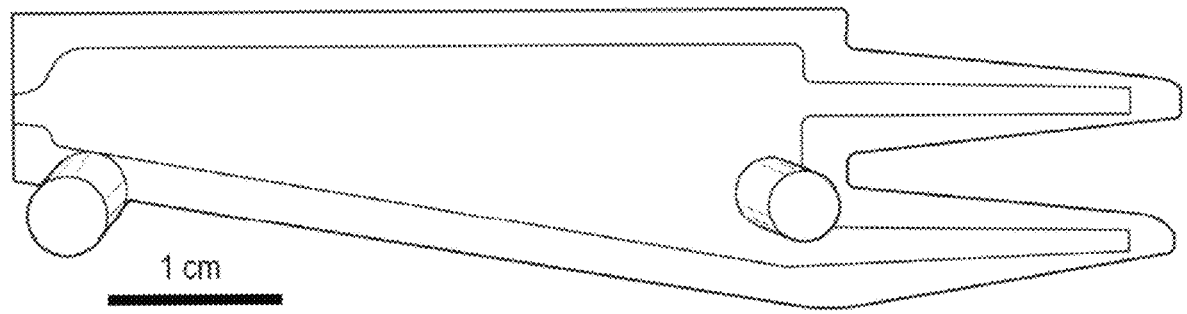
FIG. 39. Picture of a single Magnetophoretic separator device design.
Figure 40:
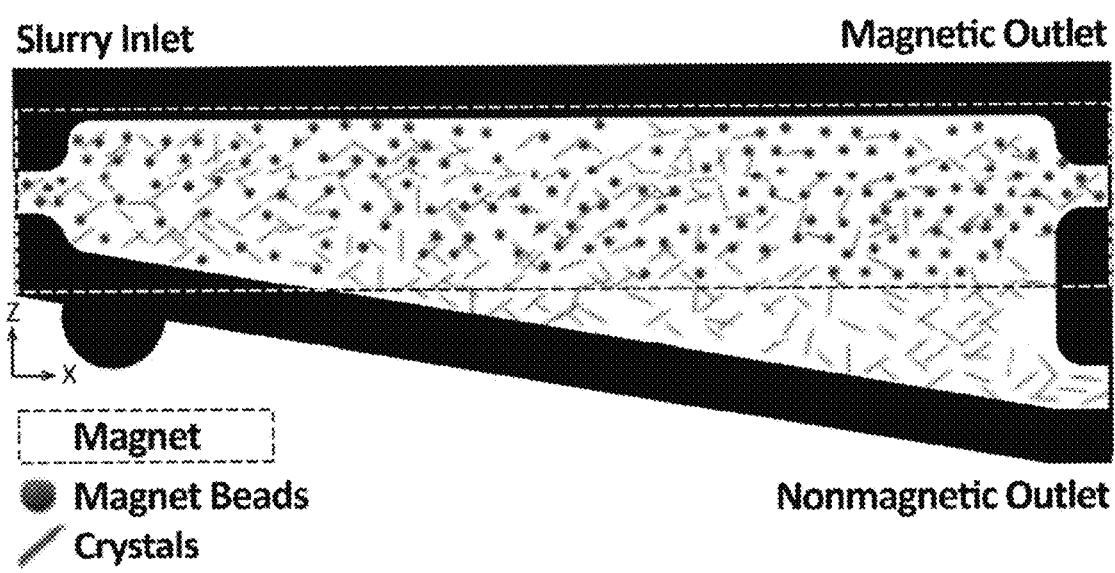
FIG. 40. Cross section of device showing placement of neodymium magnets on the top half of the device and the gravitational, magnetic, and fluid flow forces acting on solid particles within the device.
Figure 41:
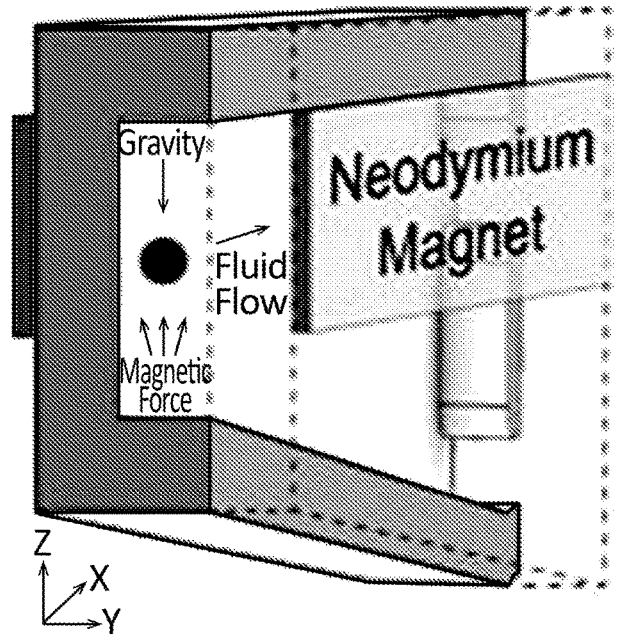
FIG. 41. Schematic of anticipated flow of particles through the device. Magnetic particles remain above the magnet placement and are funneled to the magnetic outlet (top) while crystals settle out toward the nonmagnetic outlet (bottom). Some fraction of crystals remains distributed throughout the fluid and exit the magnetic outlet with recycled magnetic particles.
Figure 42:
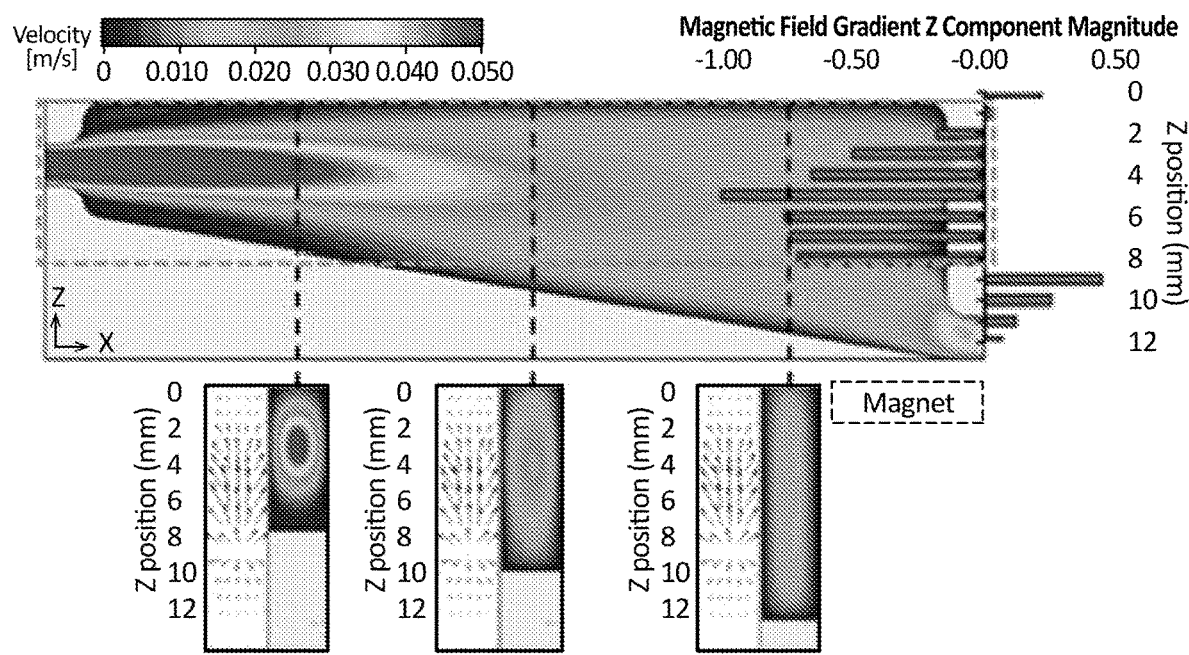
FIG. 42. Simulation of the separator showing fluid forces as well as the magnetic field gradient magnitude generated by placement of magnets on either side of the device. Cross sections (below) show general trends in the x-direction for both magnetic field gradient vectors as well as fluid flow.

Results. The 3D-printed magnetophoretic device is shown in FIG. 39. A slurry is fed into the device inlet before entering an expanded chamber to allow for crystal settling while a magnetic field gradient funnels the magnetic beads into the top, magnetic outlet of the device for bead retention and recovery (FIG. 41). The low-volume triangular design (FIG. 39) allows for a wide range of flow rates (4->20 mL/min) while maintaining reasonable fluid velocity to allow for continuous processing. The magnetic field gradient is generated in the top half of the device using two neodymium magnets placed on either side of the device. This magnet placement (FIG. 41) generates a magnetic field such that paramagnetic particles, which respond to gradients in the magnetic field (Mikkelsen C et al. *Lab on a Chip*, 2005, 5(11), 1293-1297), are kept in the upper half of the device (FIG. 40 and FIG. 42). Crystals exiting the nonmagnetic outlet are considered the product stream and exit the system for further downstream processing (FIG. 40).

The device layout was configured in an iterative fashion using fluid and bead property studies, magnetic field and fluid dynamics simulation, and physical testing, as described above. Several designs were simulated using SolidWorks Flow Simulation to predict required dimensions of a device given both solids and liquid characteristics. Magnetic dipole moments were calculated using settling magnetic particles in different density liquids. From this data, several separation designs were simulated for their fluid flow properties and magnetic field properties (FIG. 42) before being constructed and tested for their separation efficiency of magnetic particles from nonmagnetic particles. The iterative simulation, design, and testing were performed to replicate observed nonidealities found in experiments and identify new designs or operating conditions to minimize nonidealities.

Two observed nonidealities that were not accounted for in initial simulations were hypothesized to have an adverse effect on the separation. The first of these factors is magnetic beads accumulating on the wall of the device near the magnet. The magnetic force on the wall is strong and the fluid flow near the wall is near zero, so magnetic beads are trapped, and a large clump of beads eventually forms. This large bead deposit affected the flow pattern of the fluid which can force many nonmagnetic and magnetic beads into the wrong outlets through unintended mixing. While bead clumping was minimized in the design of FIG. 39-FIG. 41, some clumping still occurs with high magnetic bead concentrations during long-term runs. The second factor affecting separation is mixing created by peristaltic pumps. The flow produced by the pumps used in the experiment follow a sinusoidal pattern as the rotors turn and pinch the flexible tubing. This is different than the simple constant velocity initially modeled in the simulations. When the rotors of the different peristaltic pumps turn and are not in sync, a strong current to one outlet or anther produces a mixing effect causing the beads to deviate from their ideal paths.

Figure 43:
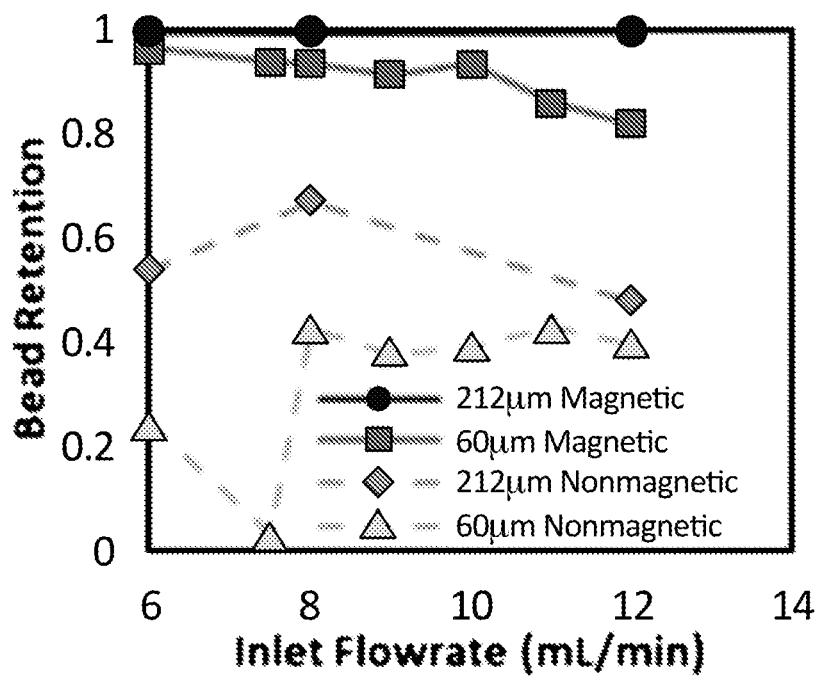
FIG. 43. Single separator testing of bead retention during separation of magnetic and nonmagnetic beads of the same size. Both 60 µm and 212 µm beads were tested to demonstrate the range of particle sizes capable of separation. Nonmagnetic particle retention is shown for the fraction of nonmagnetic beads exiting the magnetic or top outlet of the device.
Figure 45:
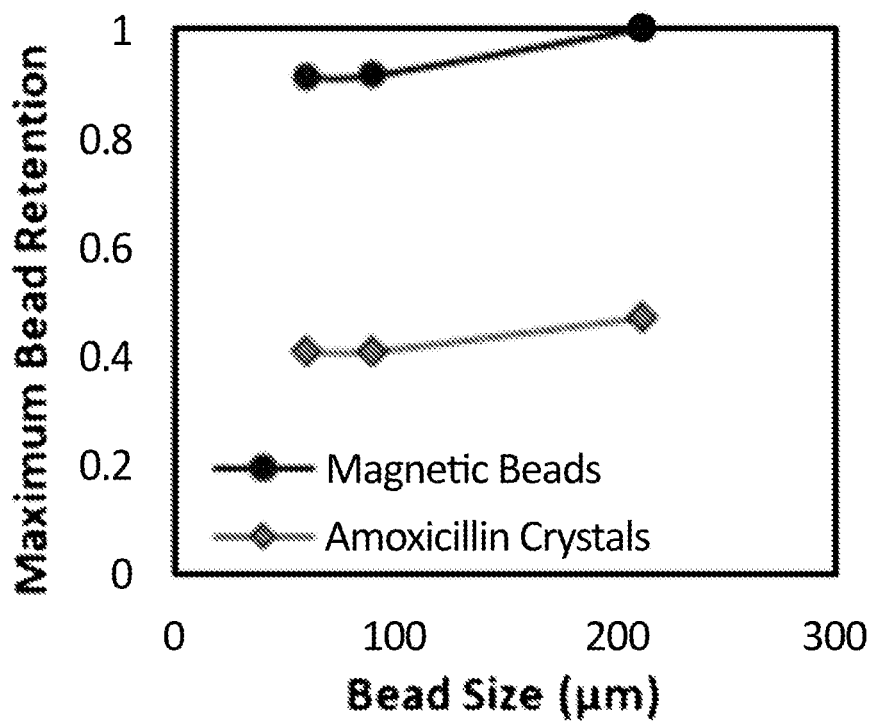
FIG. 45. Maximum bead retention of magnetic beads separated from amoxicillin crystals by bead size.

The separator design was tested initially in batch with several bead types and inlet flow rates to determine the operating points for the device. Initially, slurries of nonmagnetic and magnetic spheres of equal size were fed through the device using peristaltic pumps at varying flow rates (FIG. 43). Bead retention, or the fraction of beads exiting the top, magnetic outlet was measured for each slurry of 60 µm or 212 µm magnetic and nonmagnetic beads. The fraction of each of the nonmagnetic and magnetic beads present in the magnetic outlet (top outlet) of the device are shown for both 212 µm bead and 60 µm bead experiments (FIG. 43). The 212 µm beads were found to be the easier separation with >99.5% of all magnetic beads exiting the magnetic outlet across all flow rates studied. Separation efficiency is lower for smaller particles with only 96% of 60 um beads exiting the magnetic outlet at 6 mL/min and decreases with increasing flow rate. Generally, magnetic bead retention decreased with increasing flow rate into the device, and larger beads were easier to separate than smaller beads (FIG. 43 and FIG. 45). The fraction of nonmagnetic beads exiting the magnetic outlet was generally between 40-70% (FIG. 43).

Figure 44:
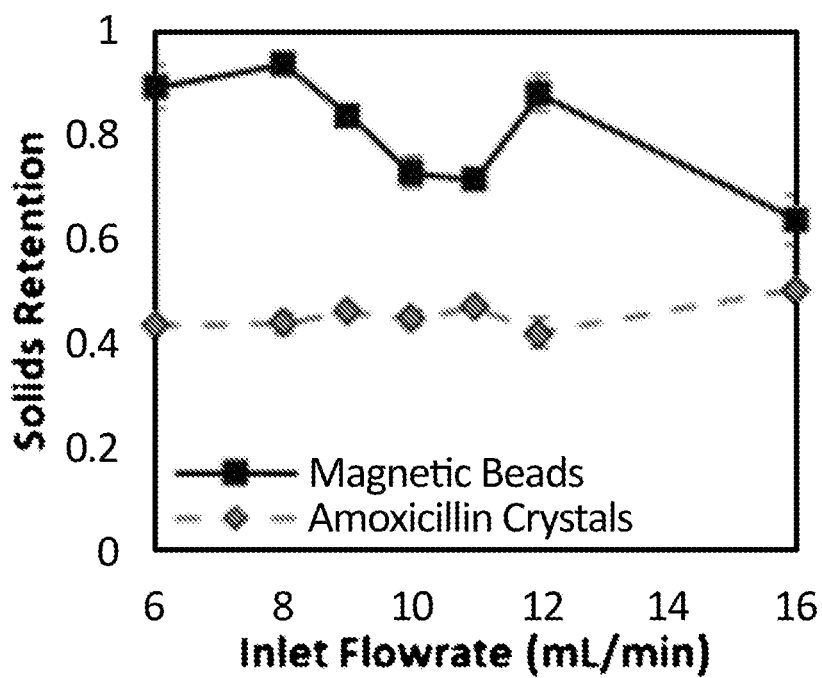
FIG. 44. Separation of 60 µm magnetic beads from amoxicillin crystals as a function of separator inlet flow rate.

A similar trend occurs with separation of 60 µm magnetic beads from amoxicillin crystals. The highest solids retention occurred at low inlet flow rates of 6-8 mL/min and greatly decreased with increasing flow rate (FIG. 44). However, at 12 mL/min, magnetic retention was much higher compared to 9-11 mL/min. It is speculated that this dip in magnetic retention is caused by a relationship between the feed flow and bead accumulation within the device. Large bead deposits in the device were observed between 9 and 11 mL/min feeds that placed some beads near the non-magnetic outlet. At 8 mL/min and below, beads act more as a moving bed due to lower fluid velocity in the device; however, the rate of beads entering is not high enough for significant accumulation to affect separation performance. Between 8 and 11 mL/min bead accumulation in the device increases, however the fluid velocity in the device is likely not high enough to shear beads away from the nonmagnetic outlet that are accumulating outside of the designed magnetic field gradient. At 12 mL/min and above, a flow regime change is likely, causing enough shear forces to keep bead clumping within the device low. Overall, this non-linear relationship between separation performance and fluid flow rate is likely explained by the balance between magnetic and flow forces.

Figure 46:
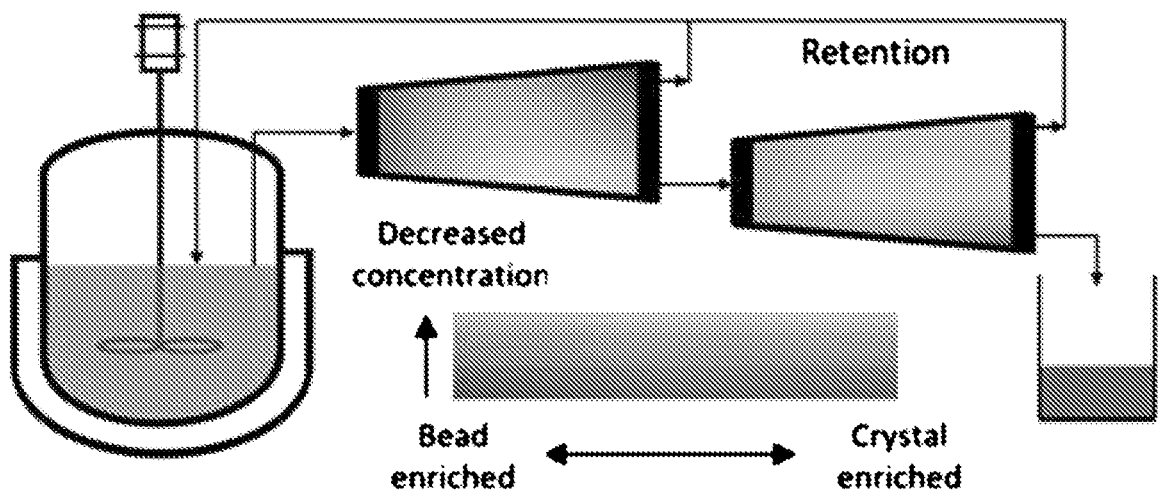
FIG. 46. Schematic showing the setup for separators operated in series. The first separator operates at an inlet flow rate of 12 mL/min while the second device operates at 6 mL/min. The color scheme shows the anticipated crystal or bead enrichment throughout the device as well as the concentration of particles expected to exit the system.
Figure 47:
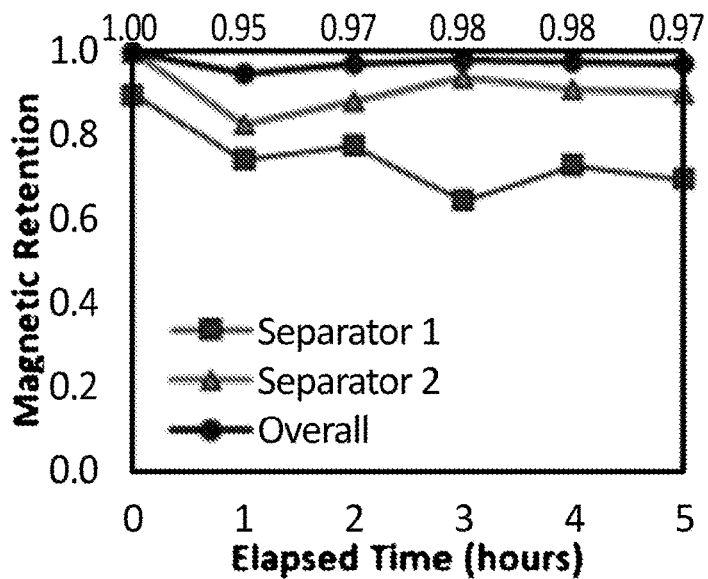
FIG. 47. Semi-continuous magnetic particle retention as a function of time for a 5-hour separation of 60 µm magnetic particles from amoxicillin crystals. Magnetic retention for both separators as well as the overall magnetic retention is shown.

With maximum magnetic bead recovery for 60 µm particles at 90%, separators were tested in series (FIG. 46). With additional optimization, separators in series operating at inlet flow rates of 12 mL/min and 6 mL/min were able to separate a slurry of 60 µm magnetic particles from amoxicillin crystals while retaining >97% recovery of the magnetic particles over the course of a 5-hour semi-continuous test (FIG. 47). Deviations occur in the first hour where the devices are likely still operating at non-steady state. Even with a large dip in separation efficiency in the second device at 3 hours, the separation system is much less prone to changes in one device when operated in series as the overall separation efficiency remains above 91% despite device 2 only operating at 65% separation efficiency at that point. With the addition of a final magnetic trap to capture the small percentage of beads remaining in the product stream, the separation system can achieve 100% recovery of the magnetic particles.

Figure 48:
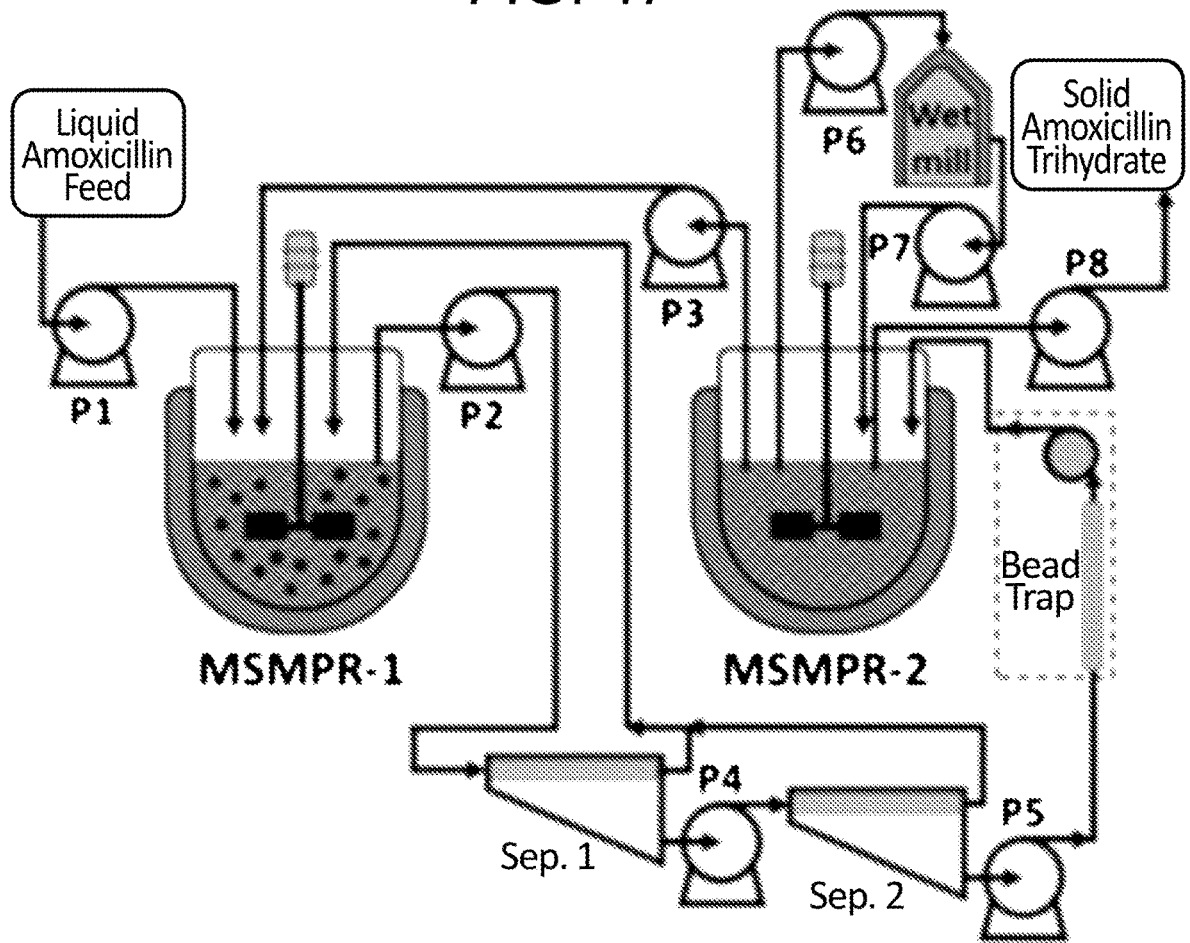
FIG. 48. Process flow diagram for pilot-scale pH-shift crystallization of amoxicillin trihydrate.
Figure 49:
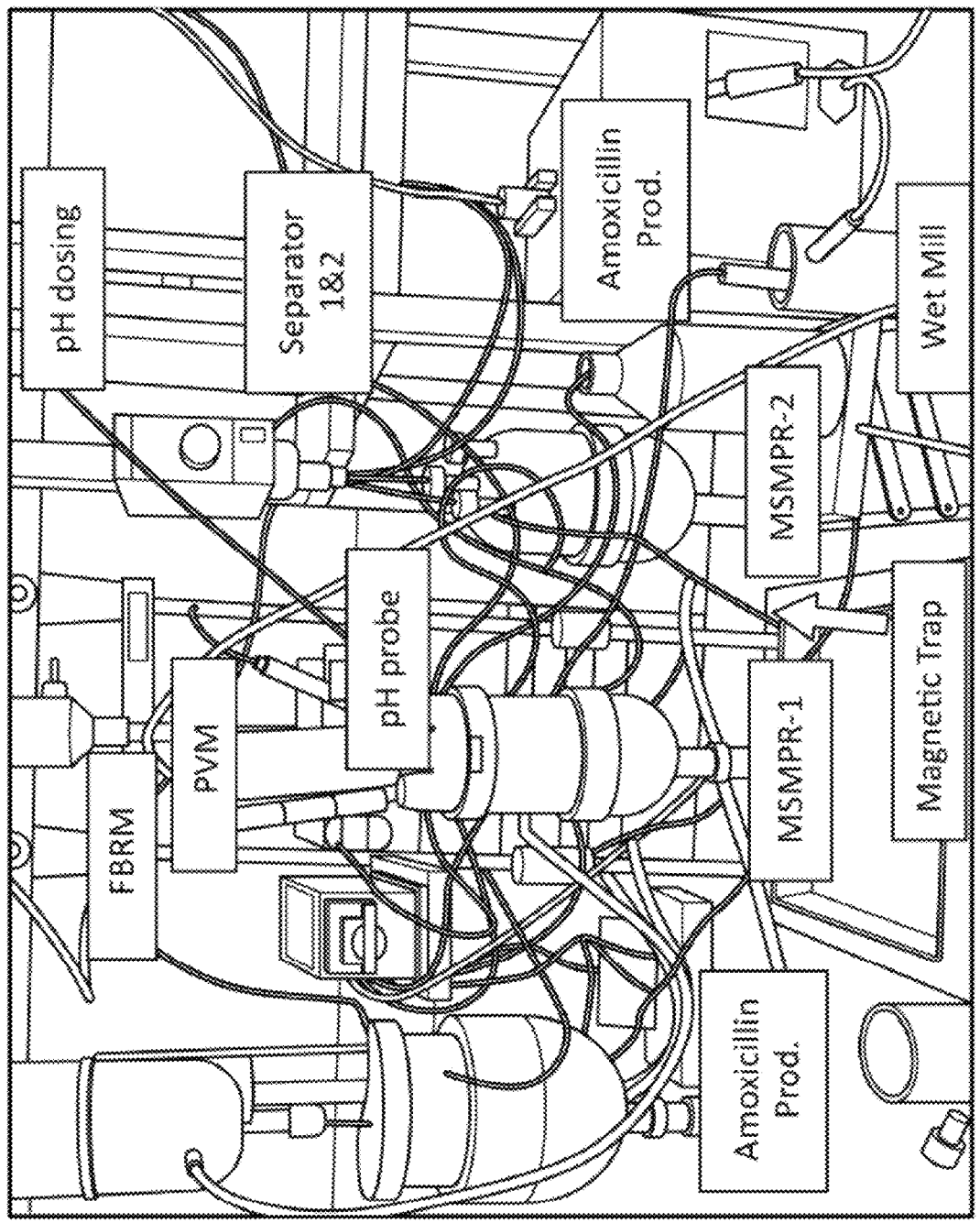
FIG. 49. Picture of pilot plant setup with labeled unit operations.

To further verify continuous separation performance, the separation system was next tested on a pilot scale pH-shift crystallization of amoxicillin trihydrate to demonstrate the removal and recycling of 212 µm beads from a crystallizing slurry. The schematic (FIG. 48) and photograph (FIG. 49) of the setup are shown. The pH-shift crystallization was performed in the presence of 4 g of 212 µm magnetic beads by feeding 45 mM soluble amoxicillin at pH 8.3 and 7° C. into a vessel held at pH 5.8 and 25° C. to generate supersaturation for crystallization. The slurry, comprising approximately 50 g/L amoxicillin trihydrate crystals and 13 g/L magnetic particles was fed through the separation system before collecting the final pure crystals in MSMPR-2 held at 4° C. to drive crystallization to completion.

Figure 50:
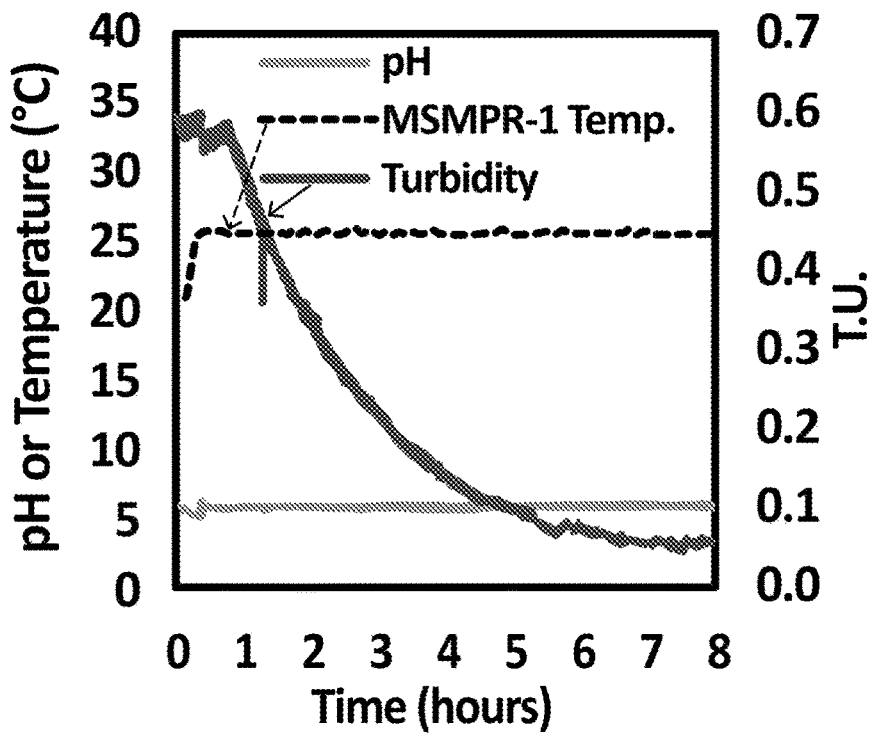
FIG. 50. pH, temperature, and turbidity measurements over the course of the 8-hour pilot plant run.

The top outlets of each separator were fed back to MSMPR-1 to demonstrate magnetic bead recovery. The outlets of each device were periodically sampled, and it was found that no magnetic beads passed into the final amoxicillin product in MSMPR-2, demonstrating the separation system operated at 100% separation efficiency for the duration of product collection (FIG. 50). Separator 1 operated consistently between 85-95% separation efficiency.

Figure 52:
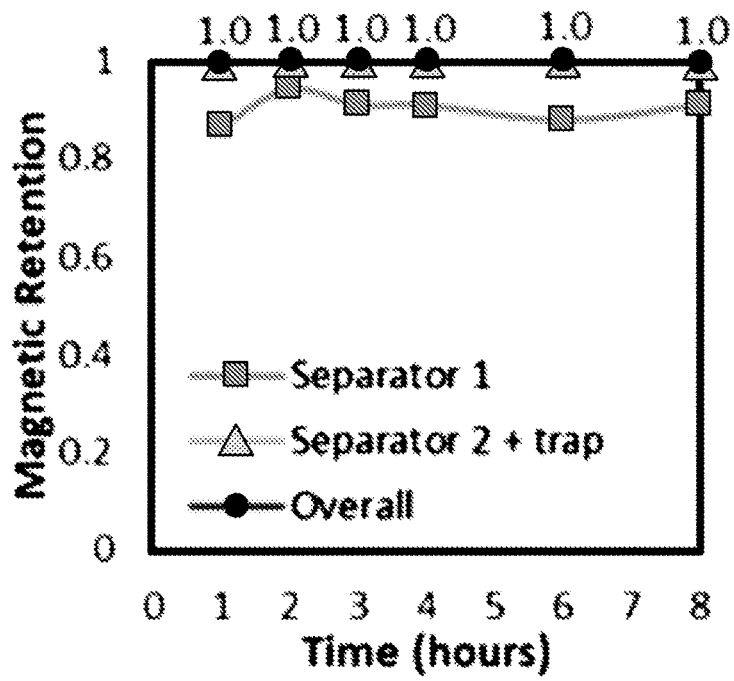
FIG. 52. Magnetic bead retention for both separators and magnetic trap are reported over the course of the 8-hour pilot run.

One improvement added to the system after the initial testing was the incorporation of a magnetic trap (FIG. 48) to capture remaining beads that escape the devices in series and prevent contamination of the final product. With addition of the magnetic trap, 100% of magnetic particles were recovered and no magnetic particles were detected in the isolated amoxicillin trihydrate product (FIG. 52). In addition, only 0.08 g (2%) of the magnetic beads accumulated in the magnetic trap over the course of the 7-hour run.

Figure 51:
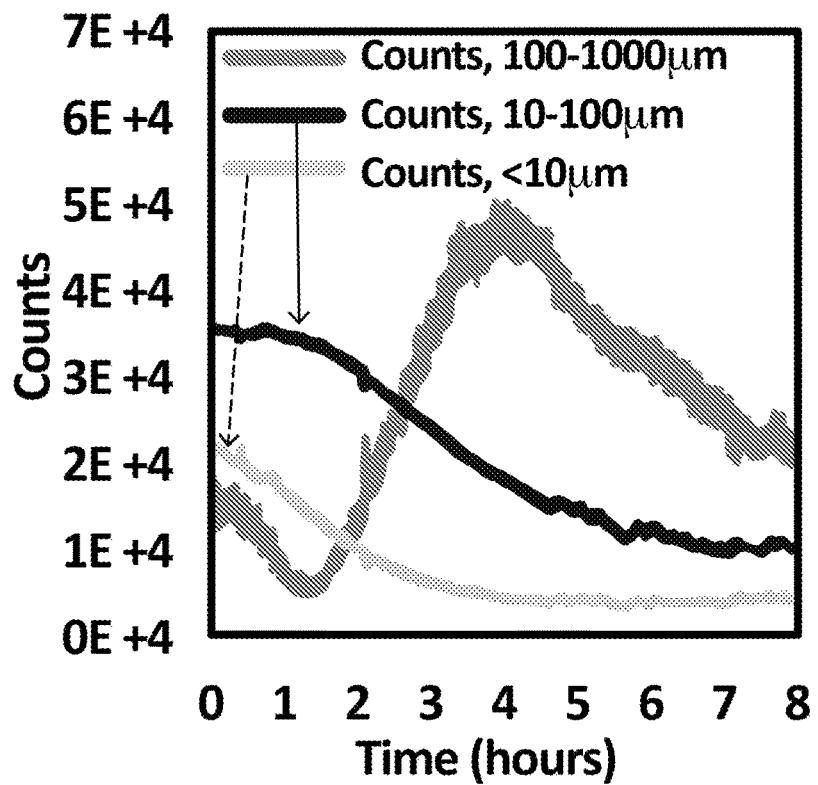
FIG. 51. Crystal chord length counts for bins of <10 µm, 10-100 µm, and 100-1000 µm as measured by FBRM. The 100-1000 µm counts are reported as Counts×10².

Amoxicillin trihydrate crystals form long, needle-like crystals and wet milling is typically ideal to minimize clogging and achieve a more desirable API for downstream processing. To enable wet milling without destroying the magnetic particles, MSMPR-2 was placed after separation and recycle of the magnetic particles. Crystals in MSMPR-2 are wet milled and a small fraction of slurry in MSMPR-2 is sent back to MSMPR-1 to achieve a lower crystal size distribution (CSD) in the overall process at steady state. The effects of wet milling are seen in chord length counts measured by FBRM after 4 hours of continuous crystallization (FIG. 51).

Slurry turbidity decreased over time (FIG. 50) indicating crystal growth from seeds as well as a net removal of crystal mass from the system relative to the rate of crystal mass generation by pH-shift. The decrease in chord length over the course of the run could indicate selective removal of larger crystals from the system (FIG. 51), which is expected as crystal removal is dictated by settling forces within the separation devices. Despite these changes in crystal behavior, the separation system behaved relatively independently of the crystal morphology in terms of magnetic bead removal (FIG. 52) and the system reached steady state at approximately the 6-hour mark and was operated for two hours past this point.

The device configuration was applied to a fully continuous pilot plant operation of the reactive crystallization of amoxicillin trihydrate. Reactants 6-APA and 4-HPGME are continuously fed into MSMPR-1 at concentrations of 240 mM and 300 mM, respectively, where they are reacted by immobilized PGA to form Amoxicillin is generated in high enough supersaturation through reaction to generate supersaturation to crystallize amoxicillin trihydrate and protect the API from further hydrolysis by PGA (McDonald M A et al. *Computers & Chemical Engineering*, 2019, 126, 332-341).

Figure 55:
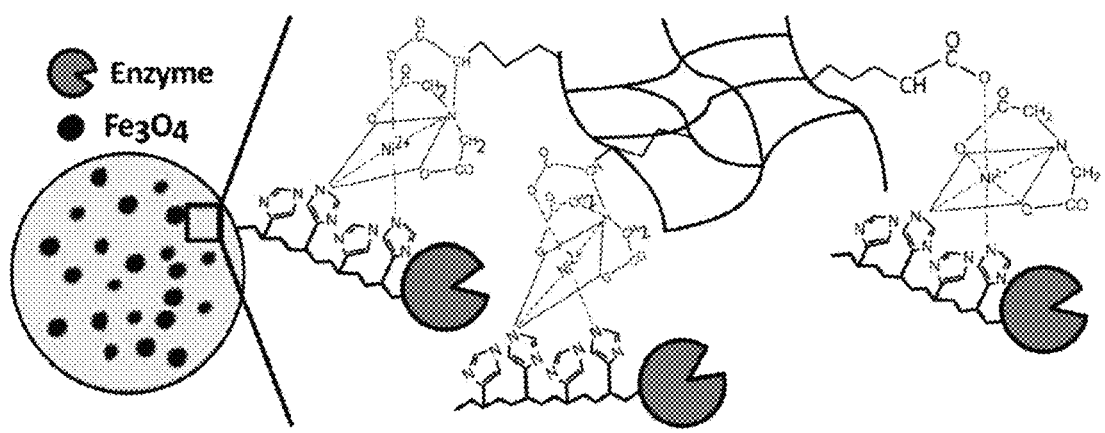
FIG. 55. Immobilization diagram for histadine-tagged PGA bound to magnetic agarose particles by Ni-NTA.

PGA immobilization can be an important point of optimization for this process. High PGA loading or the concentration of PGA per unit of immobilized particle has been shown to adversely affect β-lactam synthesis kinetics and selectivity (Salami H et al. *Reaction Chemistry & Engineering*, 2020, 5(11), 2064-2080). However, for magnetic separation, increased magnetic bead concentration reduces separation efficiency, so a balance must be found to ensure both catalytic and separation efficiency. In addition, few commercial immobilization supports exist that are within the desired size range, contain functional groups for efficient enzyme immobilization, and have paramagnetic properties. Two 90 μm magnetic agarose particles containing either epoxy groups or Ni-NTA functionalization from CubeBiotech were selected and tested for immobilization efficiency. Ultimately, the Ni-NTA functionalized particles for 6x-histadine tagged enzyme immobilization were selected (FIG. 55). These particles were able to immobilize 32 mg PGA/mL bead and PGA activity was found to be 17.2 U/mg PGA. With this immobilization configuration, a lower slurry density of beads could be used in pilot plant operation to balance both catalyst and separation performance.

Figure 53:
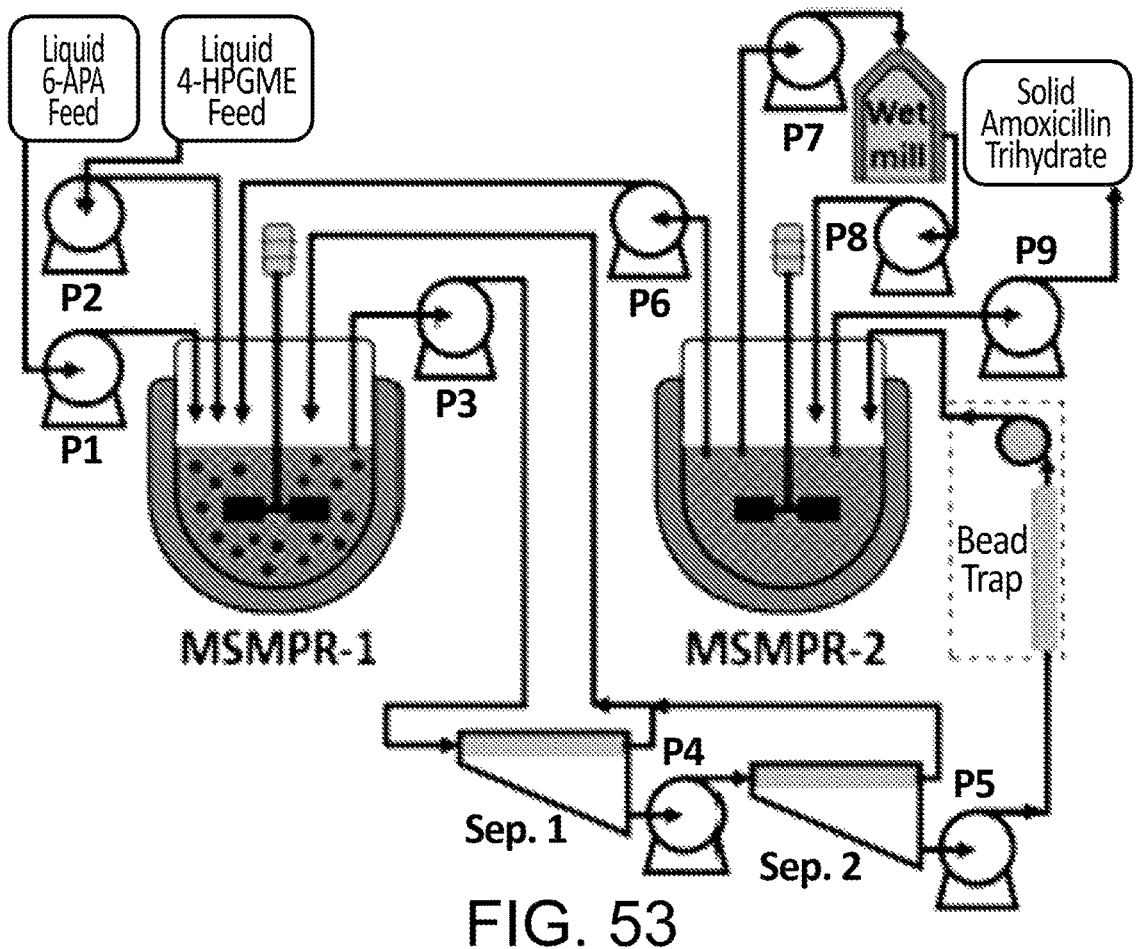
FIG. 53. Process flow diagram for pilot-scale reactive crystallization of amoxicillin trihydrate with magnetic separation.
Figure 56:
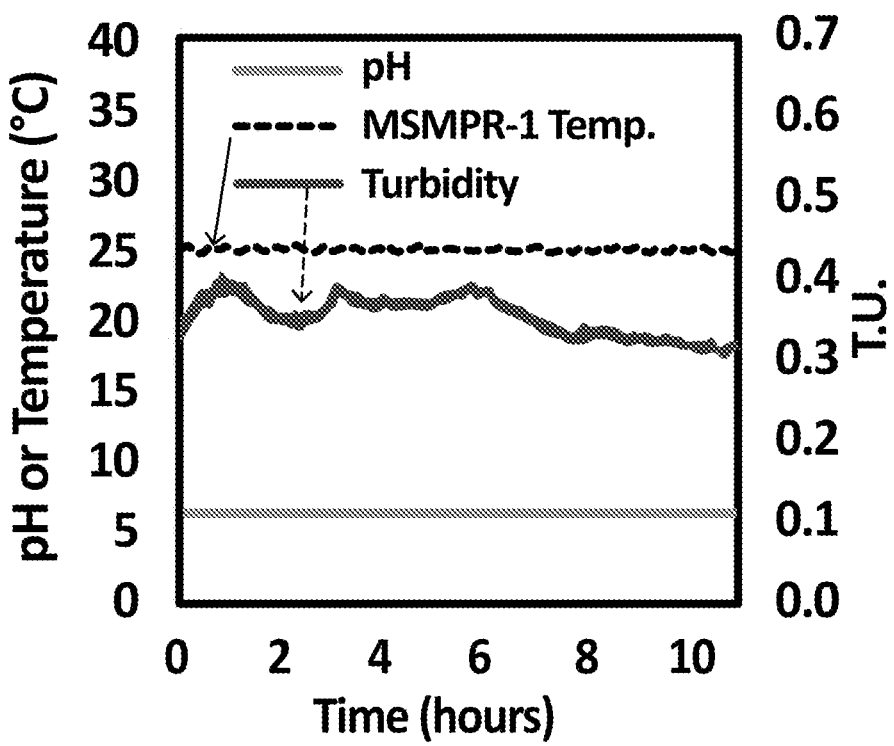
FIG. 56. pH, temperature, and turbidity data for MSMPR-1 over the course of the 11 hour pilot plant run.

MSMPR-1 contains a slurry of amoxicillin trihydrate crystals initially seeded at 20 g/L and 3 mL of 90 μm Ni-NTA functionalized magnetic agarose particles immobilizing 96 mg PGA in mother liquor held at pH 6.3 and 25° C. (FIG. 56). The slurry of mother liquor, immobilized PGA on magnetic particles, and crystallized amoxicillin are then fed through the separator system where immobilized PGA is returned to MSMPR-1. Amoxicillin trihydrate crystals are allowed to crystallize further in MSMPR-2 at 4° C. before being collected, washed, and dried for purity analysis (FIG. 53 and FIG. 54).

Figure 57:
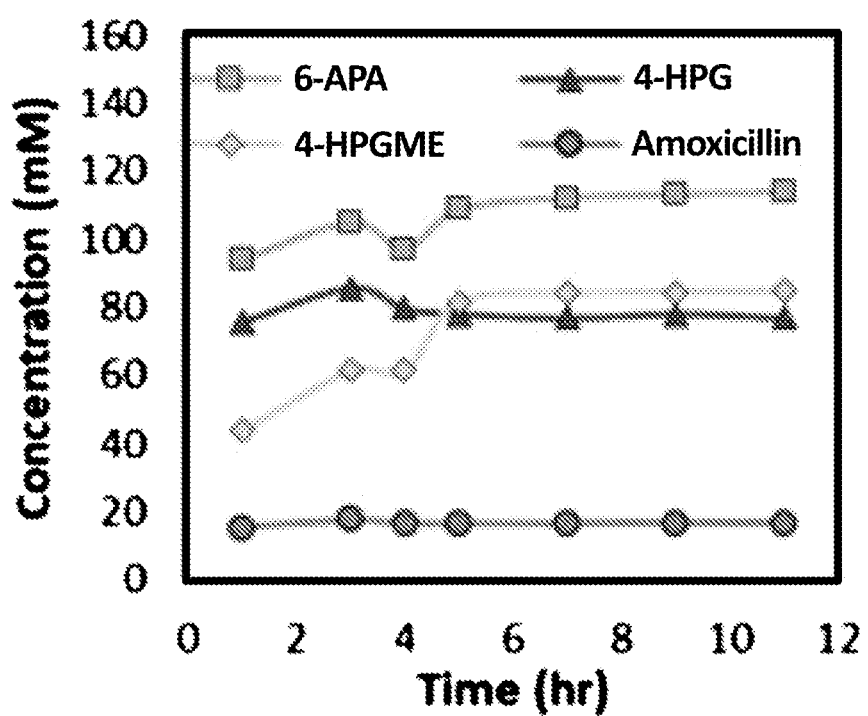
FIG. 57. HPLC data for MSMPR-1.
Figure 58:
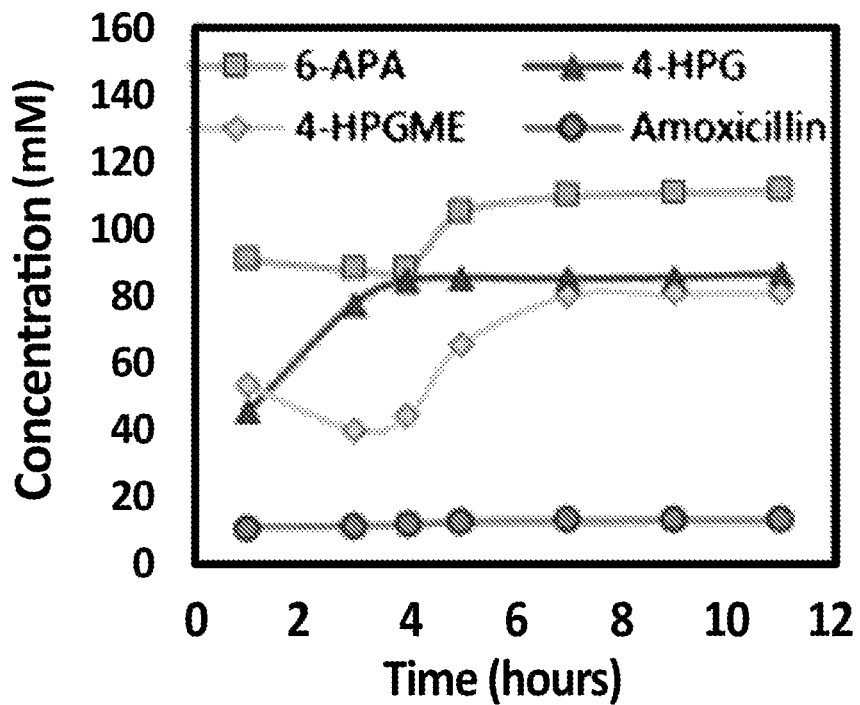
FIG. 58. HPLC data for MSMPR-2.
Figure 59:
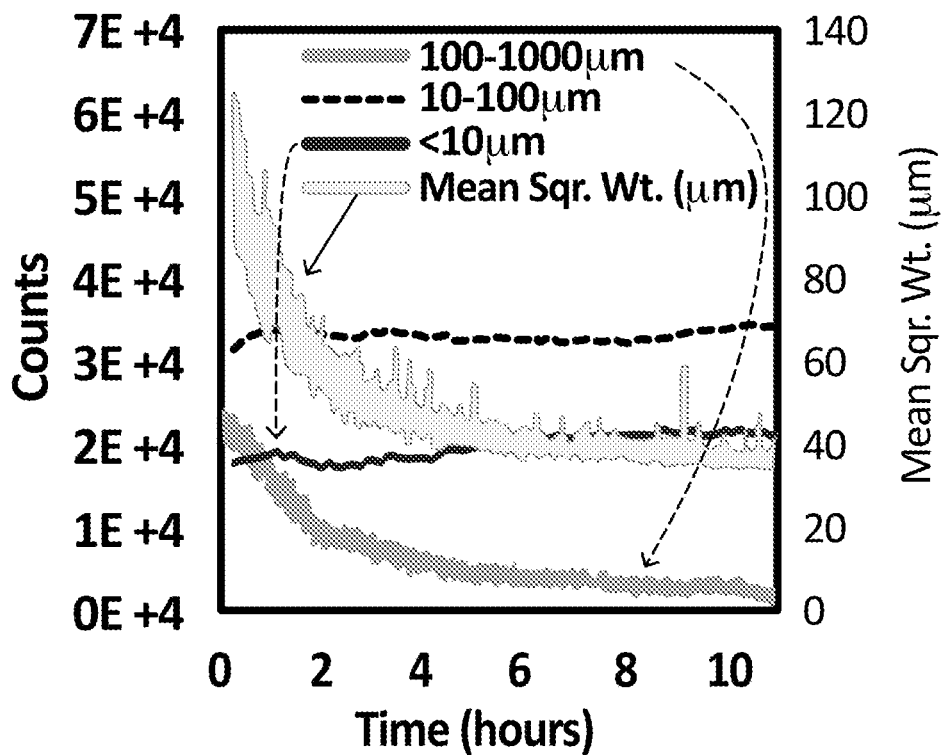
FIG. 59. Crystal chord length bin counts over the 11 hour pilot run as well as the mean square weight of the crystal population. The 100-1000 µm counts are reported as Counts×10².
Figure 60:
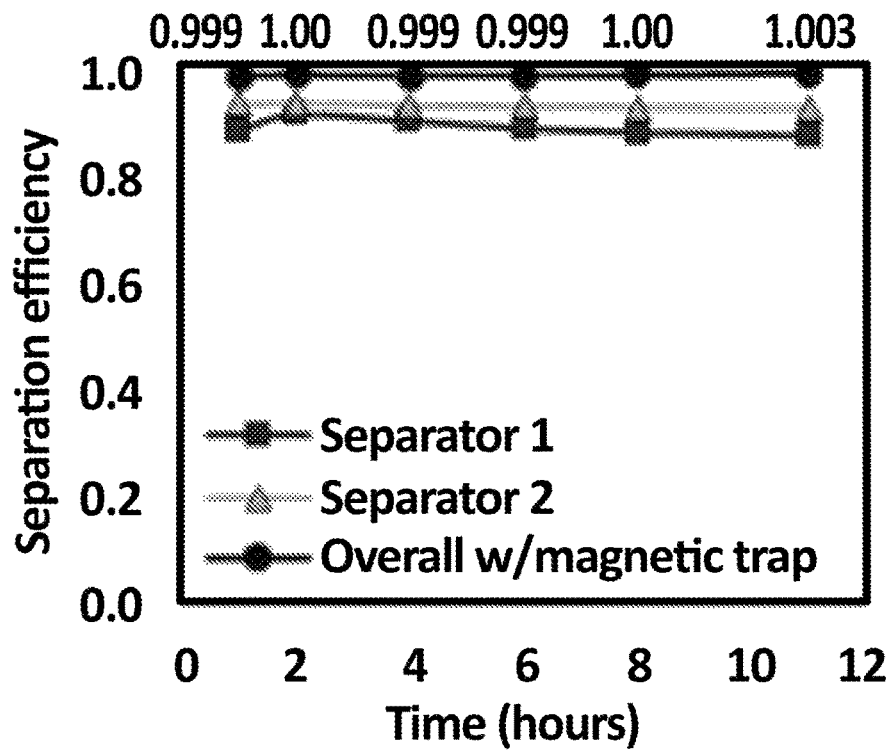
FIG. 60. Separation efficiency for magnetic bead recycling sampled throughout the pilot run.
Figure 61:
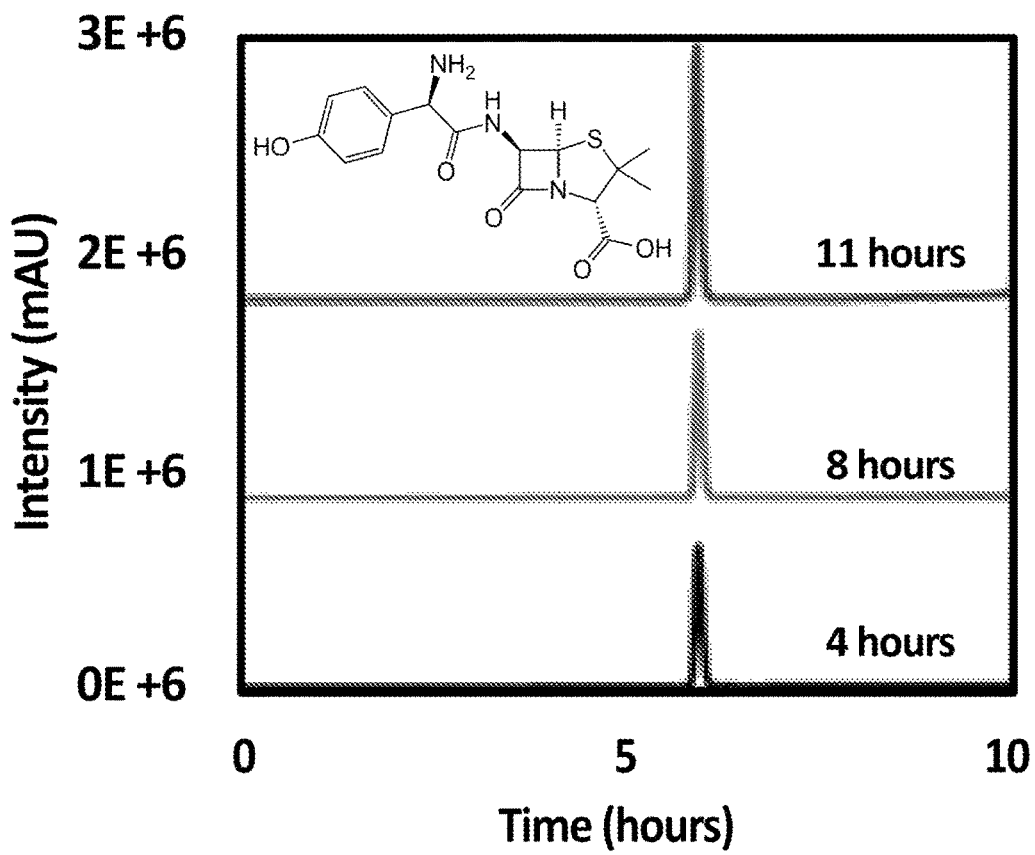
FIG. 61. HPLC data for solid amoxicillin trihydrate samples collected from the pilot plant run. Solid amoxicillin was dissolved in DI water prior to analysis.

HPLC data was collected periodically to monitor the liquid concentrations of both MSMPRs (FIG. 57 and FIG. 58). The liquid phase reached steady state after approximately 5 hours in both MSMPRs. With additional time to crystallize in MSMPR-2 at 4° C., amoxicillin was constant at solubility concentrations of 15 mM. The solids phase, monitored by turbidity measurements (PVM) and chord length distributions (FBRM) also reached steady state after about 5 hours of operation (FIG. 56 and FIG. 59). The separation system again performed well with no beads detected in final amoxicillin trihydrate product over the course of the 11-hour run (FIG. 60 and FIG. 61).

The separator system operated at >0.999 efficiency throughout the 12-hour operation (FIG. 57). The separation efficiency of both separators decreased over time, leading to more accumulation of immobilized PGA in the magnetic trap; however, devices could be operated in parallel to allow for cleaning of the first system without disruption of the continuous process. No magnetic beads were detected upon amoxicillin collection and the magnetic trap was periodically emptied to return immobilized PGA to MSMPR-1. Overall, 58 g of amoxicillin trihydrate was produced over 11 hours resulting in an average productivity of 253 g/L/day amoxicillin trihydrate isolated using magnetic separation.

Discussion. Magnetophoretic separation of crystalline API and immobilized biocatalyst were demonstrated using a device designed through iterative modelling, prototyping, and optimization which was valuable for determining the shape and orientation of the device and enabled by the inexpensive and timely nature of 3D-printing. The low cost and small size of the device also enables operation in series for enhanced separation and in parallel for either increased throughput and/or exchanging as separation efficiency decreases over time.

The results demonstrate, for the first time, isolation of solid active pharmaceutical ingredients (APIs) produced during a heterogeneously catalyzed reactive crystallization process. Amoxicillin trihydrate can be produced enzymatically in a reactive crystallization process, and recovery of the catalyst particles for further reaction while simultaneously removing pure API can be an important feature for incorporation of reactive crystallization processes on a pharmaceutical scale.

This system was demonstrated for separation of particles ranging from 50 to over 200 μm in size, and separation of both 212 μm magnetic particles and 90 μm PGA-bound magnetic agarose particles from amoxicillin trihydrate crystals with a broad crystal size distribution. The device can process 720 mL/hr of reaction mixture and is capable of being incorporated both in parallel for increased throughput or for swapping systems for cleaning and can be employed in series for enhanced separation. The system can also be coupled with a magnetic trap for a more aggressive capture of magnetic particles to ensure 100% product purity. Ultimately, the deployment of the system was demonstrated at pilot plant scale to continuously isolate >250 g/L/day of amoxicillin trihydrate produced enzymatically with PGA bound to magnetic agarose particles in an 11-hour pilot scale run.

Further optimization of the device can enable use for a wider range of particle sizes by tuning the device volume, shape, and magnetic force applied to the system. In addition, nonidealities in the system, such as magnetic particles remaining in the separator, could be mitigated with use of electromagnets to fine tune the magnetic fields generated within the device. This can enable a more ideal balance of forces to ensure smooth particle flow throughout the device and allow for enhanced crystal settling by gravitational force. Other device shapes or lengths may also better facilitate enhanced crystal settling, but this is often system dependent based on the nature of crystalline product.

In addition to further device optimization, improvements in magnetic particle technology can also improve the separation ability of the system and increase tunability for different applications. Currently, magnetic particles functionalized for enzyme immobilization are limited to primarily micron or submicron particles. Only a single vendor exists for functionalized magnetic particles with >50 μm diameter. This gives the user little choice in both bead size, material, and magnetic properties for immobilizing catalyst. Despite these limitations, the work detailed here serves as a proof-of-concept that can be further leveraged for other solid-solid separations with additional progress in related technologies.

While the devices herein were demonstrated on β-lactam antibiotic production, this system can be generalized for process intensification of heterogeneously catalyzed systems where a solid product is ultimately desired. As both continuous pharmaceutical processes and reactive crystallizations are gaining traction for their aforementioned advantages, it is believed that the design of new unit operations, including separations, will help accelerate the adoption of continuous, heterogeneously catalyzed reactive crystallizations and more generally expand the chemistries and processes amenable to continuous manufacturing.

Example 6

A device (e.g., a 3D printed device) is disclosed designed for the continuous separation of magnetic beads and nonmagnetic solids of similar size. The separation device comprises one inlet containing the material to separate and two or more outlets: at least one for pure, nonmagnetic products and at least one for magnetic solids. The bulk volume of the device allows for time for the solid phases to separate. A magnet is placed on top of the device to pull the magnetic particles into the top outlet while nonmagnetic particles settle into the bottom outlet.

The device is capable of a continuous separation for multiple hours and can be parallelized or ran in series to improve both solids throughput and separation efficiency. The effective solid size range capable of separation is between 10-500 μm, for example, among other ranges. The device can process >10 g solids per hour and achieve a separation efficiency of >99% in a single pass in an example.

The device employs computational fluid dynamics for separation and advantageously arranged elements at an angle with respect to flow and the long axis of the magnets.

In some examples, the device is a device, e.g., for continuous separation of functionalized magnetic solid (e.g., microparticles or nanoparticles) in fluid flow, the device comprising: a separation chamber (e.g., triangular shaped separation chamber) (e.g., 3D printed chamber) comprising at least one inlet, including a first inlet port, and two or more outlets, including a first outlet port and a second outlet port, wherein the first outlet port is configured for the separation of nonmagnetic product (e.g., microparticles), and wherein the second outlet port is configured for magnetic product (e.g., microparticles); and one or more permanent magnet disposed around the separation chamber.

In some examples, the device is a 3D printed device for continuous separation of functionalized magnetic microparticles (e.g., nanoparticles) in fluid flow, the device comprising a separation chamber (e.g., triangular-shaped separation chamber) (e.g., 3D printed chamber) comprising at least one inlet, including a first inlet port, and two or more outlets, including a first outlet port and a second outlet port, wherein the first outlet port is configured for the separation of nonmagnetic product (e.g., microparticles), and wherein the second outlet port is configured for magnetic product (e.g., microparticles); and one or more permanent magnet disposed around the separation chamber.

In some examples, the first outlet port forms a taper connector. In some examples, the second outlet port forms a taper connector. In some examples, the first inlet port forms a taper connector. In some examples, the taper connector is configured to connect to a flexible tube.

In some examples, the one or more permanent magnet comprises two or more bar-shaped permanent magnets, wherein the two or more two or more bar-shaped permanent magnets are secured in a fixed location by their attraction to one another over a space (e.g., a thin plastic spacer).

In some examples, the one or more permanent magnets are placed on a face region of the separation chamber and spans the length of the separation chamber from the first inlet port to at least one of the first outlet port or the second outlet port (e.g., to pull the magnetic particles to the upper outlet while nonmagnetic naturally settle into the bottom outlet).

In some examples, the device further includes mounting pegs configured to extend from either side of the separation chamber (e.g., and that attaches to a stand to keep the separation chamber stationary during operation).

In some examples, the device is configured for continuous separation (e.g., for multiple hours).

In some examples, the device is configured for parallelized operation (e.g., connected in parallel with one or more similar or different continuous separation devices).

In some examples, the device is configured for serial operation (e.g., e.g., connected in series with one or more similar or different continuous separation devices).

In some examples, the device (e.g., chamber, inlet, outputs, and magnets) is configured for an effective solid size range separation of microparticles having a distribution in a range between 10 μm and 500 μm (e.g., 10-20 μm, 10-50 μm, 10-100 μm, 50-100 μm, 50-200 μm, 100-200 μm, 200-300 μm, 300-400 μm, 400-500 μm).

In some examples, the device (e.g., chamber, inlet, outputs, and magnets) is configured to separate greater than 10 grams of solids per hour and with a separation efficiency of greater than 99% in a single pass.

Also disclosed are methods for operating the above-discussed device.

Also disclosed are methods for fabricating the above-discussed device.

Also disclosed are systems comprising the above-discussed device.

Also disclosed are methods of recycling of immobilized biocatalyst comprising separating one or more of particles of a plurality of particles with the above-discussed device.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The devices, systems, and methods of the appended claims are not limited in scope by the specific devices, systems, and methods described herein, which are intended as illustrations of a few aspects of the claims and any methods that are functionally equivalent are intended to fall within the scope of the claims. Various modifications of the devices, systems, and methods in addition to those shown and described herein are intended to fall within the scope of the appended claims. Further, while only certain representative device elements and method steps disclosed herein are specifically described, other combinations of the device elements and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed:

1. A device for separation of a mixture comprising a magnetic solid and a non-magnetic solid in a fluid flowing through the device when subjected to a magnetic field from a magnet disposed proximate to at least a portion of the device, the device comprising:
    a separation chamber extending from a proximal end to a distal end;
    the proximal end defining an inlet;
    the distal end defining a first outlet and a second outlet; and
    the first outlet and the second outlet are spaced apart from each other by a distance and are in fluid communication with the inlet and the separation chamber;
    the separation chamber providing a path for fluid flow from the inlet to the first outlet and the second outlet;
    the inlet being configured to receive the fluid comprising the mixture of the magnetic solid and the non-magnetic solid;
    the separation chamber having a region that is configured to subject the fluid flowing through said region to the magnetic field to thereby separate the mixture into a first portion and a second portion;
    the first outlet being configured to receive the first portion of the mixture from the separation chamber;
    the second outlet being configured to receive the second portion of the mixture from the separation chamber;
    the first portion being enriched with the non-magnetic solid relative to the second separated portion; and
    the second portion being enriched with the magnetic solid relative to the first separated portion;
    wherein:
        the separation chamber has a cross-sectional shape that is triangular; or the device further comprises a magnet and the magnet is disposed above the separation chamber to pull the magnetic solids upwards towards the second outlet while the non-magnetic solids settle downwards towards the first outlet.

2. The device of claim 1, wherein the inlet is tapered, the first outlet is tapered, the second outlet is tapered, or a combination thereof.

3. The device of claim 1, wherein the separation chamber has a volume of from 1 milliliter to 1 Liter.

4. The device of claim 1, wherein the separation chamber has a cross-sectional shape that is triangular.

5. The device of claim 1, wherein the device has an exterior surface and the device further comprises one or more mounting elements coupled to or extending from the exterior surface.

6. The device of claim 5, wherein the mounting elements are configured to be coupled to a stand.

7. The device of claim 6, wherein the stand is configured to keep the device stationary during operation, wherein the stand is configured to orient the device at an angle, or a combination thereof.

8. The device of claim 1, wherein the inlet, the first outlet, the second outlet, and the separation chamber are integrally formed.

9. The device of claim 1, further comprising a magnet.

10. The device of claim 9, wherein the magnet is disposed above the separation chamber to pull the magnetic solids upwards towards the second outlet while the non-magnetic solids settle downwards towards the first outlet.

11. The device of claim 9, wherein the separation chamber has a first face and a second face opposite and spaced apart from the first face, and wherein the device further comprises a first magnet disposed on a portion of the first face and a second magnet disposed on a portion of the second face.

12. The device of claim 1, wherein the mixture comprises the magnetic solid in a concentration of from 1 gram of magnetic solid per liter of fluid (g/L) to 100 g/L, the non-magnetic solid in a concentration of from 1 gram of non-magnetic solid per liter of fluid (g/L) to 100 g/L, or a combination thereof.

13. The device of claim 1, wherein the magnetic solid further comprises a catalyst.

14. The device of claim 1, wherein the non-magnetic solid comprises a plurality of non-magnetic particles.

15. The device of claim 1, wherein the second portion includes 80% or more of the magnetic solid.

16. A system comprising one or more of the devices of claim 1.

17. The system of claim 16, wherein the system comprises a plurality of the devices connected in parallel and/or in series.

18. A method of using the device of claim 1, the method comprising flowing the mixture from the inlet to the first outlet and second outlet while subjecting the region of the separation chamber to the magnetic field thereby separating the mixture into the first portion at the first outlet and the second portion at the second outlet.

19. The method of claim 18, wherein the device processes from 1 gram to 100 grams of total solids per hour, wherein the device is operated continuously for an amount of time of from 30 minutes to 48 hours, or a combination thereof.

* * * * *